United States Patent
Hirokane et al.

(10) Patent No.: US 6,826,769 B2
(45) Date of Patent: Nov. 30, 2004

(54) RECORDING AND REPRODUCING DEVICE HAVING A STABILIZING BOARD AND VERTICALLY-OSCILLATING SLIDER

(75) Inventors: Junji Hirokane, Nara (JP); Noboru Iwata, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 288 days.

(21) Appl. No.: 10/034,865

(22) Filed: Dec. 27, 2001

(65) Prior Publication Data

US 2002/0080689 A1 Jun. 27, 2002

(30) Foreign Application Priority Data

| Dec. 27, 2000 | (JP) | 2000-399587 |
| Dec. 27, 2000 | (JP) | 2000-399589 |
| Mar. 13, 2001 | (JP) | 2001-070486 |
| Mar. 23, 2001 | (JP) | 2001-085305 |
| Oct. 18, 2001 | (JP) | 2001-321147 |
| Oct. 18, 2001 | (JP) | 2001-321162 |

(51) Int. Cl.$^7$ ............ G11B 7/08; G11B 7/085; G11B 7/09
(52) U.S. Cl. ............................................. 720/688
(58) Field of Search .................... 720/688, 658, 720/659, 663, 672, 681, 682, 686; 369/13.13, 53.28, 13.32, 13.23, 13.2, 13.11, 13.02

(56) References Cited

U.S. PATENT DOCUMENTS

| 4,334,302 A | | 6/1982 | Peppers ............... 369/261 |
| 4,530,082 A | * | 7/1985 | Howe et al. .......... 369/112.23 |
| 5,125,750 A | | 6/1992 | Corle et al. ............ 359/819 |
| 5,189,574 A | | 2/1993 | Imamura et al. ........ 360/234.2 |
| 5,247,503 A | * | 9/1993 | Nomiyama et al. ..... 369/44.35 |
| 5,497,359 A | | 3/1996 | Mamin et al. .......... 369/44.15 |
| 6,108,292 A | | 8/2000 | Zijp .................. 369/112.24 |
| 6,292,453 B1 | | 9/2001 | Ichimura et al. ....... 369/112.24 |
| 6,404,705 B1 | * | 6/2002 | Watanabe et al. ........ 369/13.14 |

FOREIGN PATENT DOCUMENTS

| JP | 05-067362 | 3/1993 |
| JP | 10-308059 | 11/1998 |
| JP | 11-120551 | 4/1999 |
| KR | 1998-0643+94 | 10/1998 |

OTHER PUBLICATIONS

Yamamoto et al., "0.8 Numerical Aperture Two Element Objective Lens for the Optical Disc", Jpn. J. Appl. Phys. vol. 36 (1997) Pt. 1, No. 1B, pp. 456–459.*

German Patent and Trademark Office Communication dated Feb. 5, 2003 (5 pp.) and English translation (5 pp.).

Korean Intellectual Property Office Communication dated Nov. 26, 2003 (2 pp.) and English translation (5 pp.).

* cited by examiner

*Primary Examiner*—Julie Anne Watko
(74) *Attorney, Agent, or Firm*—Edwards & Angell, LLP; David G. Conlin; George W. Hartnell, III

(57) ABSTRACT

A recording and reproducing device of the present invention is provided to achieve the object of realizing stable and desirable recording and reproducing of information by suppressing fluttering of an optical disk by way of suppressing pressure fluctuation which is caused, for example, when an objective lens or an optical pickup with the objective lens is moved. The object is attained by a transparent stabilizer, provided between a disk and an optical pickup, which is moved with the optical pickup, and a slider which is provided to face the transparent stabilizer with the disk in between. The slider is supported to oscillate, and the surface of the slider facing the disk is flat. During rotation of the disk, the slider moves to balance the air pressure between the transparent stabilizer and the disk with that between the slider and the disk.

14 Claims, 38 Drawing Sheets

F I G. 1 4
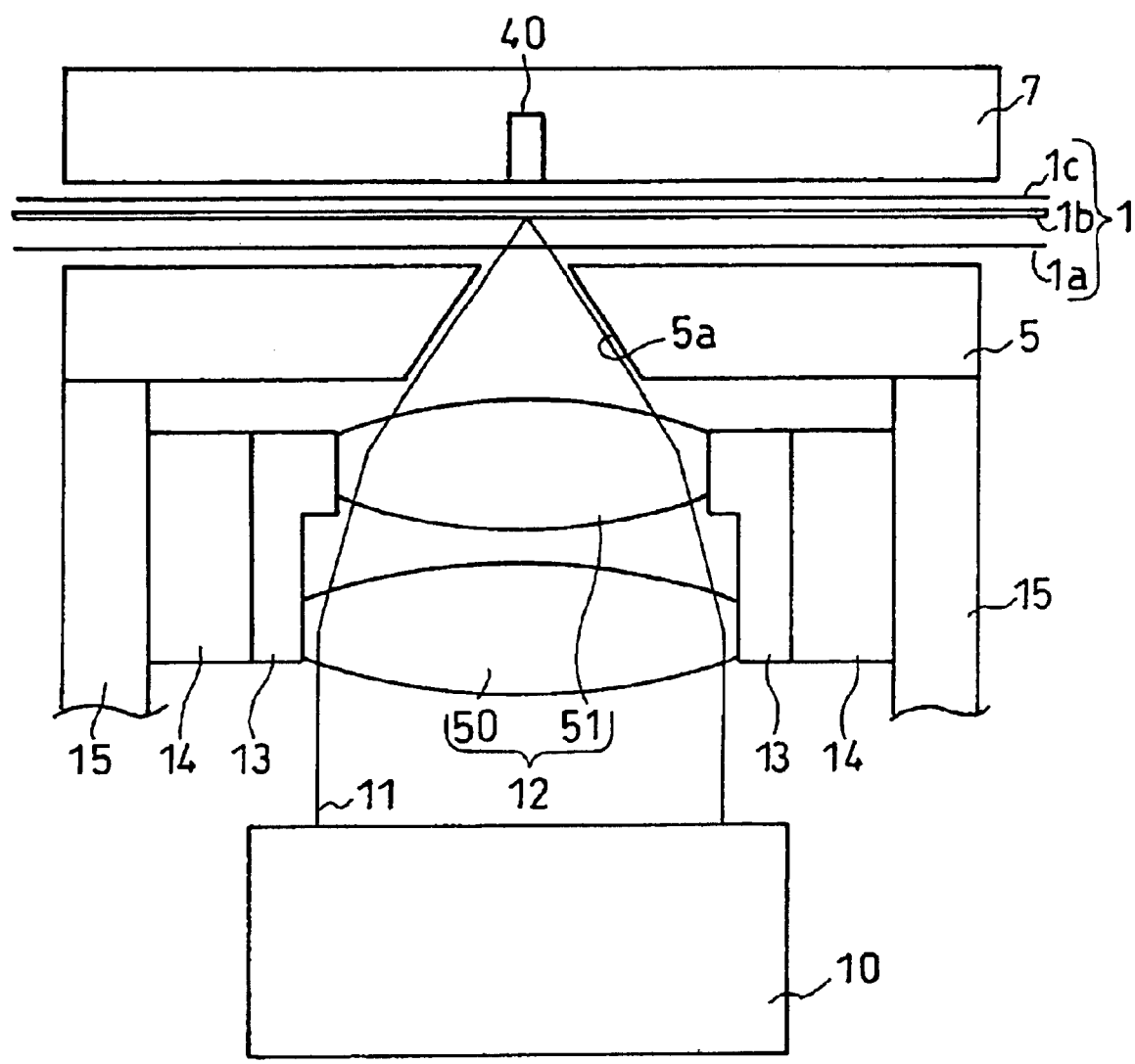

RECORDING AND REPRODUCING DEVICE HAVING A STABILIZING BOARD AND VERTICALLY-OSCILLATING SLIDER

FIELD OF THE INVENTION

The present invention relates to a recording and reproducing device, disk cartridge, and optical disk device, which can be used to record and reproduce information in high density, and in particular to a recording and reproducing device, disk cartridge, and optical disk for recording and/or reproducing a data signal with respect to a flexible optical disk.

BACKGROUND OF THE INVENTION

Optical disks, such as a magneto-optical disk, have been widely used conventionally to record and reproduce information using a laser. In recent years, recording density of optical disks has been increasing to accommodate recording of more information. Along with this, optical disks have adopted smaller recording pits.

In order to read out information from such a high-density optical disk, the optical pickup needs to focus a light beam in such a way that the beam spot falls on a small domain of the optical disk where information is recorded. This makes it possible to read out information recorded in such a small domain. The smaller spot size enables recording of more information.

The spot size is proportional to wavelength λ of the light source used, and is inversely proportional to numerical aperture NA of the objective lens. Thus, the spot size of a light beam can be reduced by either reducing the wavelength λ of light from the light source, or by increasing the numerical aperture NA of the objective lens.

However, reducing the spot size by either of these methods causes large comatic aberration on the light beam when the optical disk tilts. The result of this is that the light beam cannot be accurately focused on the optical disk.

One conventional approach to solve this problem is to reduce thickness of the optical disk, and in turn length of optical path in the optical disk, so as to provide a larger margin of error for a tilt of the optical disk substrate.

For example, a CD-ROM has a numerical aperture NA=0.45, wavelength λ=780 nm, and thickness of the optical disk substrate 1.2 mm. In contrast, a DVD-ROM has a numerical aperture NA=0.6, wavelength λ=655 nm, and thickness of the optical disk substrate 0.6 mm. The DVD-ROM thus employs a light source which emits light of a shorter wavelength λ, an objective lens with larger numerical aperture NA, and a thinner optical disk substrate, so as to increase recording capacity and a margin of error for a tilt of the optical disk substrate.

However, rigidity of the optical disk substrate weakens when the thickness of the optical disk substrate is further reduced to provide more margin of error for a tilt of the optical disk substrate. In fact, this only worsens the tilt of the optical disk substrate because weaker rigidity of the optical disk substrate causes the optical disk substrate to flutter. Therefore, there is a limit in reducing wavelength λ of light of the light source and increasing numerical aperture NA of the objective lens.

In light of this problem, Japanese Unexamined Patent Publication No. 308059/1998 (Tokukaihei 10-308059) (published date: Nov. 17, 1998) teaches a recording and reproducing device which stabilizes rotation of an optical disk to allow for use of a thinner optical disk, an objective lens with larger numerical aperture NA, and light of a shorter wavelength λ. FIG. 52 shows a structure of this recording and reproducing device.

As shown in FIG. 52, the recording and reproducing device is adapted to record and reproduce information with respect to an optical disk 401, by including a spindle 405 for rotating the optical disk 401, an optical pickup 403 for projecting and focusing a light beam on the optical disk 401, and an stabilizer 402 for stabilizing rotation of the optical disk 401. The optical disk 401 is very thin and flexible.

The optical disk 401 has a magnetic center hub 404 which fixes the optical disk 401 on the spindle 405 by magnetic coupling. The optical pickup 403 has focusing means such as a complex objective lens. The stabilizer 402 and the optical pickup 403 are disposed face to face on the both sides of the optical disk 401.

To record or reproduce information with respect to the optical disk 401, the optical disk 401 is rotated in the vicinity of the stabilizer 402. Here, a space of reduced pressure is created between the optical disk 401 and the stabilizer 402. Thus, the optical disk 401, being flexible, is drawn toward the stabilizer 402, and rotates at a constant distance from the stabilizer 402. As a result, fluttering of the optical disk 401 is suppressed, thereby recording and reproducing information in the recording and reproducing device with the optical pickup 103 having a wavelength of light not more than 650 nm and numerical aperture NA of the complex objective lens not less than 0.7.

Further, the foregoing publication also teaches a recording and reproducing device which uses a disk cartridge 406 integrally provided with the stabilizer 402, as shown in FIG. 53. In this case, the optical pickup 403 is inserted into the disk cartridge 406 through an opening (not shown) of the disk cartridge 406. The provision of the stabilizer 402 with the disk cartridge 406 suppresses fluttering of the optical disk 401 as in the recording and reproducing device of FIG. 52, thus realizing recording and reproducing of information with the thin optical disk 401, the objective lens with large numerical aperture NA, and light of short wavelength λ.

Further, the foregoing publication discloses a structure in which a light beam is focused using a dual objective lens. For example, in a reproducing device shown in FIG. 54, a flexible optical disk 501, fixed on a center hub 503, is rotated by a spindle 504, so that the optical disk 501 is drawn toward the stabilizer 502 to stably rotate at a constant distance from the stabilizer 502.

A light beam 510 from a light source in a light emitting and detecting unit 505 is reflected at a mirror 506 and focused through the dual objective lens composed of a first objective lens 507 and a second objective lens 508 before it strikes the optical disk 501. The reflected light from the optical disk 501 is detected by a photodetector provided in the light emitting and detecting unit 505, so as to record or reproduce information with respect to the optical disk 501.

The dual lens is driven by a biaxial actuator 509 to carry out tracking and focusing. With such a reproducing device, a wavelength of light not more than 650 nm and numerical aperture NA of the dual lens not less than 0.7 can be realized.

However, the foregoing arrangement has the following problems.

Generally, recording and reproducing of information with respect to the optical disk employ a focus control whereby a constant distance is maintained between the optical disk and focusing means to maintain the laser beam in focus, so that the surface of the optical disk carrying the information is always within the depth of focus of the focusing means such as the objective lens.

In this manner, a focus control is carried out to record or reproduce information with respect to the optical disk 401. The optical pickup 403 approaches the optical disk 401. In this instance, in the arrangement of the foregoing publication, regardless of whether it is the recording and reproducing device of FIG. 52 or the recording and reproducing device using the disk cartridge 406 as shown in FIG. 53, the surface of the optical pickup 403 provided with the focusing means such as the objective lens is the surface facing the optical disk 401, which surface has relatively large irregularities. Thus, pressure fluctuates around the focusing means, or around the optical pickup 403, every time the focusing means is moved during a focus control, which causes fluctuation of air pressure between the optical pickup 403 and the optical disk 401. That is, the movement of the focusing means causes the optical disk 401 to flutter, which prevents stable focus control.

Further, in the reproducing device of FIG. 54, the flexible optical disk 501 fixed on the spindle 504 is rotated by the spindle 504 so that a space of reduced pressure is created between the flexible optical disk 501 and the stabilizer 502. The reduced pressure draws the optical disk 501 toward the stabilizer 502 so that the optical disk 501 stably rotates at a constant distance from the stabilizer 502. As a result, fluttering of the optical disk 501 is suppressed, thereby desirably recording or reproducing information.

However, because the dual objective lens which is disposed opposite the stabilizer 502 approaches the flexible optical disk 501 to reproduce information, the pressure between the dual objective lens and the optical disk 501 fluctuates. This causes the optical disk 501 to flutter (shudder) and thus prevent desirable recording and reproducing of information. Similarly, in the arrangement in which the disk cartridge is integrally provided with the stabilizer 502, desirable reproducing of information becomes difficult because the dual objective lens approaches the flexible optical disk 501.

Thus, one conventional problem is fluttering of the optical disk which is caused by pressure fluctuation around the optical disk, for example, due to movement of the focusing means of the optical pickup during a focus control. This means instable focus control, and therefore it was difficult to record and reproduce information desirably.

Another problem is that fluttering of the disk becomes more serious as the disk is rotated at higher speed, irrespective of whether the disk is flexible or not. It was therefore difficult to record and reproduce information stably.

SUMMARY OF THE INVENTION

An object of the present invention is to provide a recording and reproducing device, a disk cartridge, and an optical disk device, which can be used to record and reproduce information both stably and desirably with less fluttering, even at a high rotational speed, by suppressing fluttering of an optical disk by way of suppressing pressure fluctuation which is caused, for example, when an objective lens is moved.

In order to achieve this object, a recording and reproducing device of the present invention, in a recording and reproducing device which records and reproduces information by projecting a laser beam on a disk being rotated, comprises: a stabilizing slider which is disposed to face the disk and is supported to oscillate, a surface of the stabilizing slider facing the disk being flat.

According to this arrangement, rotation of the disk induces an air flow between the disk and the stabilizing slider, and air bearing is created between the stabilizing slider and the disk because the surface of the stabilizing slider facing the disk is flat. Further, since the stabilizing slider is supported to oscillate, the stabilizing slider can be moved in such a way that a constant distance is always maintained from the disk during rotation of the disk.

Thus, the disk rotates at a constant distance from the stabilizing slider. That is, fluttering of the disk is prevented even when the disk is rotating at high speed, thus stably recording and reproducing information.

Further, in order to achieve the foregoing object, in a disk cartridge of the present invention which contains a disk in a cartridge used in the recording and reproducing device, the disk being exposed when recording and reproducing information, the cartridge has inner wall surfaces which define a stabilizing board for creating a space of reduced pressure between the disk and the inner wall surfaces.

According to this arrangement, the stabilizing board defined by the both inner wall surfaces of the disk cartridge suppresses fluttering of the disk more effectively, thus realizing more stable and desirable recording and reproducing.

Further, in order to achieve the foregoing object, an optical disk device of the present invention, in an optical disk device which records and reproduces information with respect to an optical disk, comprises: rotation driving means for rotating an optical disk; a focusing unit for focusing light from a light source on the optical disk; a support member for supporting the focusing unit; and a rotation stabilizing board, fixed to the support member so as to be disposed between the focusing unit with the support member and the optical disk, for stabilizing rotation of the optical disk.

According to this arrangement, the rotation stabilizing board for stabilizing rotation of the flexible optical disk is provided on the focusing unit and the support member of the focusing unit. This prevents fluttering of the optical disk which may be caused when the focusing unit and the support member of the focusing unit are positioned in the vicinity of the optical disk. As a result, desirable recording and reproducing can be realized.

For a fuller understanding of the nature and advantages of the invention, reference should be made to the ensuing detailed description taken in conjunction with the accompanying drawings.

BRIEF DESCRIPTION OF THE DRAWINGS

FIG. 14 is an enlarged cross sectional view showing the structure of relevant part of the recording and reproducing device of FIG. 11 when a dual lens is used.

DESCRIPTION OF THE EMBODIMENTS

[First Embodiment]

The following will explain one embodiment of the present invention. Note that, the following embodiments will describe the case where the present invention is applied to a flexible disk, but the present invention is also applicable to inflexible disks as well.

Figure 1:
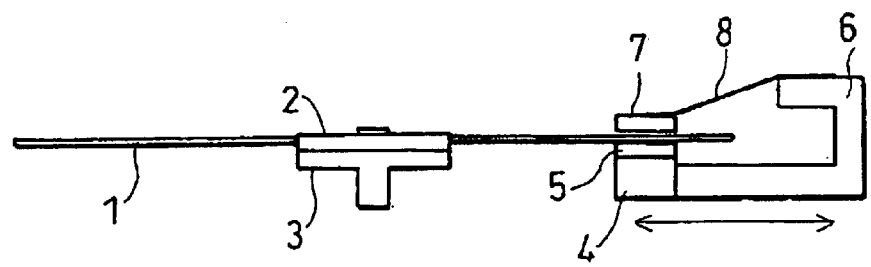
FIG. 1 is a cross sectional view showing a structure of relevant part of a recording and reproducing device according to one embodiment of the present invention.

FIG. 1 is a cross sectional view showing a relevant part of a recording and reproducing device. As shown in FIG. 1, the recording and reproducing device according to the present embodiment includes a spindle (rotation driving means) 3, an optical pickup 4, a transparent stabilizing board (first stabilizing board) 5, a support section 6, a slider 7, and a suspension 8, which are incorporated to record and reproduce information with respect to a disk 1.

The transparent stabilizing board 5 is integrally fixed on an upper portion of the optical pickup 4. The optical pickup 4 with the transparent stabilizing board 5 is provided at a predetermined distance from one surface of the disk 1, and the slider 7 is disposed above the other surface of the disk 1 on the opposite side of the transparent stabilizing board 5 and the optical pickup 4. The optical pickup 4 and the slider 7 are integrally provided via the support section 6 and the suspension 8 which together make up a support member.

The disk 1 is a thin flexible disk made of transparent resin. Further, the disk 1 has a magnetic center hub 2, whereby the disk 1 is chucked to the spindle 3 by magnetic coupling. The disk 1 is rotated by driving the spindle 3 by a motor (not shown). Information is recorded and reproduced as the disk 1 rotates.

Note that, the type of disk 1 is not particularly limited as long as it is a flexible optical disk. For example, the disk 1 may be a ROM (Read-Only Memory) disk with a series of pits, which are recessions on a surface of the disk substrate; or a write once disk which incorporates an organic pigment material as the recording medium; or a rewritable optical disk which incorporates a phase change material as the recording medium.

Figure 2:
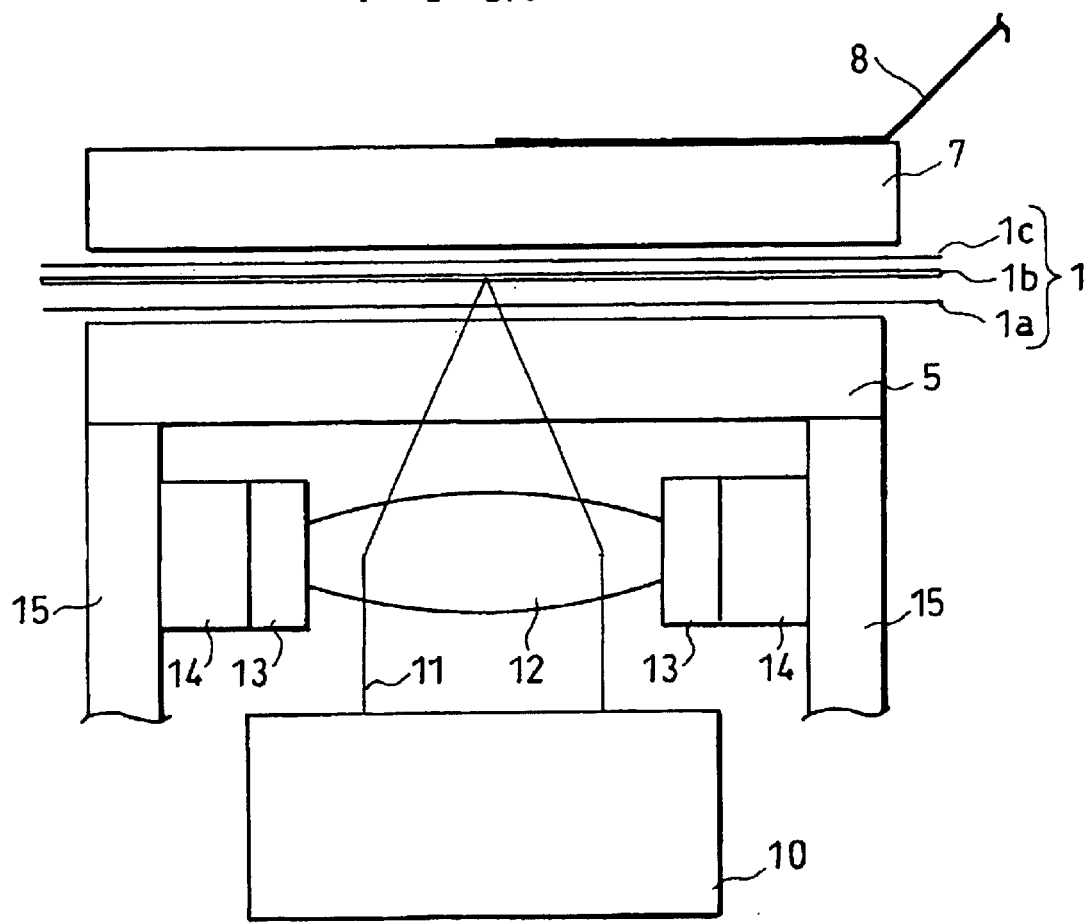
FIG. 2 is an enlarged cross sectional view showing the structure of relevant part of the recording and reproducing device of FIG. 1.

Here, it is assumed that the disk 1 is a write once disk or a rewritable optical disk. As shown in FIG. 2, the disk 1 includes a disk substrate 1a with guiding grooves which are recessed and raised portions on a surface of the disk, a recording medium 1b which is formed on the surface of the recessed and raised guiding grooves; and a protecting layer 1c for protecting the recording medium 1b.

As shown in FIG. 2, the optical pickup 4 includes an optical pickup casing 15. In the optical pickup casing 15 are provided an light emitting and detecting optical system (light source) 10, a biaxial actuator 14, a lens holder 13, and an objective lens (focusing means) 12.

The light emitting and detecting optical system 10 includes a light emitting element which makes up a light source to emit a laser beam 11 in a direction toward the disk 1. The biaxial actuator 14 is provided on the optical pickup casing 15 to support the lens holder 13. The lens holder 13 is provided to hold the objective lens 12 between the light emitting and detecting optical system 10 and the transparent stabilizing board 5 which is provided on the optical pickup 4.

The electromagnetic force generated by coils provided in the biaxial actuator 14 drives the objective lens 12 in such a way that the objective lens 12 is freely displaced in focusing directions (vertical direction with respect to the disk 1) and in tracking directions (directions indicated by arrows in FIG. 1) with respect to the guiding grooves of the disk 1, thereby enabling the objective lens 12 to accommodate fluttering of the disk 1 or eccentricity of the tracks formed on the disk 1, in case where the recording and reproducing device is disturbed, for example, by oscillation.

The laser beam 11 emitted by the light emitting and detecting optical system 10 is focused through the objective lens 12 to irradiate the disk 1. The laser beam 11 on the disk 1 is reflected at the recording medium 1b of the disk 1. The light reflected at the recording medium 1b travels back to the light emitting and detecting optical system 10 through the objective lens 12. The light in the light emitting and detecting optical system 10 is detected by a photoreceptor element (not shown) therein, thereby recording or reproducing information.

The transparent stabilizing board 5 is provided on the optical pickup 4, i.e., on the surface of the optical pickup 4 on the side of the disk 1, at a predetermined distance from the disk 1. The optical pickup 4 and the transparent stabilizing board 5 are linked to each other. The transparent stabilizing board 5 is made of a transparent material to allow transmission of the laser beam 11 which is emitted by the optical pickup 4 to irradiate the disk 1.

The support section 6 is fixed to the optical pickup 4 at one end, and on the other end to the suspension 8 which leads to the slider 7 toward the tip. The support section 6 is driven by a linear motor (not shown) to guide the optical pickup 4 and the slider 7 to a predetermined position of the disk 1. This brings about integral movement of the transparent stabilizing board 5 and the slider 7 which are linked to the optical pickup 4.

The slider 7, supported by the suspension 8 and provided opposite the transparent stabilizing board 5 via the disk 1, can oscillate relative to the support section 6 in a vertical direction with respect to the surface of the disk 1. The surface of the slider 7 facing the transparent stabilizing board 5 is flat. When recording or reproducing information with respect to the disk 1, i.e., during rotation of the disk 1, the rotation of the disk 1 induces an air flow between the disk 1 and the slider 7, with the result that the air pressure between the slider 7 and the disk 1 is increased because the surface of the slider 7 facing the disk 1 is flat. That is, pressure is created between the slider 7 and the disk 1. In the same manner, rotation of the disk 1 also induces an air flow between the disk 1 and the transparent stabilizing board 5 to create pressure therebetween. In addition, the slider 7 is supported to oscillate. Thus, the slider 7 can be moved to balance out the air pressure between the disk 1 and the transparent stabilizing board 5 with that between the slider 7 and the disk 1.

By this pressure-induced state and balancing of it between (1) the slider 7 and the disk 1 and (2) the transparent stabilizing board 5 and the disk 1, the disk 1 rotates at a predetermined distance from the slider 7 and the transparent stabilizing board 5. This suppresses fluttering of the disk 1 when it is rotating, thereby stabilizing rotation of the disk 1.

Note that, when the surface of the slider 7 facing the transparent stabilizing board 5 is flat as in the foregoing case, the rotation of the disk 1 induces an air flow between the disk 1 and the slider 7 to create pressure therebetween. However, the pressure between the slider 7 and the disk 1 is reduced when the surface of the slider 7 facing the transparent stabilizing board 5 has a groove which acts to drain the air out of the gap between the slider 7 and the disk 1 when the disk is rotating.

Generally, recording and reproducing of information with respect to the disk 1 employ a focus control which keeps the laser beam 11 in focus by maintaining a constant distance between the disk 1 and the objective lens 12, so that the recording medium 1b of the disk 1 is always within a depth of focus of the objective lens 12.

Figure 52:
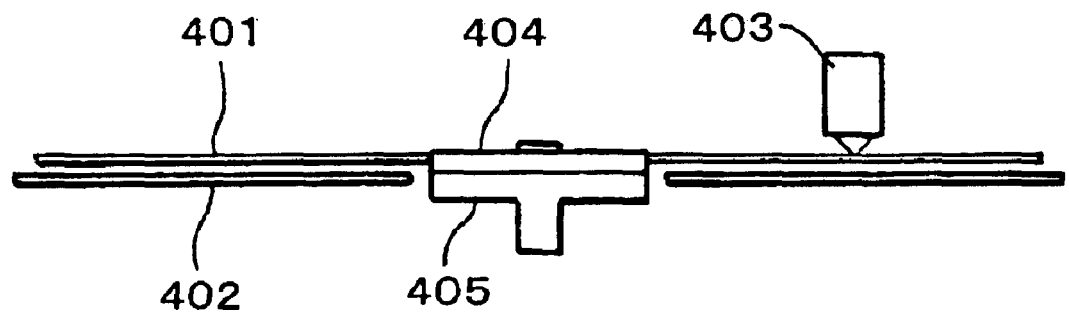
FIG. 52 is a cross sectional view showing a structure of relevant part of a conventional recording and reproducing device.
Figure 53:
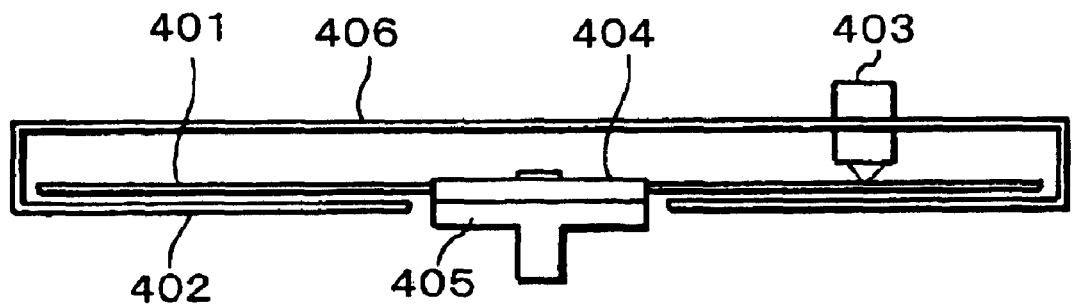
FIG. 53 is a cross sectional view showing a structure of relevant part of a recording and reproducing device using a conventional cartridge.
Figure 54:
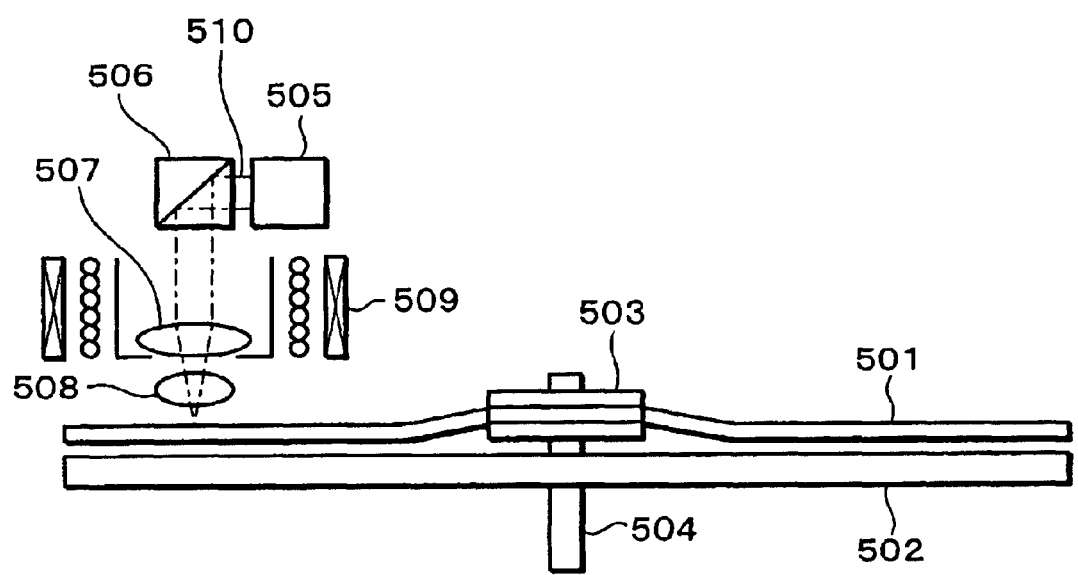
FIG. 54 is a cross sectional view showing how light is projected in the recording and reproducing device of FIG. 52.

Here, as shown in FIG. 52, when a disk 401 and an optical pickup 403 are directly face to face with nothing in between, the surface of the optical pickup 403 facing the disk 401 makes up a surface with focusing means such as an objective lens, for example. Such a surface has relatively large irregularities, which cause the pressure to fluctuate around the focusing means every time the focusing means is moved during the focus control. Thus, the air pressure between the focusing means and the disk 401 easily fluctuates with the result that the disk 401 flutters in response to the movement of the focusing means.

However, according to the arrangement as shown in FIG. 1, since the transparent stabilizing board 5 is placed between the disk 1 and the objective lens 12, the surface of the optical pickup 4 facing the disk 1 becomes flat by the flat surface of the transparent stabilizing board 5. As a result, the air pressure between the flat surface of the transparent stabilizing board 5 and the disk 1 becomes evenly distributed. This suppresses fluctuation of air pressure between the transparent stabilizing board 5 and the disk 1 even when, for example, the objective lens 12 is moved to carry out the focus control, thus suppressing fluttering of the disk 1.

Further, because the slider 7 is supported in such a way that it can oscillate in a vertical direction with respect to the disk 1, fluctuation of air pressure between the disk 1 and the transparent stabilizing board 5, which may be caused, for example, when the optical pickup 4 with the objective lens 12 is moved during the focus control, can be compensated for by varying the air pressure between the disk 1 and the slider 7 in such a manner that it is balanced with the air pressure between the disk 1 and the transparent stabilizing board 5.

Thus, even in cases where the objective lens 12 is moved relative to the disk 1, or the transparent stabilizing board 5 is moved with the optical pickup 4, the slider 7 accommodates this movement to follow the disk 1, so as to balance air pressure between the disk 1 and the transparent stabilizing board 5 with that between the disk 1 and the slider 7. Further, since the surface of the slider 7 facing the disk 1 is flat, the air pressure between the slider 7 and the disk 1 can be balanced easily and stably. As a result, it is possible to suppress displacement of the disk 1 in a vertical direction due to pressure fluctuation around the disk 1, i.e., fluttering of the disk 1 can be suppressed. This makes it possible to stably and easily carry out a focus control, or tracking of the disk 1 with the laser beam 11 in the track direction, even when the biaxial actuator 14 employing the conventional servo technique is used.

As a result, rotation of the disk 1 can be stabilized even when the objective lens 12 or the optical pickup 4 is moved, thus providing a recording and reproducing device which is capable of recording and reproducing information stably and desirably even when the disk 1 is a thin disk. Further, with a thin disk, the optical path length in the disk 1 can be made shorter, which increases a margin or error for a tilt of the disk 1. As a result, recording density of the disk 1 can be increased.

Note that, not limiting to the optical disk, the disk 1 may be, for example, a magneto-optical disk which uses a magneto-optical recording medium as the recording medium 1b.

Figure 3:
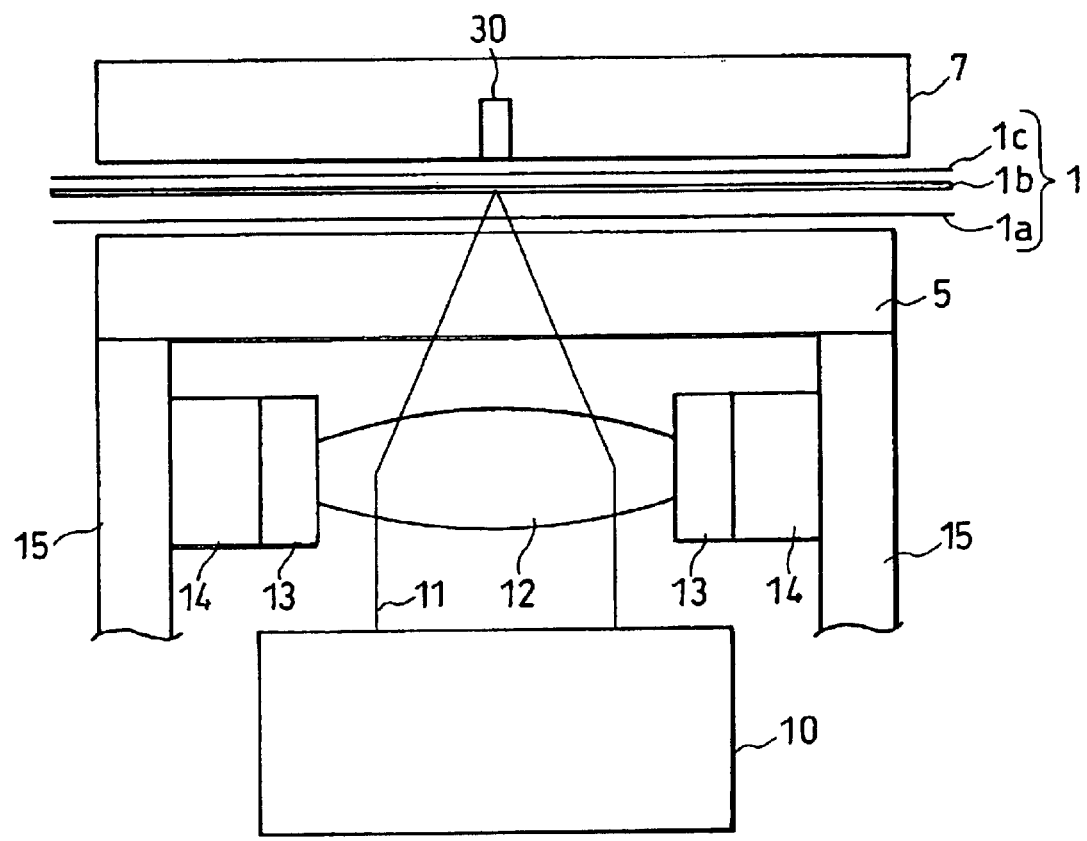
FIG. 3 is an enlarged cross sectional view showing the structure of relevant part of the recording and reproducing device of FIG. 1 when a magneto-optical disk is used.

Referring to FIG. 3, the following describes an example of a recording and reproducing device which uses a magneto-optical disk as the disk 1 to record and reproduce information. Recording of information on a magneto-optical disk requires a recording magnetic field. A recording magnetic field needs to be applied to an area where the laser beam 11 is focused. To this end, a magnetic head (magnetic field generating element) 30 is embedded in the slider 7. The structure of the recording and reproducing device other than the slider 7 which is integrally provided with the magnetic head 30 is as already described with reference to FIG. 2.

When recording information in the disk 1, the laser beam 11 projected on the disk 1 raises temperature of the recording medium 1b which is provided on the disk substrate 1a, thereby reducing coercive force of the recording medium 1b. Here, the magnetic field generated by the magnetic head 30 is applied to the disk 1.

The laser beam 11 emitted from the light emitting and detecting optical system 10 is converged by the objective lens 12 in the optical pickup 4 to irradiate the disk 1. The coercive force of the disk 1 is reduced in the foregoing manner, and the magnetic field generated by the magnetic head 30 changes the magnetization direction of the disk 1. Here, the magnetic head 30 and the optical pickup 4 are driven integrally. Information is recorded in the disk 1 in this manner.

In this way, the provision of the magnetic head 30 in the slider 7 can realize a recording and reproducing device which can record and reproduce information using a magneto-optical disk with a recording medium which requires a magnetic field for recording.

As in the structure of FIG. 2, the structure shown in FIG. 3 also includes the transparent stabilizing board 5, as well as the slider 7 which is provided opposite the transparent stabilizing board 5 via the disk 1. Thus, pressure fluctuation around the disk 1 and the optical pickup 4 can be suppressed even when the objective lens 12 or the optical pickup 4 provided with the objective lens 12 is moved. This stabilizes rotation of the disk 1 and thus provides a recording and reproducing device which can stably and desirably record and reproduce information even when the disk 1 is a thin disk.

Further, the objective lens 12 is not just limited to a simple lens as shown in FIG. 2, and it may be a dual lens which incorporates at least two lenses. For example, FIG. 4 shows an exemplary structure of the recording and reproducing device of FIG. 1, in which a dual lens composed of two lenses is used as the objective lens 12.

The dual lens as the objective lens 12 includes a lens 40 and a lens 41. This increases numerical aperture NA of the objective lens 12. Specifically, with the use of the dual lens, the numerical aperture NA of the objective lens 12 can be increased to 0.7 or greater, preferably 0.8 to 0.95. This makes it possible to reduce the spot size of the laser beam 11 projected on the disk 1, which in turn increases the recording capacity of the disk 1, and thus density of the disk 1. As a result, the recording and reproducing device which is suitable for high density recording and reproducing can be provided.

The numerical aperture NA of the objective lens 12 can also be increased using a simple lens. However, the use of the dual lens allows the objective lens 12 to be manufactured with large numerical aperture NA. Thus, the dual lens is preferable for the objective lens 12 when the numerical aperture NA is to be increased to 0.7 or greater as in the present embodiment.

Figure 4:
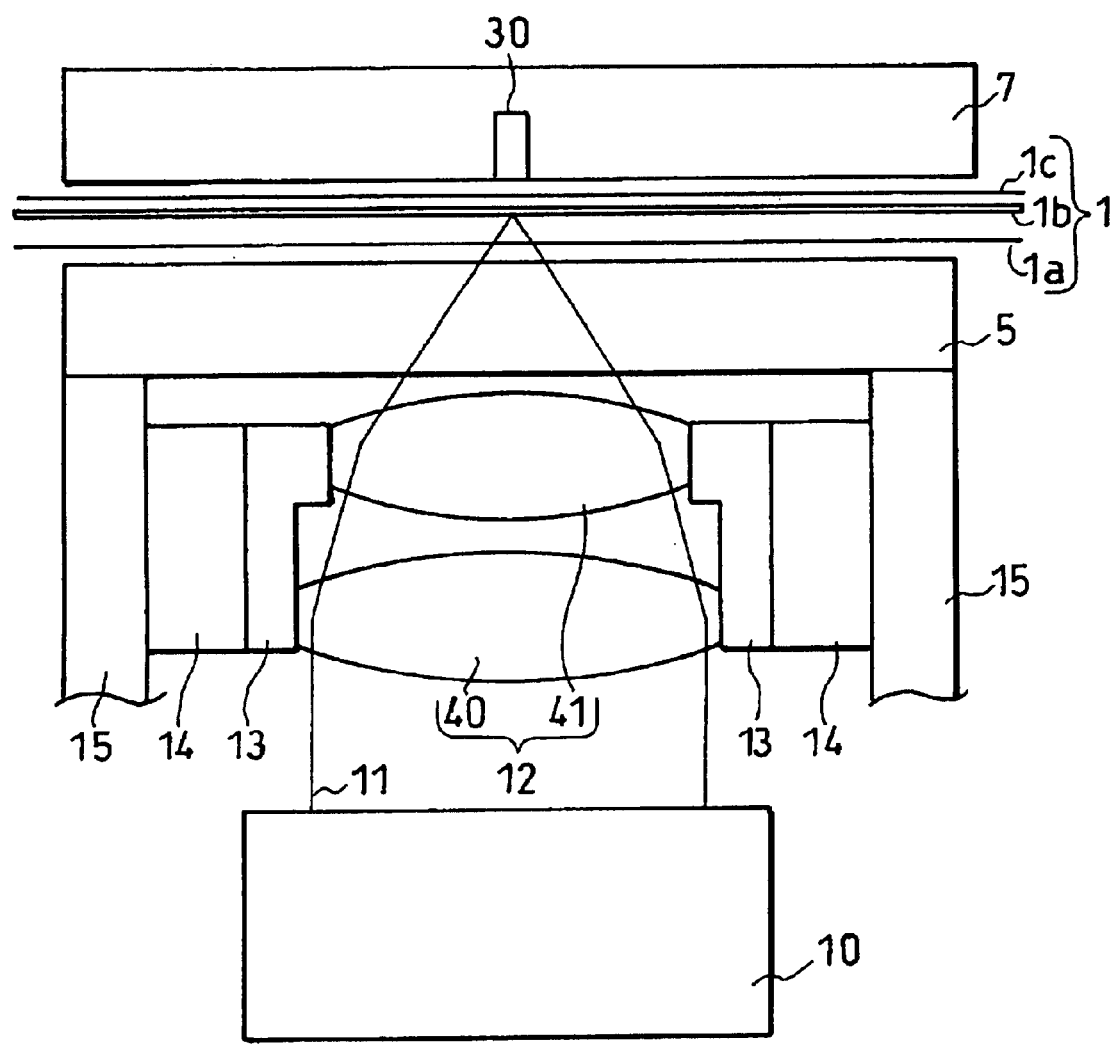
FIG. 4 is an enlarged cross sectional view showing the structure of relevant part of the recording and reproducing device of FIG. 1 when a dual lens is used.

Note that, the structure of FIG. 4 includes the magnetic head 30 and uses a magneto-optical disk as the disk 1.

However, an optical disk may be used as well. In this case, the magnetic head 30 is not required.

Figure 5:
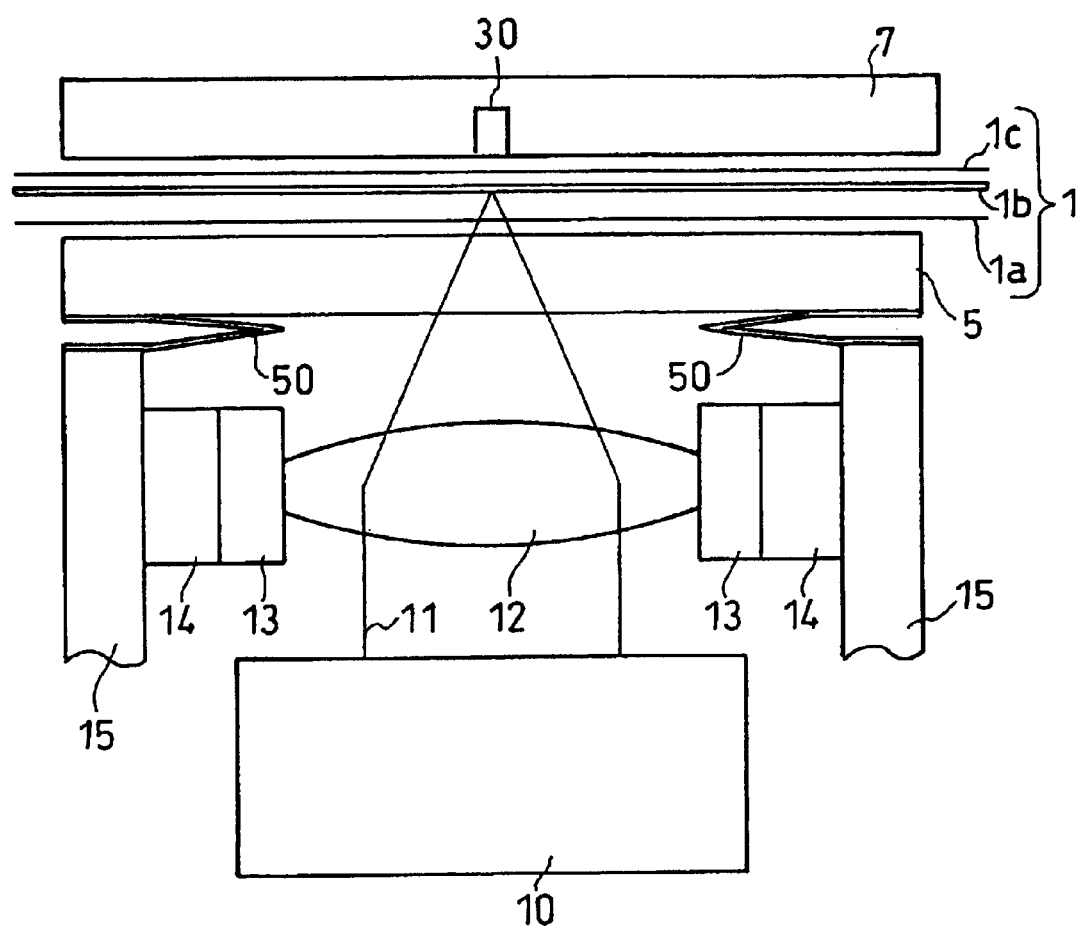
FIG. 5 is an enlarged cross sectional view showing the structure of relevant part of the recording and reproducing device of FIG. 1 when a transparent stabilizer is fixed on an optical pickup via a spring.

Further, as shown in FIG. 5, the transparent stabilizing board 5 may be fixed to the optical pickup 4 via a board spring 50 (elastic member). FIG. 5 shows the structure of the recording and reproducing device of FIG. 3, with the additional member board spring 50 between the transparent stabilizing board 5 and the optical pickup 4.

As shown in FIG. 5, the transparent stabilizing board 5 is fixed on the optical pickup casing 15 via the board spring 50. According to the structure of FIG. 5, even when the slider 7 oscillates in response to external force and the disk 1 oscillates by the pressure created between the disk 1 and the slider 7 in response to this oscillation of the slider 7, the transparent stabilizing board 5 can follow the oscillation of the disk 1 by the stretch and compression of the board spring 50 to balance out the air pressure between the disk 1 and the transparent stabilizing board 5 with that between the disk 1 and the slider 7.

Thus, it is possible to prevent damage to the disk 1 which may be caused by a collision between the disk 1 and the transparent stabilizing board 5 due to external oscillation.

Note that, the board spring 50 is not just limited to a spring as long as it is elastic. For example, materials such as rubber or foamed resin may be used instead. Here, as the term is used, "spring" may be any elastic body. The spring is preferable because it has a large stroke in response to a load.

[Second Embodiment]

The following will describe another embodiment of the present invention. Note that, constituting elements having the same functions as those described in the First Embodiment are given the same reference numerals and explanations thereof are omitted here.

Figure 6:
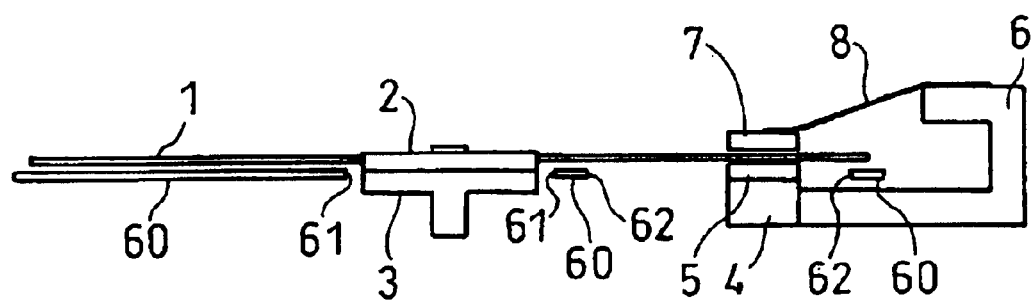
FIG. 6 is a cross sectional view showing a structure of relevant part of a recording and reproducing device according to another embodiment of the present invention.
Figure 7:
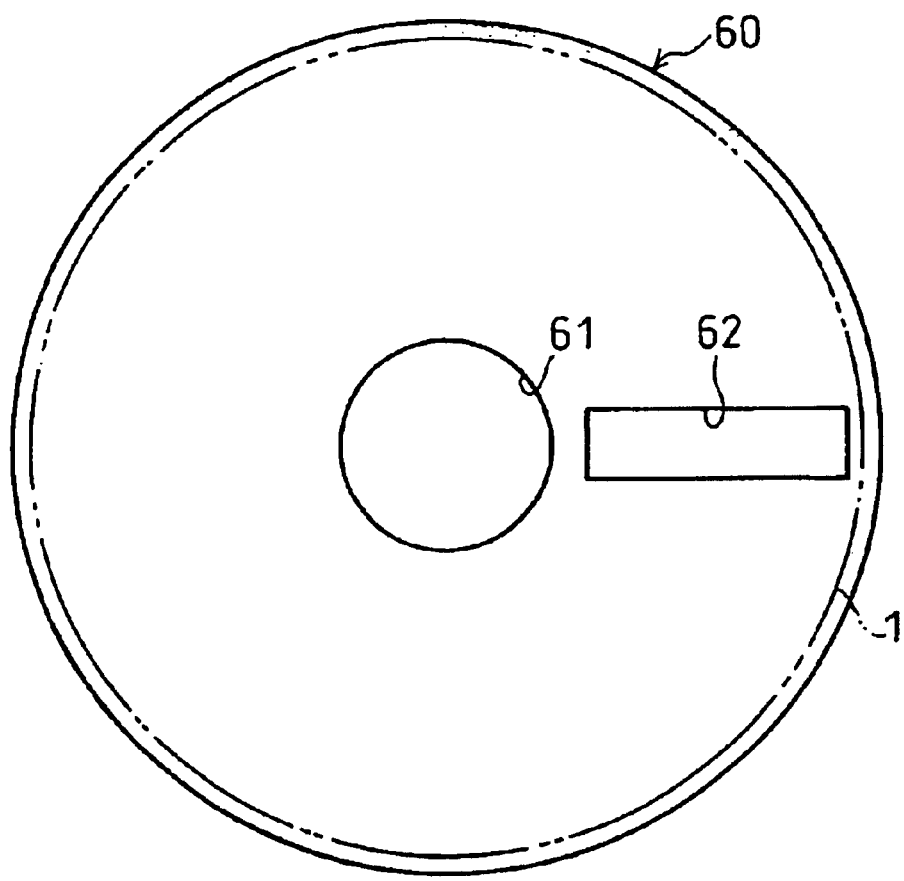
FIG. 7 is a plan view of a stabilizer.

FIG. 6 is a cross sectional view showing a relevant portion of a recording and reproducing device according to the present embodiment, in which a stabilizing board (second stabilizing board) 60 is added to the structure of FIG. 1. FIG. 7 is a plan view of the stabilizing board 60. Note that, the cross section of FIG. 6 showing a relevant portion of the recording and reproducing device is taken along the central line in the radial direction of the stabilizing board 60 at a second opening 62.

The stabilizing board 60 is larger than the transparent stabilizing board 5, and, for example, in the form of a circle slightly larger than the disk 1, as shown in FIG. 7. Further, the stabilizing board 60 has a first opening 61 for chucking a center hub 2 of the disk 1 to a spindle 3, and the second opening 62 which is used to position an optical pickup 4 with a transparent stabilizing board 5 in the vicinity of the disk 1. Further, the stabilizing board 60 in the recording and reproducing device is fixed at such a position that it is opposite the disk 1 and can create a space of reduced pressure between the disk 1 and the stabilizing board 60 when the disk 1 rotates.

By thus providing the stabilizing board 60 larger than and separately from the slider 7 or the transparent stabilizing board 5 at a position opposite and in the vicinity of the disk 1, air flows out from the outer periphery of the stabilizing board 60 when the disk 1 is rotating, which reduces air pressure between the stabilizing board 60 and the disk 1. Here, the disk 1, by being flexible, is drawn to the stabilizing board 60 and rotates at a constant distance from the stabilizing board 60.

Thus, the addition of the stabilizing board 60 can further stabilize rotation of the disk 1, compared with the case where rotation of the disk 1 is stabilized by providing only the transparent stabilizing board 5 and the slider 7, which are smaller than the stabilizing board 60 and are provided within the domain of the second opening 62 to balance the pressure which is created by the air flowing into the space between the transparent stabilizing board 5 and the disk 1 and between the slider 7 and the disk 1 when the disk 1 rotates. Thus, it is possible to more effectively suppress fluttering of the disk 1 when the disk 1 is rotating, and to stabilize rotation of the disk 1 at a position distanced from the slider 7 and the transparent stabilizing board 5, which are moved, for example, during the focus control.

Thus, in the focus control, because the rotation of the disk 1 is stabilized even at a distant position from the transparent stabilizing board 5 and the slider 7, the disk 1 is less influenced by the pressure fluctuation which may be caused, for example, when the transparent stabilizing board 5 and the slider 7 are moved with the optical pickup 4 to balance the air pressure between the disk 1 and the transparent stabilizing board 5 with that between the disk 1 and the slider 7. As a result, fluttering of the disk 1 is suppressed more effectively. This brings stable and easy focus control or tracking even when the biaxial actuator 14 using the conventional servo technique is used, thus providing the recording and reproducing device which can record and reproduce information more stably and more desirably.

Note that, in order to create a space of reduced pressure between the disk 1 and the stabilizing board 60 to attain stable rotation of the disk 1, the distance between the disk 1 and the stabilizing board 60 is preferably not less than $10\,\mu m$ and not more than $200\,\mu m$.

Further, the optical pickup 4 with the transparent stabilizing board 5 provided below the disk 1 and the slider 7 provided above the disk 1 may be switched in their positions with respect to the disk 1. In the case where the slider 7 is below the disk 1 (on the side of the stabilizing board 60 of the disk 1), the second opening 62 of the stabilizing board 60 makes up an opening which is used to position the slider 7 in the vicinity of the disk 1.

Figure 8:
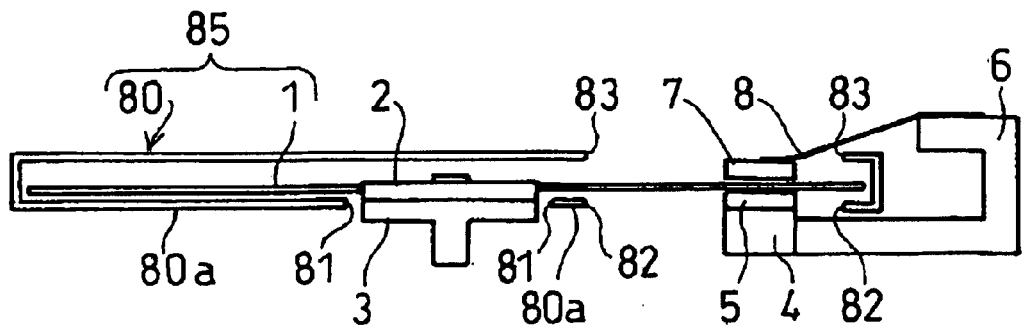
FIG. 8 is a cross sectional view showing the structure of relevant part of the recording and reproducing device of another embodiment of the present invention when both inner walls of the cartridge define the stabilizer.

Further, as shown in FIG. 8, the stabilizing board 60 may be defined by an inner wall surface of a cartridge 80 which contains the disk 1.

FIG. 8 is a cross sectional view showing a structure of relevant part of the recording and reproducing device of FIG. 1, when it is operated to record and reproduce information with respect to the disk 1 contained in a disk cartridge 85. Here, the disk cartridge 85 refers to the cartridge 80 containing the disk 1 therein. As shown in FIG. 8, the lower surface of the cartridge 80 (the surface of the cartridge 80 facing the disk 1 on the side of the optical pickup 4) makes up a stabilizing section 80a which is provided as the stabilizing board 60. That is, the lower surface of the cartridge 80 serves as the stabilizing board 60. Note that, the cross section of relevant part of the recording and reproducing device shown in FIG. 8 is taken along the central line in the radial direction of the disk 1 at a second opening 82 as shown in FIG. 9.

The stabilizing section 80a has a first opening section 81 for chucking the center hub 2 of the disk 1 to the spindle 3, and the second opening 82 which is used to position the optical pickup 4 with the transparent stabilizing board 5 in the vicinity of the disk 1. Further, the upper surface of the cartridge 80 (the surface of the cartridge 80 facing the disk 1 on the side of the slider 7) has a third opening 83 which is used to position the slider 7 in the vicinity of the disk 1 at a position opposite the second opening 82.

Figure 9:
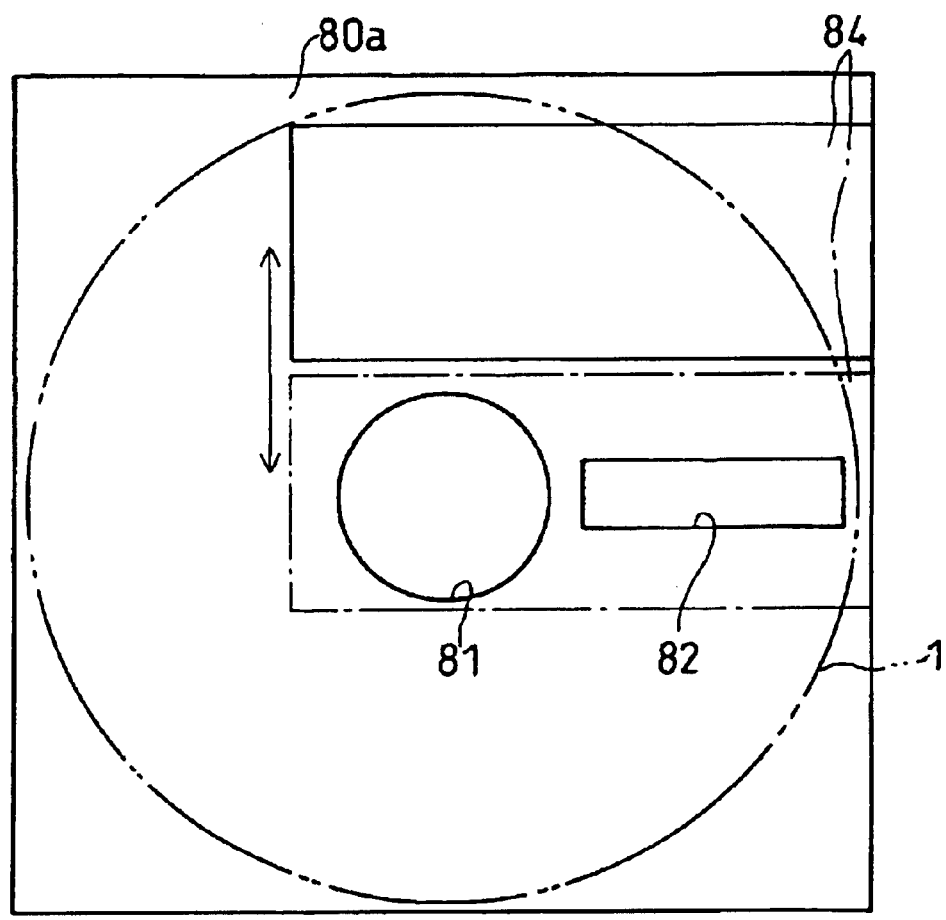
FIG. 9 is a plan view of the cartridge.

Further, FIG. 9 is a plan view showing the cartridge 80 as viewed from the side of the optical pickup 4, i.e., from below the cartridge 80. As shown in FIG. 9, the cartridge 80 further includes a slide shutter 84 which can be opened or closed in the directions of arrows, capable of covering the first opening 81 and the second opening 82. The slide shutter 84 is open when the first opening 81 and the second opening 82 are used during rotation of the disk 1, whereas it is closed when the cartridge 80 containing the disk 1 is taken out of the recording reproducing device.

Further, on the upper face of the cartridge 80 is provided a slide shutter (not shown) for covering the third opening 83. This slide shutter is also open when the third opening 83 is used, whereas it is closed when the cartridge 80 containing the disk 1 is taken out of the recording and reproducing device. This is to protect the disk 1 from dusts.

The lower face of the cartridge 80 makes up the stabilizing section 80a which serves as the stabilizing board 60. That is, one of inner wall surfaces of the cartridge 80 makes up the stabilizing board 60. Thus, a space of reduced pressure is created between the disk 1 and the stabilizing section 80a when the disk 1 is rotating. The disk 1, being flexible, is drawn to the stabilizing section 80a and rotates at a constant distance from the stabilizing section 80a. This suppresses fluttering of the disk 1 further effectively when the disk 1 is rotating, and rotation of the disk 1 can be stabilized at a distant position from the slider 7 and the transparent stabilizing board 5.

Thus, in the focus control, because the rotation of the disk 1 is stabilized even at a distant position from the transparent stabilizing board 5 and the slider 7, the disk 1 is less influenced by the pressure fluctuation which may be caused, for example, when the transparent stabilizing board 5 and the slider 7 are moved with the optical pickup 4 to balance the air pressure between the disk 1 and the transparent stabilizing board 5 with that between the disk 1 and the slider 7. As a result, fluttering of the disk 1 is suppressed more effectively, thus providing the recording and reproducing device which can record and reproduce information more stably and more desirably.

Further, since the lower face of the cartridge 80 makes up the stabilizing section 80a to serve as the stabilizing board 60, rotation of the disk 1 can be stabilized without adding a new member as the stabilizing board 60.

Note that, as in the foregoing example, the optical pickup 4 with the transparent stabilizing board 5 provided below the disk 1 and the slider 7 provided above the disk 1 may be switched in their positions with respect to the disk 1. When the slider 7 is below the disk 1 (on the side of he stabilizing board 80a), the second opening 82 of the cartridge 80 becomes an opening which is used to position the slider 7 in the vicinity of the disk 1, and the third opening 83 becomes an opening which is used to position the optical pickup 4 with the transparent stabilizing board 5 in the vicinity of the disk 1.

Figure 10:
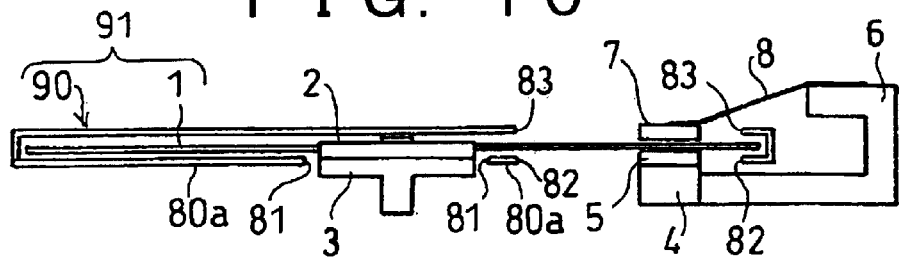
FIG. 10 is a cross sectional view showing another structure of the recording and reproducing device of FIG. 8 when a space inside a disk cartridge is restricted.

Referring to FIG. 10, the following will describe a recording and reproducing device in which the stabilizing board 60 is defined by the both inner wall surfaces of a cartridge 90 containing the disk 1.

The recording and reproducing device shown in FIG. 10 has the same structure as that of FIG. 8 except for a disk cartridge 91, which is provided instead of the disk cartridge 85 to contain the disk 1.

As with the cartridge 80, the lower face of the cartridge 90 has the stabilizing section 80a as shown in FIG. 9, as well as the first opening 81, the second opening 82, the third opening 83, and the slide shutter 84. Further, as with the cartridge 80, the upper face of the cartridge 90 has a slide shutter (not shown) covering the third opening 83. This protects the disk 1 from dusts.

Further, the cartridge 90 differs from the cartridge 80 of FIG. 8 in that the width of the cartridge 90 across the surface of the cartridge 90 facing the disk 1 on the side of the slider 7 (hereinafter referred to as upper surface of the cartridge 90) and the surface of the cartridge 90 facing the disk 1 on the side of the optical pickup 4 (hereinafter referred to as lower surface of the cartridge 90), i.e., a distance between the inner wall surfaces of the cartridge 90 centered by the disk 1, is restricted within such a range which enables the cartridge 90 to serve as the stabilizing board 60.

That is, in order for the upper and lower surfaces of the cartridge 90 respectively facing the disk 1 to serve as the stabilizing board 60, the upper and lower surfaces of the cartridge 90 need to be positioned in such a manner that a space of reduced pressure is created above and below the disk 1 between the upper and lower surfaces of the cartridge 90.

Specifically, it is preferable that the distance between the disk 1 and the upper surface of the cartridge 90 and the distance between the disk 1 and the lower surface of the cartridge 90 are each not less than 10 $\mu$m and not more than 200 $\mu$m.

A distance of not less than 10 $\mu$m between the disk 1 and each surface of the cartridge 90 facing the disk 1 prevents a collision between the disk 1 and the cartridge 90, which may be caused by external influence such as oscillation, and thus prevents the disk 1 from being scratched.

Further, a distance of not more than 200 $\mu$m between the disk 1 and each surface of the cartridge 90 facing the disk 1 makes the disk 1 less susceptible to external influence such as oscillation. That is, because the space inside the cartridge 90 is restricted, the influence of external oscillation on the state of reduced pressure between the disk 1 and the upper and lower surfaces of the cartridge 90 becomes less. Thus, it is possible to suppress fluttering of the disk 1 in the cartridge 90, which is caused when rotation of the disk 1 in the cartridge 90 becomes instable in response to external force, for example, by oscillation. As a result, rotation of the disk 1 can be stabilized.

The foregoing restriction of the space within the cartridge 90 enables the upper and lower surfaces of the cartridge 90 respectively facing the disk 1 to function as the stabilizing board 60. That is, the state of reduced pressure between the disk 1 and the cartridge 90 is stabilized, and the disk 1 becomes less susceptible to external influence such as oscillation. This prevents fluttering of the disk 1 in the cartridge 90, thus stably rotating the disk 1. Further, the disk 1 is prevented from colliding with the upper or lower surface of the cartridge 90, thus preventing a scratch on a surface of the disk 1.

Thus, the recording and reproducing device provided with the cartridge 90 can stabilize rotation of the disk 1 at a distant position from the slider 7 and the transparent stabilizing board 5, when, for example, the transparent stabilizing board 5 and the slider 7 are moved with the optical pickup 4. As a result, recording and reproducing can be carried out more stably and more desirably.

Further, since the stabilizing board 60 is defined by the upper and lower surfaces of the cartridge 90, rotation of the disk 1 can be stabilized more effectively without introducing a new member as the second stabilizing board 60.

Further, the stable rotation of the disk 1 allows the use of a thinner disk for the disk 1. Here, in order for the disk 1 to be effectively flexible, the thickness of the disk 1 is preferably not less than 30 μm and not more than 400 μm. Since the disk 1 is flexible, a thickness less than 30 μm makes it difficult to maintain sufficient strength for the disk 1 to withstand rotation. On the other hand, a thickness of the disk 1 exceeding 400 μm makes the disk 1 less flexible, which prevents the disk 1 from being drawn to the stabilizing section 80a even with the presence of a space of reduced pressure between the disk 1 and the stabilizing section 80a. As a result, the effect of suppressing fluttering of the disk 1 becomes less effective.

According to the foregoing First and Second Embodiments, a recording and reproducing device of the present invention includes a light source, focusing means for converging and projecting a laser beam which was emitted from the light source on a disk, and rotation driving means for rotating the disk, the recording and reproducing device comprising: a first stabilizing board, provided between the disk and the focusing means, which is moved with the focusing means, for example, such as an objective lens; and a slider which is disposed to face the first stabilizing board via the disk and supported to oscillate, a surface of the slider facing the disk being flat.

According to this arrangement, when recording or reproducing information with respect to the disk, i.e., when rotating the disk, the rotation of the disk causes air to flow into the space between the disk and the slider, which increases the air pressure between the disk and the slider because the surface of the slider facing the disk is flat. That is, pressure is created between the disk and the slider. In the same manner, the rotation of the disk causes air to flow into the space between the disk and the first stabilizing board, which creates pressure between the disk and the first stabilizing board. Further, the slider is supported to oscillate. This enables the slider to move to such a position that the air pressure between the disk and the first stabilizing board and that between the slider and the disk balance out.

Balancing the pressure between the slider and the disk with that between the first stabilizing board and the disk in this manner enables the disk to rotate at a constant distance from the slider and the first stabilizing board. As a result, fluttering of the rotating disk can be suppressed, thus stabilizing rotation of the disk.

If it is assumed here that the first stabilizing board is not provided and the disk and the focusing means are disposed face to face with nothing in between, the focusing means, when it is driven on the optical pickup for example, makes up the surface of the optical pickup facing the disk. Therefore, this surface of the optical pickup has relatively large irregularities. The result of this is that the pressure around the focusing means fluctuates every time the focusing means is moved, which easily changes the air pressure between the focusing means and the disk. Thus, the disk flutters when the focusing means is moved.

However, by providing the first stabilizing board which moves with the focusing means between the disk and the focusing means, the surface on the side of the focusing means facing the disk becomes flat, which creates uniform air pressure between this flat surface and the disk. As a result, it is possible to suppress fluctuation of air pressure between the first stabilizing board and the disk and thus fluttering of the disk, for example, even when the focusing means is moved to carry out a focus control.

Further, because the slider is supported to oscillate in a vertical direction with respect to the disk, the air pressure between the disk and the slider can be changed so that the air pressure between the disk and the first stabilizing board is balanced with that between the disk and the slider, even when the air pressure between the disk and the first stabilizing board is caused to fluctuate, for example, by the movement of the optical pickup with the focusing means during a focus control.

Thus, even when the focusing means and thus the first stabilizing board is moved relative to the disk, the movement is accompanied by the movement of the slider relative to the disk, so as to balance the air pressure between the disk and the first stabilizing board with that between the disk and the slider. The air pressure can be balanced easily and stably because the surface of the slider facing the disk is also flat. As a result, it is possible to suppress vertical displacement of the disk, i.e., fluttering of the disk, which is caused by fluctuation of pressure around the disk, thus stably and easily carrying out a focus control and tracking, for example.

Thus, the disk can be stably rotated even when the focusing means or the optical pickup with the focusing means is moved, thereby providing a recording and reproducing device which can record and reproduce information stably and desirably even with a thin disk. Further, the use of a thin disk means a shorter optical path in the disk, which makes it possible to provide a large margin of error for a tilt of the disk. As a result, recording density of the disk can be increased.

It is preferable in the recording and reproducing device that the first stabilizing board is fixed to the focusing means via an elastic member having elasticity.

According to this arrangement, even when the slider oscillates due to external force and the disk is oscillated by the pressure created between the disk and the slider, the elastic member stretches or compresses to enable the first stabilizing board to follow the oscillating disk, so as to balance the air pressure between the disk and the first stabilizing board with that between the disk and the slider. As a result, it is possible to prevent damage to the disk, which is caused when the disk collides with the first stabilizing board in response to external oscillation.

In the recording and reproducing device, it is preferable that the focusing means is a complex lens composed of at least two lenses.

This arrangement makes it possible to increase numerical aperture NA of the focusing means, and thus to reduce the spot size of a laser beam projected on the disk. As a result, recording capacity of the disk, and thus recording density of the disk can be increased, thus providing a recording and reproducing device which is suitable for high-density recording and reproducing.

In the recording and reproducing device, it is preferable that the slider includes a magnetic field generating element for generating a magnetic field.

According to this arrangement, the slider with a magnetic field generating element makes it possible to provide a recording and reproducing device which can record and reproduce information using a magneto-optical disk incorporating a recording medium which requires a magnetic field for recording.

It is preferable in the recording and reproducing device that the first stabilizing board is transparent.

According to this arrangement, since the first stabilizing board is transparent, a laser beam emitted from the light source can pass through the first stabilizing board without providing, for example, an opening in the first stabilizing board for passing the laser beam, even though the first stabilizing board is provided between the disk and the focusing means.

It is preferable that the recording and reproducing device further includes a second stabilizing board which is disposed to face the disk and to create a space of reduced pressure between the disk and the second stabilizing board when the disk is rotating. Note that, the second stabilizing board may be provided to face either side of the disk.

According to this arrangement, since the second stabilizing board is separately provided from the slider in the vicinity of the disk and opposite the disk, rotation of the disk can create a space of reduced pressure between the disk and the second stabilizing board. Here, the disk is drawn toward the second stabilizing board and rotates at a constant distance from the second stabilizing board, thereby suppressing fluttering of the disk and stabilizing rotation of the disk even at a location where the disk is distanced from the slider or the first stabilizing board.

Thus, the disk stably rotates even at a distant position from the first stabilizing board or slider, despite that the first stabilizing board and the slider are moved to balance the air pressure between the disk and the first stabilizing board with that between the disk and the slider, for example, in response to the movement of the optical pickup with the focusing means. Thus, the disk is not influenced by the pressure fluctuation which is caused by the movement of the first stabilizing board and the slider, thus suppressing fluttering of the disk more effectively. As a result, it is possible to provide a recording and reproducing device which can record and reproduce information more stably and more desirably.

It is preferable in the recording and reproducing device that the second stabilizing board has an opening which is used to position the slider or the first stabilizing board in the vicinity of the disk when recording or reproducing information.

According to this arrangement, since the slider or the first stabilizing board can be positioned in the vicinity of the disk during recording or reproducing, the pressure between the disk and the slider and the pressure between the disk and the first stabilizing board can be balanced more stably.

In a disk cartridge of the present invention which contains a disk in a cartridge used in the recording and reproducing device, the disk being exposed from the disk cartridge when recording or reproducing information, one of inner wall surfaces of the cartridge defines the second stabilizing board of the disk.

According to this arrangement, since the second stabilizing board is defined by one of inner wall surfaces of the cartridge, a space of reduced pressure is created between the disk and this inner wall surface during rotation of the disk. Here, the disk is drawn toward the inner wall surface of the cartridge and rotates at a constant distance from this inner wall surface. As a result, fluttering of the disk can be suppressed, and the disk can be rotated more stably at a position distanced from the slider and the first stabilizing board.

Thus, the disk stably rotates even at a position distanced from the first stabilizing board or slider, despite that the first stabilizing board and the slider are moved to balance the air pressure between the disk and the first stabilizing board with that between the disk and the slider, for example, in response to the movement of the optical pickup with the focusing means. Thus, the disk is not influenced by the pressure fluctuation which is caused by the movement of the first stabilizing board and the slider, thus suppressing fluttering of the disk more effectively. As a result, it is possible to provide a recording and reproducing device which can record and reproduce information more stably and more desirably.

Further, since the second stabilizing board is defined by one of inner wall surfaces of the cartridge, the second stabilizing board, for stabilizing rotation of the disk, can be provided without introducing an additional member.

In a disk cartridge of the present invention which contains a disk in a cartridge, the disk being exposed from the cartridge when recording or reproducing information, the cartridge has inner wall surfaces which define a second stabilizing board which is disposed to face the disk and to create a space of reduced pressure between the disk and the second stabilizing board when the disk is rotating.

According to this arrangement, since the second stabilizing board is defined by the both inner wall surfaces of the cartridge, a space of reduced pressure is created between the disk and the both inner wall surfaces of the cartridge during rotation of the disk. Here, the disk rotates at a constant distance from the both inner wall surfaces of the cartridge, thus suppressing fluttering of the disk.

Further, since the second stabilizing board is defined by the both inner wall surfaces of the cartridge, the second stabilizing board, for stabilizing rotation of the disk, can be provided without introducing an additional member.

Specifically, it is preferable that a distance between the disk and each inner wall surface of the disk cartridge is not less than 10 $\mu$m and not more than 200 $\mu$m.

According to this arrangement, by the distance between the disk and each inner wall surface of the cartridge not less than 10 $\mu$m, the disk is prevented from colliding with the cartridge in response to external influence such as oscillation, thus preventing a scratch on the disk.

Further, by the distance between the disk and each inner wall surface of the cartridge not more than 200 $\mu$m, the disk becomes less susceptible to external influence such as oscillation. That is, since the space inside the cartridge is restricted, there is less pressure fluctuation in the cartridge. Therefore, the space of reduced pressure between the disk and the inner wall surfaces of the cartridge will not be interfered even in the presence of external oscillation. Thus, rotation of the disk in the cartridge will not become instable even in the presence of external influence such as oscillation, thus preventing fluttering of the disk in the cartridge. In effect, rotation of the disk can be stabilized.

It is preferable in the disk cartridge that the inner wall surfaces of the cartridge have an opening through which the disk is exposed when recording or reproducing information, and which is used to position a first stabilizing board and a slider in a vicinity of the disk, the first stabilizing board being disposed between focusing means the disk used in a recording and reproducing device, the first stabilizing board being moved with the focusing means, and the slider being disposed to face the first stabilizing board via the disk and supported to oscillate, a surface of the slider facing the first stabilizing board being flat.

According to this arrangement, the opening on the both inner wall surfaces of the cartridge can be used to position the slider and the first stabilizing board in the vicinity of the disk. Further, during rotation of the disk, air flows in between the disk and the slider and between the disk and the first stabilizing board, which creates a space of reduced pressure between the disk and the slider and between the disk and the first stabilizing board. Thus, because the first stabilizing board and the slider for balancing the pressure to stably rotate the disk are positioned in the vicinity of the disk, the pressure between the disk and the slider and the pressure between the disk and the first stabilizing board can be balanced more stably.

The present invention is applicable to any disk, irrespective of whether the disk is flexible or not. However, the present invention is especially effective for a flexible optical disk. That is, in view of the fact that a flexible disk is more likely to flutter than an inflexible disk at the same rotational speed, the present invention, which is intended to suppress fluttering of the disk during rotation, can be more effectively used for a flexible disk which easily flutters.

[Third Embodiment]

The following will describe yet another embodiment of the present invention. Note that, constituting elements having the same functions as those described in the foregoing First and Second Embodiments are given the same reference numerals and explanations thereof are omitted here.

Figure 11:
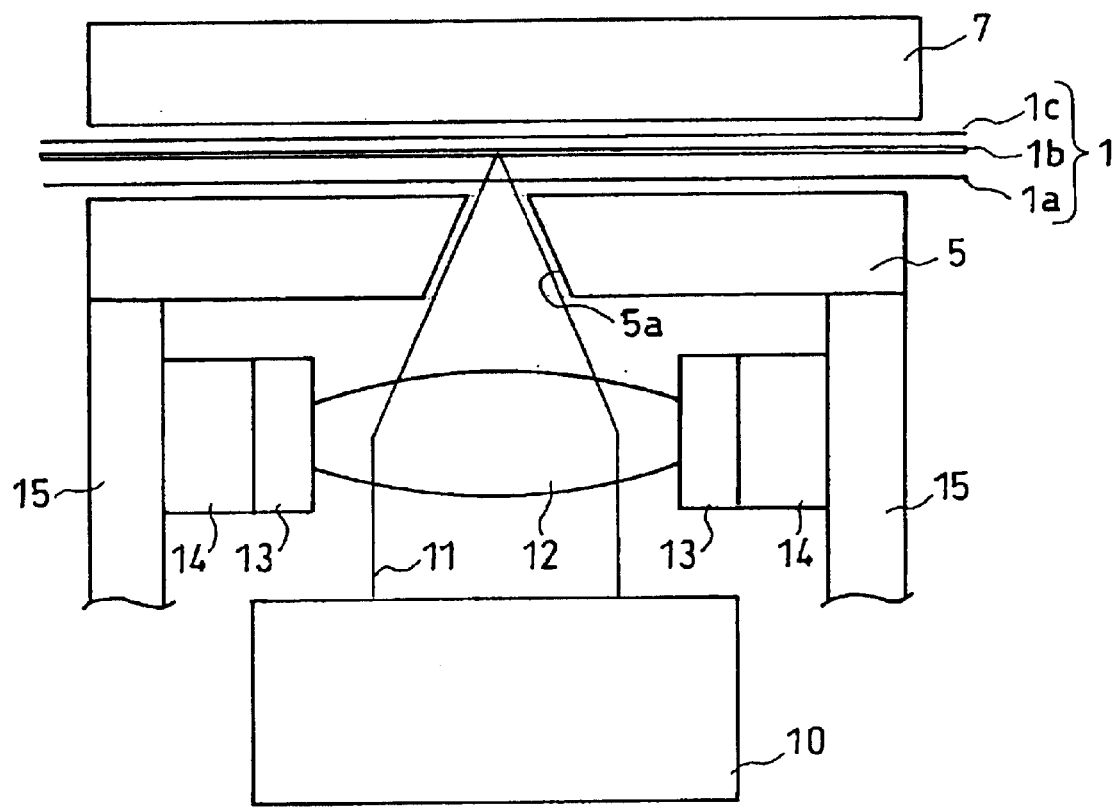
FIG. 11 is a cross sectional view showing a structure of relevant part of a recording and reproducing device according to yet another embodiment of the present invention.

As shown in FIG. 11, a recording and reproducing device according to the present embodiment has the same structure as that of the recording and reproducing device as shown in FIG. 2 of the First Embodiment, except for the transparent stabilizing board 5 (first stabilizing board 5), which is slightly modified in this embodiment.

A first stabilizing board 5 of the present embodiment has an opening 5a in an optical path of a laser beam 11, as shown in FIG. 11, so that the laser beam 11 can pass through it. The laser beam 11 emitted from an light emitting and detecting optical system 10 to irradiate a disk 1, or reflected at the disk 1 travels through the opening 5a.

In this manner, by providing the first stabilizing board 5 with the opening 5a which passes the laser beam 11 in the optical path of the laser beam 11, the material of the first stabilizing board 5 will not be limited to those which pass the laser beam 11, e.g., a transparent material, and a non-transparent material may be used. That is, a range of materials of the first stabilizing board 5 will not be limited, allowing the first stabilizing board 5 to be made from a material having good workability and good durability.

Further, by the provision of the opening 5a in the first stabilizing board 5, the laser beam 11 can travel through the opening 5a without reflecting at the surface of the first stabilizing board 5. Thus, the laser beam 11 can be used more efficiently. For example, compared with the case where the first stabilizing board 5 is not provided with the opening 5a and the laser beam 11 partially reflects at the surface of the first stabilizing board 5, information can be recorded and reproduced at lower power, thus reducing power consumption of the recording and reproducing device.

Figure 12:
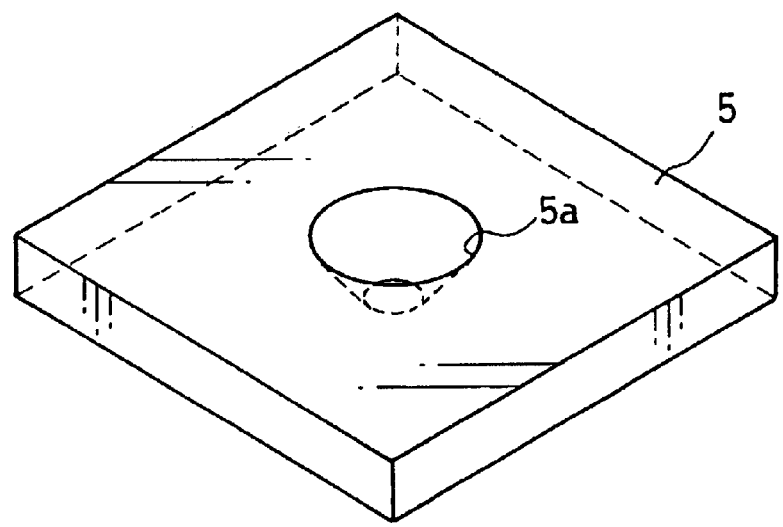
FIG. 12 is a perspective view of a first stabilizer.

Further, the shape of the opening 5a is not particularly limited as long as it can pass the laser beam 11, and it may be, for example, in the form of a cylinder. However, as shown in FIG. 12, the opening 5a is preferably in the form of a bowl on the optical path of the laser beam 11 travelling through the first stabilizing board 5.

The bowl shape of the opening 5a on the optical path of the laser beam 11 travelling through the first stabilizing board 5 decreases the area of the opening 5a facing the disk 1, without blocking the laser beam 11 by the first stabilizing board 5. This suppresses air turbulence which may be caused at the opening 5a when the disk 1 is rotated, thereby suppressing disturbance of air pressure between the disk 1 and the first stabilizing board 5. As a result, it is possible to suppress fluttering of the disk 1 and stabilize rotation of the disk 1.

Note that, the disk 1 is not just limited to the optic disk, and, for example, a magneto-optical disk which employs a magneto-optical recording medium as the recording medium 1b may be used as well.

Figure 13:
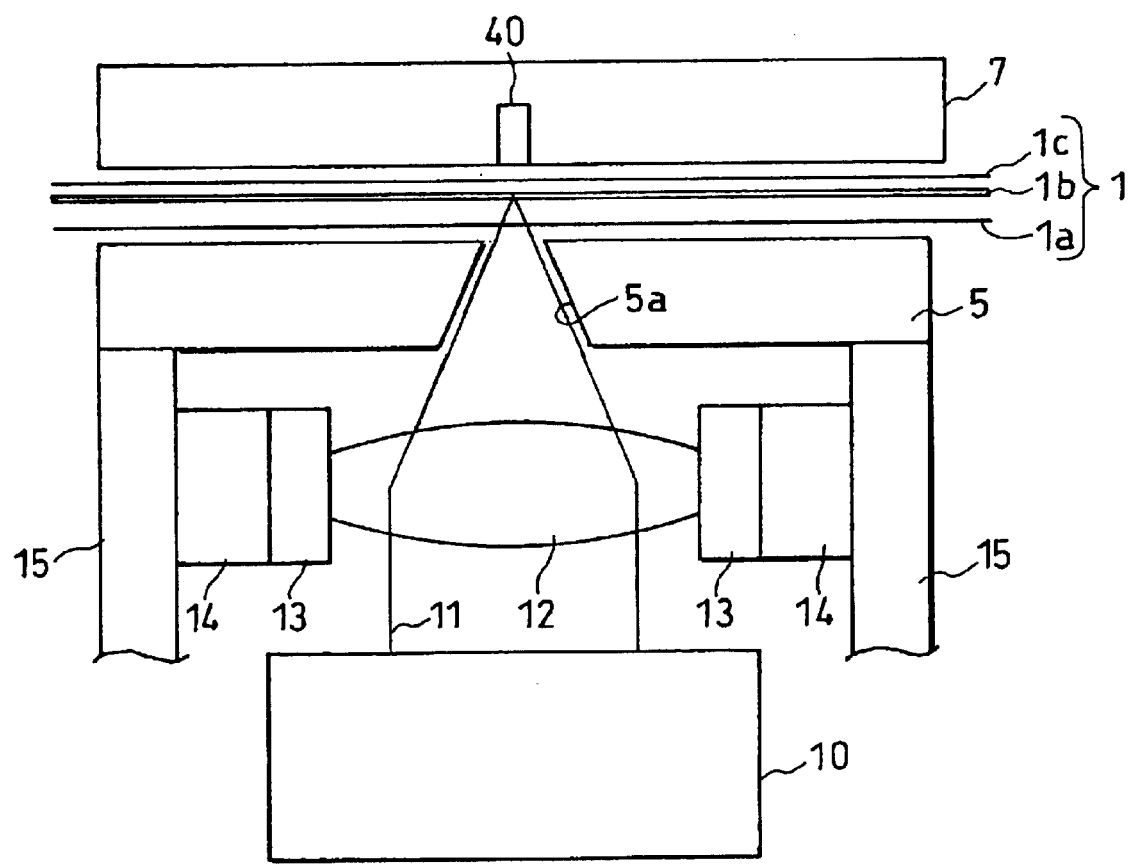
FIG. 13 is an enlarged cross sectional view showing the structure of relevant part of the recording and reproducing device of FIG. 11 when a magneto-optical disk is used.

Referring to FIG. 13, the following describes an example of the recording and reproducing device which records and reproduces information using a magneto-optical disk as the disk 1. Recording of information on the magneto-optical disk requires a recording magnetic field. A recording magnetic field is applied to an area where the laser beam 11 is focused on. This is attained by a magnetic head (magnetic field generating element) 40 embedded in a slider 7. The structure other than the integral structure of the magnetic head 40 in the slider 7 is the same as that shown in FIG. 11.

To record information in the disk 1, the laser beam 11 irradiated on the disk 1 raises the temperature of the recording medium 1b of a disk substrate 1a to reduce coercive force of the recording medium 1b. Here, the magnetic head 40 generates a magnetic field which is applied to the disk 1.

In the optical pickup 4, the laser beam 11 emitted from the light emitting and detecting optical system 10 is converged by the objective lens 12 to irradiate the disk 1. By the reduced coercive force of the disk 1 and the applied magnetic field from the magnetic head 40, the magnetization direction of the disk 1 becomes different. Here, the magnetic head 40 and the optical pickup 4 are moved together. That is, information is recorded in the disk 1.

By thus providing the slider 7 with the magnetic head 40, it is possible to realize a recording and reproducing device which can record and reproduce information using a magneto-optical disk with a recording medium which requires a recording magnetic field.

As with the structure of FIG. 11, the structure as shown in FIG. 13 also includes the first stabilizing board 5, and the slider 7 which is provided opposite the first stabilizing board 5 via the disk 1. This structure suppresses pressure fluctuation around the disk 1 and the optical pickup 4 and thus stabilizes rotation of the disk 1 even when the objective lens 12 or the optical pickup 4 provided with the objective lens 12 is moved, thereby providing a recording and reproducing device which can record and reproduce information stably and desirably even when a thin disk is used for the disk 1. Further, since the first stabilizing board 5 has the opening 5a in the form of a bowl, the laser beam 11 can be used efficiently. In addition, disturbance of air pressure between the disk 1 and the first stabilizing board 5 can be suppressed. As a result, rotation of the disk 1 can be stabilized.

Further, the objective lens 12 is not just limited to the simple lens as shown in FIG. 11, and it may be a complex lens combining at least two lenses. For example, FIG. 14 shows an exemplary structure of the objective lens 12 using a dual lens, which is a combination of two lenses, in the recording and reproducing device as shown in FIG. 1 of the First Embodiment.

The dual lens which is provided as the objective lens 12 is composed of a lens 50 and a lens 51. This arrangement enables numerical aperture NA of the objective lens 12 to be increased. Specifically, with the use of the dual lens, the numerical aperture NA of the objective lens 12 can be increased to 0.7 or greater, or more preferably around 0.8 to 0.95. As a result, the laser beam 11 projected on the disk 1 can have a smaller spot size, which increases the recording capacity and thus density of the disk 1. The end result of this is the recording and reproducing device which is suitable for high density recording and reproducing.

The numerical aperture NA can also be increased when a simple lens is used for the objective lens 12, but manufacture of the objective lens 12 with larger numerical aperture NA is easier when the dual lens is used. Therefore, in order to have numerical aperture NA of 0.7 or greater as in this embodiment, it is preferable to use a dual lens for the objective lens 12.

Note that, the exemplary structure as shown in FIG. 14 which incorporates the magnetic head 40 and uses the magneto-optical disk as the disk 1 can also use an optic disk. In this case, the magnetic head 40 will not be required.

Figure 15:
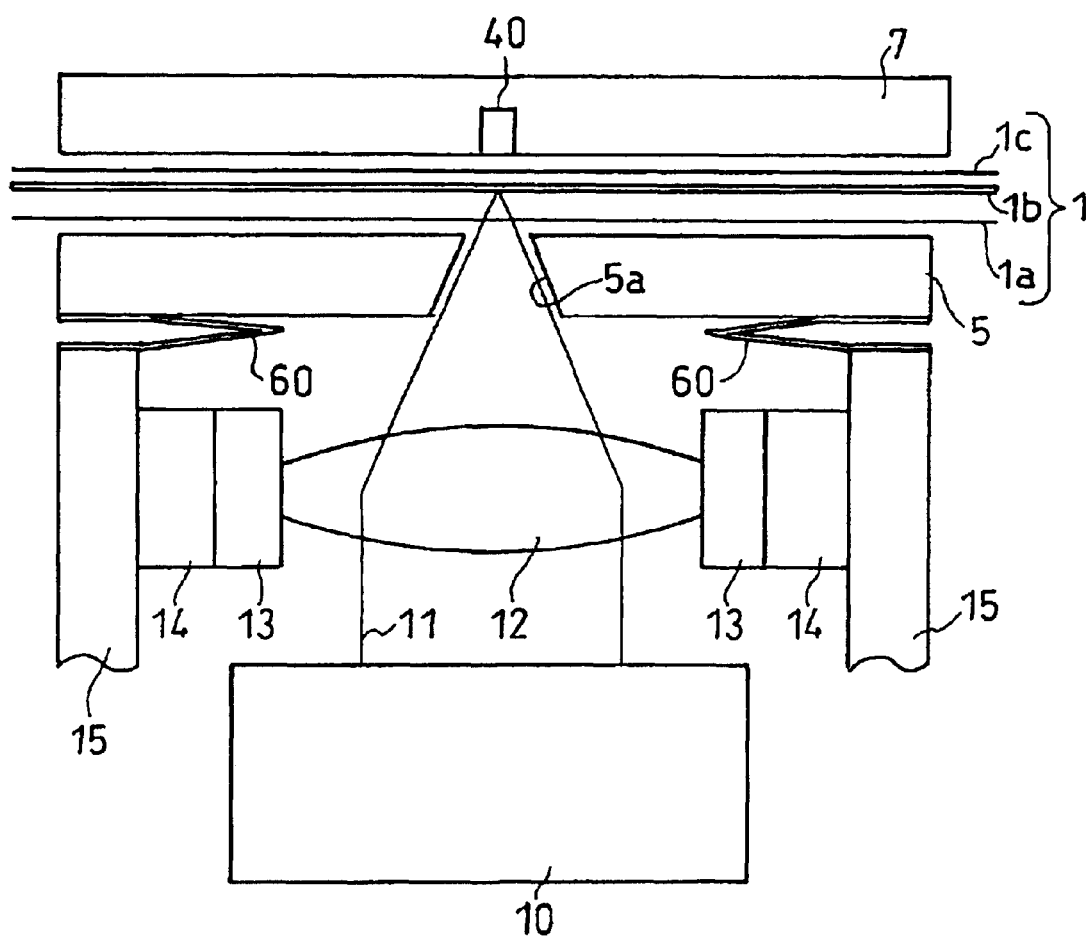
FIG. 15 is an enlarged cross sectional view showing the structure of relevant part of the recording and reproducing device of FIG. 11 when a first stabilizer is fixed on an optical pickup via a spring.

Further, as shown in FIG. 15, the first stabilizing board 15 may be fixed on the optical pickup 4 via the board spring 60 (elastic member). FIG. 15 shows a structure which incorporates the board spring 60 between the first stabilizing board 5 and the optical pickup 4 in the structure of the recording and reproducing device shown in FIG. 13.

As shown in FIG. 15, the transparent stabilizing board 5 is fixed on the optical pickup casing 15 via the board spring 60. According to the structure of FIG. 15, even when the slider 7 oscillates in response to external oscillation and the disk 1 oscillates by the pressure between the disk 1 and the slider 7 in response to this oscillation of the slider 7, the transparent stabilizing board 5 can follow the oscillation of the disk 1 by the stretch and compression of the board spring 60 to balance the air pressure between the disk 1 and the transparent stabilizing board 5 with that between the disk 1 and the slider 7.

Thus, it is possible to prevent damage to the disk 1 which may be caused when the disk 1 collides with the transparent stabilizing board 5 in response to external oscillation.

Note that, the board spring 60 is not just limited to a spring as long as it is elastic. For example, materials such as rubber or foamed resin may be used instead. Here, as the term is used, "spring" may be any elastic body. The spring is preferable because it has a large stroke in response to a load.

[Fourth Embodiment]

The following will describe yet another embodiment of the present invention. Note that, constituting elements having the same functions as those described in the foregoing embodiments are given the same reference numerals and explanations thereof are omitted here.

Figure 16:
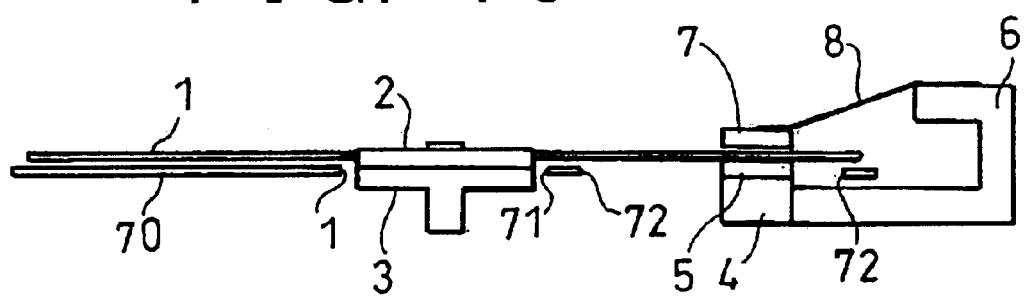
FIG. 16 is a cross sectional view showing a structure of relevant part of a recording and reproducing device according to still another embodiment of the present invention.
Figure 17:
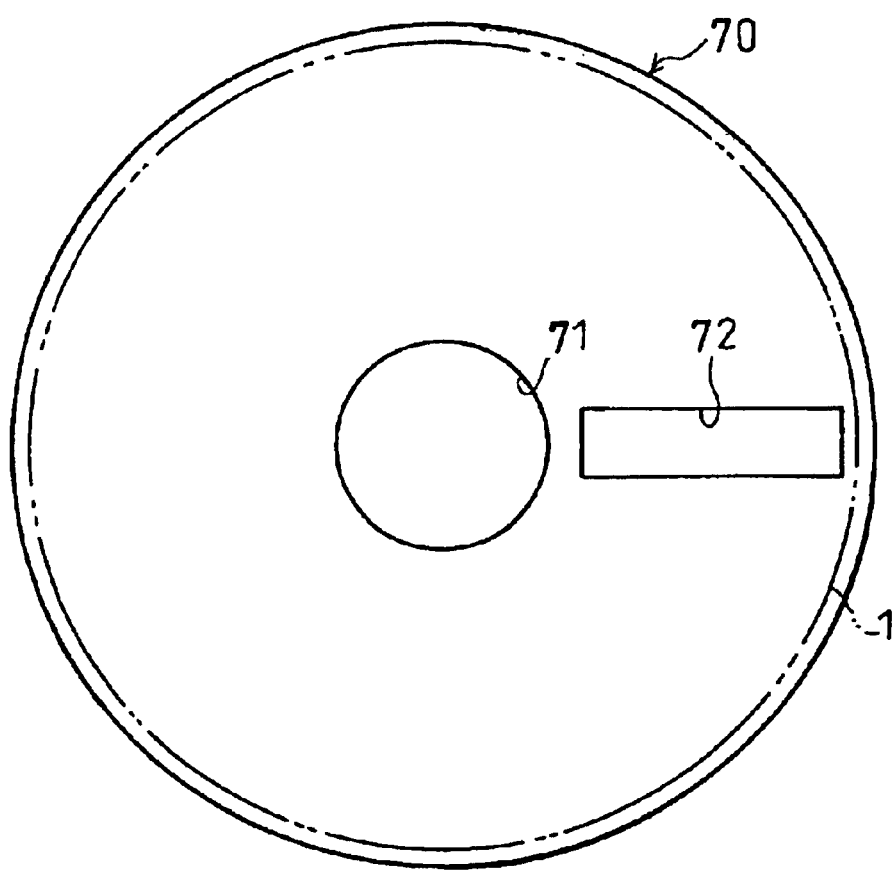
FIG. 17 is a plan view of a second stabilizer.

FIG. 16 is a cross sectional view showing a relevant portion of a recording and reproducing device according to the present embodiment, in which a second stabilizing board 70 is added to the structure of FIG. 1 according to the First Embodiment. FIG. 17 is a plan view of the second stabilizing board 70. Note that, the cross section of FIG. 16 showing a relevant portion of the recording and reproducing device is taken along the central line in the radial direction of the second stabilizing board 70 at a second opening 72.

The second stabilizing board 70 is larger than a first stabilizing board 5, and, for example, in the form of a circle slightly larger than the disk 1, as shown in FIG. 17. Further, the second stabilizing board 70 has a first opening 71 for chucking a center hub 2 of the disk 1 to a spindle 3, and the second opening 72 which is used to position an optical pickup 4 with the first stabilizing board 5 in the vicinity of the disk 1. Further, the second stabilizing board 70 in the recording and reproducing device is fixed at such a position that it is opposite the disk 1 and can create a space of reduced pressure between the disk 1 and the second stabilizing board 70 during rotation of the disk 1.

By thus providing the second stabilizing board 70 larger than and separately from the slider 7 and the first stabilizing board 5 at a position opposite and in the vicinity of the disk 1, a space of reduced pressure can be created between the disk 1 and the second stabilizing board 70 during rotation of the disk 1. Here, the disk 1, being flexible, is drawn to the second stabilizing board 70 and rotates at a constant distance from the second stabilizing board 70. Thus, the addition of the second stabilizing board 70 can further stabilize rotation of the disk 1, compared with the case where rotation of the disk 1 is stabilized by providing only the first stabilizing board 5 and the slider 7 which are moved with the optical pickup 4. Thus, it is possible to more effectively prevent fluttering of the disk 1 when the disk 1 is rotating, and to stabilize rotation of the disk 1 at a distant position from the slider 7 and the first stabilizing board 5.

Thus, in the focus control, because the rotation of the disk 1 is stabilized even at a distant position from the transparent stabilizing board 5 and the slider 7, the disk 1 is less influenced by the pressure fluctuation which may be caused, for example, when the transparent stabilizing board 5 and the slider 7 are moved with the optical pickup 4 to balance the air pressure between the disk 1 and the transparent stabilizing board 5 with that between the disk 1 and the slider 7. As a result, fluttering of the disk 1 is suppressed more effectively. This brings stable and easy focus control or tracking even when the biaxial actuator 14 using the conventional servo technique is used, thus providing the recording and reproducing device which can record and reproduce information more stably and more desirably.

Note that, in order to create a space of reduced pressure between the disk 1 and the second stabilizing board 70 to attain stable rotation of the disk 1, the distance between the disk 1 and the second stabilizing board 70 is preferably not less than 10 $\mu$m and not more than 200 $\mu$m.

Further, the optical pickup 4 with the transparent stabilizing board 5 provided below the disk 1 and the slider 7 provided above the disk 1 may be switched in their positions with respect to the disk 1. In the case where the slider 7 is below the disk 1 (on the side of the second stabilizing board 70 of the disk 1), the second opening 72 of the second stabilizing board 70 makes up an opening which is used to position the slider 7 in the vicinity of the disk 1.

Figure 18:
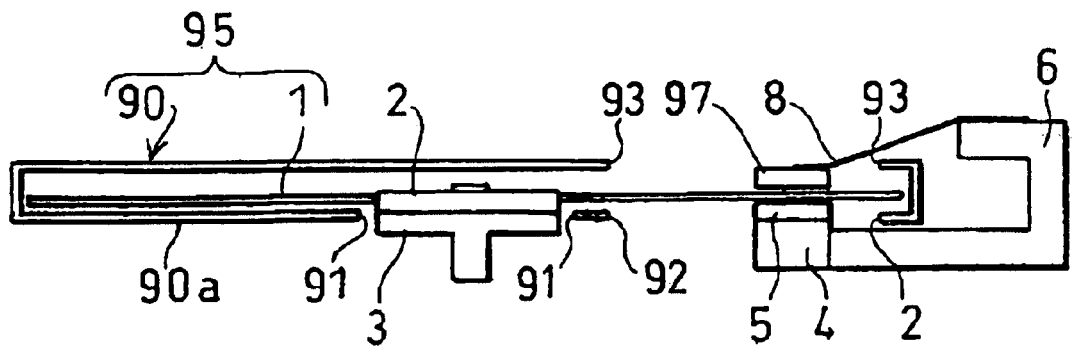
FIG. 18 is a cross sectional view showing the structure of relevant part of the recording and reproducing device of another embodiment of the present invention when both inner walls of the cartridge define the second stabilizer.

Further, as shown in FIG. 18, the second stabilizing board 70 may be defined by an inner wall surface of a cartridge 90 which contains the disk 1.

FIG. 18 is a cross sectional view showing a structure of relevant part of the recording and reproducing device of FIG. 1 according to the First Embodiment, when it is operated to record and reproduce information with respect to the disk 1 contained in a disk cartridge 95. Here, the disk cartridge 95 refers to the cartridge 90 containing the disk 1. As shown in FIG. 18, the lower surface of the cartridge 90 (the surface of the cartridge 90 facing the disk 1 on the side of the optical pickup 4) makes up a stabilizing section 90a which is provided as the second stabilizing board 7b. That is, the lower surface of the cartridge 90 serves as the second stabilizing board 70. Note that, the cross section of relevant part of the recording and reproducing device of FIG. 18 is taken along the central line in the radial direction of the disk 1 at a second opening 92 as shown in FIG. 19.

The stabilizing section 90a has a first opening section 91 for chucking the center hub 2 of the disk 1 to the spindle 3, and the second opening 92 which is used to position the optical pickup 4 with the transparent stabilizing board 5 in the vicinity of the disk 1. Further, the upper surface of the cartridge 90 (the surface of the cartridge 90 facing the disk 1 on the side of the slider 7) has a third opening 93 which is used to position the slider 7 in the vicinity of the disk 1 at a position opposite the second opening 92.

Figure 19:
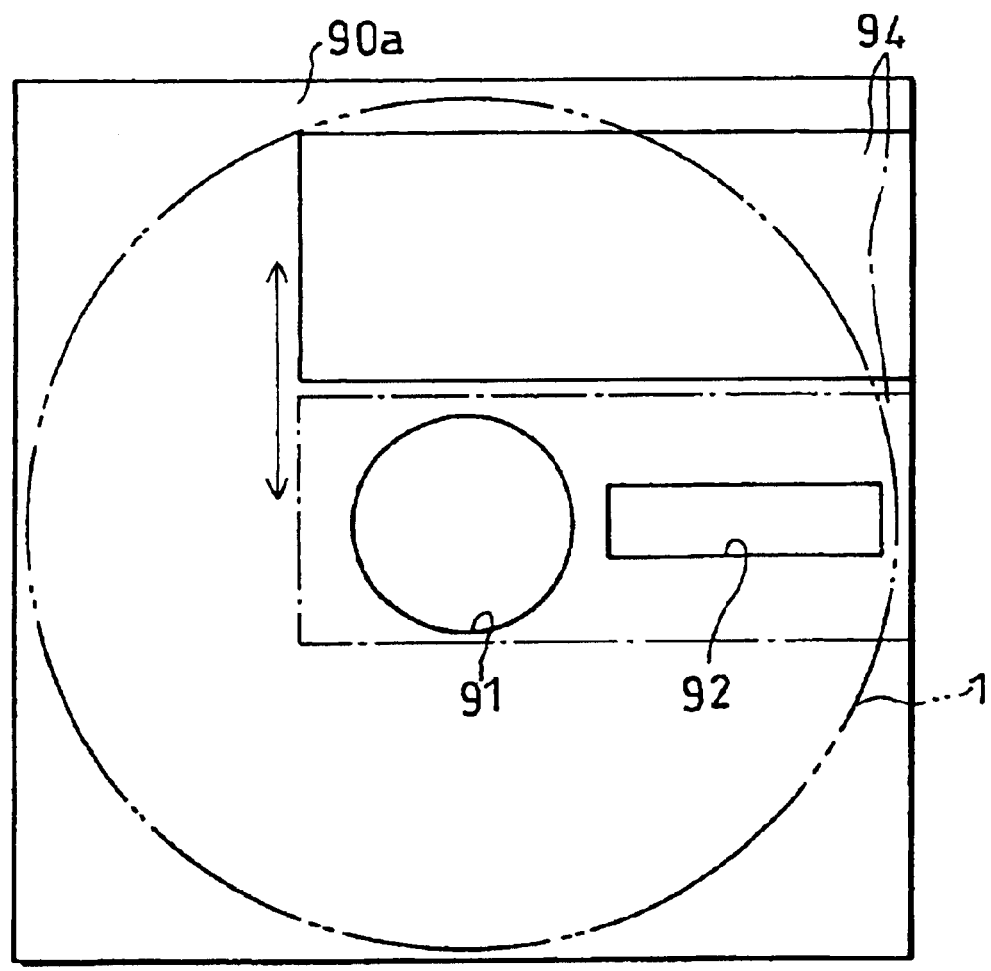
FIG. 19 is a plan view of the cartridge.

Further, FIG. 19 is a plan view showing the cartridge 90 as viewed from the side of the optical pickup 4, i.e., from below the cartridge 90. As shown in FIG. 19, the cartridge 90 further includes a slide shutter 94 which can be opened or closed in the directions of arrows, capable of covering the first opening 91 and the second opening 92. The slide shutter 94 is open when the first opening 91 and the second opening 92 are used while the disk 1 is rotating, whereas it is closed when the cartridge 90 containing the disk 1 is taken out of the recording reproducing device.

Further, on the upper face of the cartridge 90 is provided a slide shutter (not shown) for covering the third opening 93. The slide shutter is open when the third opening 93 is used, whereas it is closed when the cartridge 90 storing the disk 1 is taken out of the recording and reproducing device. This is to protect the disk 1 from dusts.

The lower face of the cartridge 90 makes up the stabilizing section 90a which serves as the second stabilizing board 70. That is, one of inner wall surfaces of the cartridge 90 makes up the second stabilizing board 70. Thus, a space of reduced pressure is created between the disk 1 and the stabilizing section 90a when the disk 1 is rotating. The disk 1, being flexible, is drawn to the stabilizing section 90a and rotates at a constant distance from the stabilizing section 90a. This suppresses fluttering of the disk 1 further effectively when the disk 1 is rotating, and rotation of the disk 1 can be stabilized at a distance position from the slider 7 and the first stabilizing board 5.

Thus, because the rotation of the disk 1 is stabilized even at a distant position from the transparent stabilizing board 5 and the slider 7, the disk 1 is less influenced by the pressure fluctuation which may be caused, for example, when the transparent stabilizing board 5 and the slider 7 are moved with the optical pickup 4 to balance the air pressure between the disk 1 and the transparent stabilizing board 5 with that between the disk 1 and the slider 7. As a result, fluttering of the disk 1 is suppressed more effectively, thus providing the recording and reproducing device which can record and reproduce information more stably and more desirably.

Further, since the lower face of the cartridge 90 makes up the stabilizing section 90a to serve as the second stabilizing board 70, rotation of the disk 1 can be stabilized without adding a new member as the second stabilizing board 70.

Note that, as in the foregoing example, the optical pickup 4 with the first stabilizing board 5 provided below the disk 1 and the slider 7 provided above the disk 1 may be switched in their positions with respect to the disk 1. When the slider 7 is below the disk 1 (on the side of he stabilizing board 90a), the second opening 92 of the cartridge 90 becomes an opening which is used to position the slider 7 in the vicinity of the disk 1, and the third opening 93 becomes an opening which is used to position the optical pickup 4 with the first stabilizing board 5 in the vicinity of the disk 1.

Figure 20:
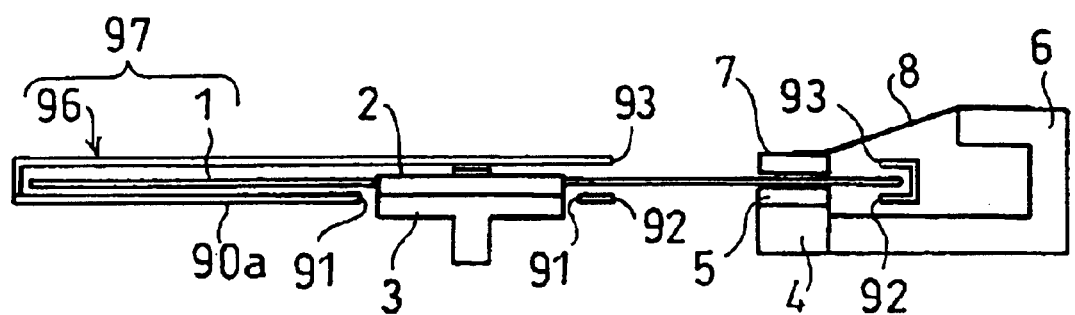
FIG. 20 is a cross sectional view showing another structure of the recording and reproducing device of FIG. 18 when a space inside a disk cartridge is restricted.

Referring to FIG. 20, the following will describe a recording and reproducing device in which the second stabilizing board 70 is defined by the both inner wall surfaces of a cartridge 96 containing the disk 1.

The recording and reproducing device as shown in FIG. 20 has the same structure as that of FIG. 18 except that a disk cartridge 97 is provided instead of the disk cartridge 95 to contain the disk 1 in the cartridge 96.

As with the cartridge 90, the lower face of the cartridge 96 has the stabilizing section 90a as shown in FIG. 19, as well as the first opening 91, the second opening 92, the third opening 93, and the slide shutter 94. Further, as with the cartridge 90, the upper face of the cartridge 96 has a slide shutter (not shown) covering the third opening 93. This protects the disk 1 from dusts.

Further, the cartridge 96 differs from the cartridge 90 of FIG. 18 in that the width of the cartridge 96 across the surface of the cartridge 96 facing the disk 1 on the side of the slider 7 (hereinafter referred to as upper surface of the cartridge 96) and the surface of the cartridge 96 facing the disk 1 on the side of the optical pickup 4 (hereinafter referred to as lower surface of the cartridge 96), i.e., a distance between the inner wall surfaces of the cartridge 96 centered by the disk 1, is restricted within such a range which enables the cartridge 96 to serve as the second stabilizing board 70.

That is, in order for the upper and lower surfaces of the cartridge 96 facing the disk 1 to serve as the second stabilizing board 70, the upper and lower surfaces of the cartridge 96 need to be positioned in such a manner that a space of reduced pressure is created above and below the disk 1 between the upper and lower surfaces of the cartridge 96.

Specifically, it is preferable that the distance between the disk 1 and the upper surface of the cartridge 96, and the distance between the disk 1 and the lower surface of the cartridge 96 are each not less than 10 $\mu$m and not more than 200 $\mu$m.

A distance of not less than 10 $\mu$m between the disk 1 and each surface of the cartridge 96 facing the disk 1 prevents a collision between the disk 1 and the cartridge 96 which may be caused by external influence such as oscillation, and thus prevents the disk 1 from being scratched.

Further, a distance of not more than 200 $\mu$m between the disk 1 and each surface of the cartridge 96 facing the disk 1 makes the disk 1 less susceptible to external influence such as oscillation. That is, because the space inside the cartridge 96 is restricted, the influence of external oscillation on the state of reduced pressure between the disk 1 and the upper and lower surfaces of the cartridge 96 becomes less. Thus, it is possible to suppress fluttering of the disk 1 in the cartridge 96, which is caused when rotation of the disk 1 in the cartridge 96 becomes instable in response to external force, for example, by oscillation. As a result, rotation of the disk 1 can be stabilized.

The foregoing restriction of the space within the cartridge 96 enables the upper and lower surfaces of the cartridge 96 facing the disk 1 to function as the second stabilizing board 70. That is, the state of reduced pressure between the disk 1 and the cartridge 96 is stabilized, and the disk 1 becomes less susceptible to external influence such as oscillation. This prevents fluttering of the disk 1 in the space of the cartridge 96, and the disk 1 can be rotated stably. Furthers the disk 1 is prevented from colliding with the upper or lower surface of the cartridge 96, thus preventing a scratch on the surfaces of the disk 1.

Thus, the recording and reproducing device provided with the cartridge 96 can stabilize rotation of the disk 1 at a distant position from the slider 7 and the first stabilizing board 5, when, for example, the first stabilizing board 5 and the slider 7 are moved with the optical pickup 4. As a result, recording and reproducing can be carried out more stably and more desirably.

Further, since the second stabilizing board 70 is defined by the upper and lower surfaces of the cartridge 96, rotation of the disk 1 can be stabilized more effectively without introducing a new member as the second stabilizing board 70.

Further, the stable rotation of the disk 1 allows the use of a thinner disk for the disk 1. Here, in order for the disk 1 to be effectively flexible, the thickness of the disk 1 is preferably not less than 30 $\mu$m and not more than 400 $\mu$m. Since the disk 1 is flexible, a thickness less than 30 $\mu$m makes it difficult to maintain sufficient strength for the disk 1 to withstand rotation. On the other hand, a thickness of the disk 1 exceeding 400 $\mu$m makes the disk 1 less flexible, which prevents the disk 1 from being drawn to the stabilizing section 90a even when a space of reduced pressure is created between the disk 1 and the stabilizing section 90a. As a result, the effect of suppressing fluttering of the disk 1 when it is rotating becomes less effective.

According to the foregoing Third and Fourth Embodiments, a recording and reproducing device of the present invention includes a light source, focusing means for converging and projecting a laser beam which was emitted from the light source on a disk, and rotation driving means for rotating the disk, the recording and reproducing device comprising: a first stabilizing board, provided between the disk and the focusing means, which is moved with the focusing means; and a slider which is disposed to face the first stabilizing board via the disk and supported to oscillate, a surface of the slider facing the disk being flat, wherein the first stabilizing board has an opening in an optical path of the laser beam so as to allow passage of the laser beam.

According to this arrangement, when recording or reproducing information with respect to the disk, i.e., during rotation of the disk, the rotation of the disk induces an air flow between the disk and the slider, and the air pressure between the slider and the disk increases because the surface of the slider facing the disk is flat. That is, pressure is created between the slider and the disk. In the same manner, the rotation of the disk also induces an air flow between the disk and the first stabilizing board to create pressure therebetween. In addition, the slider is supported to oscillate. This enables the slider to be moved to balance the air pressure between the disk and the first stabilizing board and that between the slider and the disk.

By this pressure-induced state and balancing of it between (1) the slider and the disk and (2) the first stabilizing board and the disk, the disk rotates at a constant distance from the slider and the first stabilizing board. This suppresses fluttering of the disk when it is rotating, and thus stabilizes the rotation of the disk.

If it is assumed here that the first stabilizing board is not provided and the disk and the focusing means are disposed face to face with nothing in between, the focusing means, when it is driven on the optical pickup for example, makes up the surface of the optical pickup facing the disk. Therefore, this surface of the optical pickup has relatively large irregularities. The result of this is that the pressure around the focusing means fluctuates every time the focusing means is moved, which easily changes the air pressure between the focusing means and the disk. Thus, the disk flutters when the focusing means is moved.

However, by providing the first stabilizing board which moves with the focusing means between the disk and the focusing means, the surface on the side of the focusing means facing the disk becomes flat, which creates uniform air pressure between this flat surface and the disk. As a result, it is possible to suppress fluctuation of air pressure between the first stabilizing board and the disk and thus fluttering of the disk, for example, even when the focusing means is moved to carry out a focus control.

Further, because the slider is supported to oscillate in a vertical direction with respect to the disk, the air pressure between the disk and the slider can be changed so that the air pressure between the disk and the first stabilizing board is balanced with that between the disk and the slider, even when the air pressure between the disk and the first stabilizing board is caused to fluctuate, for example, by the movement of the optical pickup with the focusing means during a focus control.

Thus, even when the focusing means and thus the first stabilizing board is moved with respect to the disk, the movement is accompanied by the movement of the slider relative to the disk, so as to balance the air pressure between the disk and the first stabilizing board with that between the disk and the slider. The air pressure can be balanced easily and stably because the surface of the slider facing the disk is also flat. As a result, it is possible to suppress vertical displacement of the disk, i.e., fluttering of the disk, which is caused by fluctuation of pressure around the disk, thus stably and easily carrying out a focus control and tracking, for example.

Thus, the disk can be stably rotated even when the focusing means or the optical pickup with the focusing means is moved, thereby providing a recording and reproducing device which can record and reproduce information stably and desirably even with a thin disk. Further, the use of a thin disk means a shorter optical path in the disk, which makes it possible to provide a large margin of error for a tilt of the disk. As a result, recording density of the disk can be increased.

Further, because the first stabilizing board has an opening which can pass a laser beam in an optical path of the laser beam, the material of the first stabilizing board will not be limited, for example, to transparent materials which can pass the laser beam, and non-transparent materials can be used as well. That is, the material of the first stabilizing board can be selected from a wider range of materials, thus enabling the first stabilizing board to be made from a material with good workability and good durability.

Further, because the first stabilizing board has an opening, a laser beam can pass through the opening without reflecting at the surface of the first stabilizing board. As a result, the laser beam can be used more efficiently. For example, compared with the case where the first stabilizing board does not have an opening and the laser beam partially reflects at the surface of the first stabilizing board, information can be recorded and reproduced at lower light power, thus reducing power consumed in the recording and reproducing device.

It is preferable in the recording and reproducing device that the opening is in the form of a bowl on the optical path of the laser beam passing through the first stabilizing board.

According to this arrangement, the area of the opening facing the disk can be decreased without blocking the laser beam travelling through the first stabilizing board. This suppresses air turbulence which may be caused at the opening when the disk is rotated, thereby suppressing disturbance of air pressure between the disk and the first stabilizing board. As a result, it is possible to suppress fluttering of the disk and stabilize rotation of the disk.

[Fifth Embodiment]

The following will describe still another embodiment of the present invention.

Figure 21:
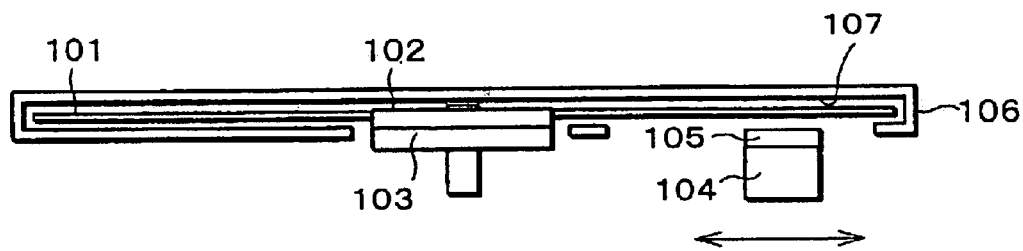
FIG. 21 is a cross sectional view schematically showing yet another embodiment of the optical disk device of the present invention.

In FIG. 21, an optical disk 101 is provided as a flexible disk with a magnetic center hub 102, whereby the optical disk 101 is chucked to a spindle 103 by magnetic coupling. The disk 101 is rotated by driving the spindle 103. An optical pickup 104 has a transparent stabilizing board 105 which is provided as a rotation stabilizing board made of glass with flat and smooth surfaces. The optical pickup 4 is driven in a radial direction of the optical disk by a motor such as a linear motor.

The flexible optical disk 101 is contained in an optical disk cartridge 106 made of polycarbonate, and an inner wall surface of the optical disk cartridge 106 opposite the transparent stabilizing board 105 defines a counter stabilizing surface 107 which is provided as a flat and smooth rotation stabilizing surface.

The flexible optical disk 101 is rotated (e.g., about 3000 rpm) between the transparent stabilizing board 105 and the counter stabilizing surface 107 which is defined by the inner wall surface of the optical disk cartridge 106, so that the air pressure between the optical disk 101 and the transparent stabilizing board 105 and the air pressure between the optical disk 101 and the counter stabilizing surface 107 balance out, thereby realizing stable rotation with less fluttering. That is, the optical disk 101, being flexible, stably rotates at a constant distance (e.g., 20 µm) from the transparent stabilizing board 105 or counter stabilizing surface 107. Thus, the optical disk 101 fluctuates less in optic axis directions than conventionally, thereby attaining easy focusing.

Figure 22:
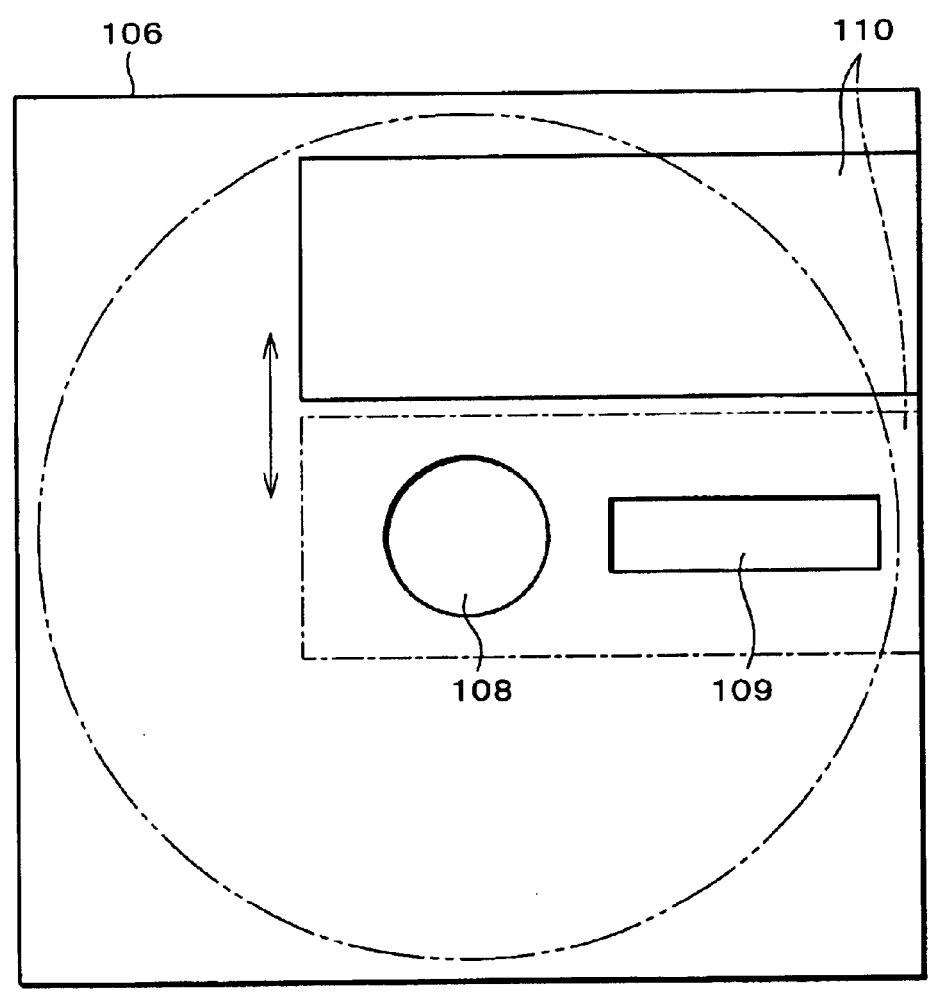
FIG. 22 is a plan view of an optical disk cartridge of the optical disk device of FIG. 21.

FIG. 22 shows the optical disk cartridge 106 of FIG. 21 as viewed from the side of the optical pickup 104.

The optical disk cartridge 106 has a first opening 108 for chucking the center hub 102 of the flexible optical disk 101 to the spindle 103, and a second opening 109 which is used to position the optical pickup 104 with the transparent stabilizing board 105 in the vicinity of the optical disk 101. Further, the optical disk cartridge 106 is provided with a slide shutter 110 which can be opened or closed to shut out dusts.

The optical disk cartridge of the present invention is adapted so that the inner wall surface of the optical disk cartridge opposite the second opening 109 defines the counter stabilizing surface 107, and the first opening 108 and the second opening 109 are provided only on one surface of the optical disk cartridge. That is, the slide shutter 110 can be provided only on one surface of the optical disk cartridge 106 to cover the first opening 108 and the second opening 109, thereby simplifying the slide shutter 110.

Figure 23:
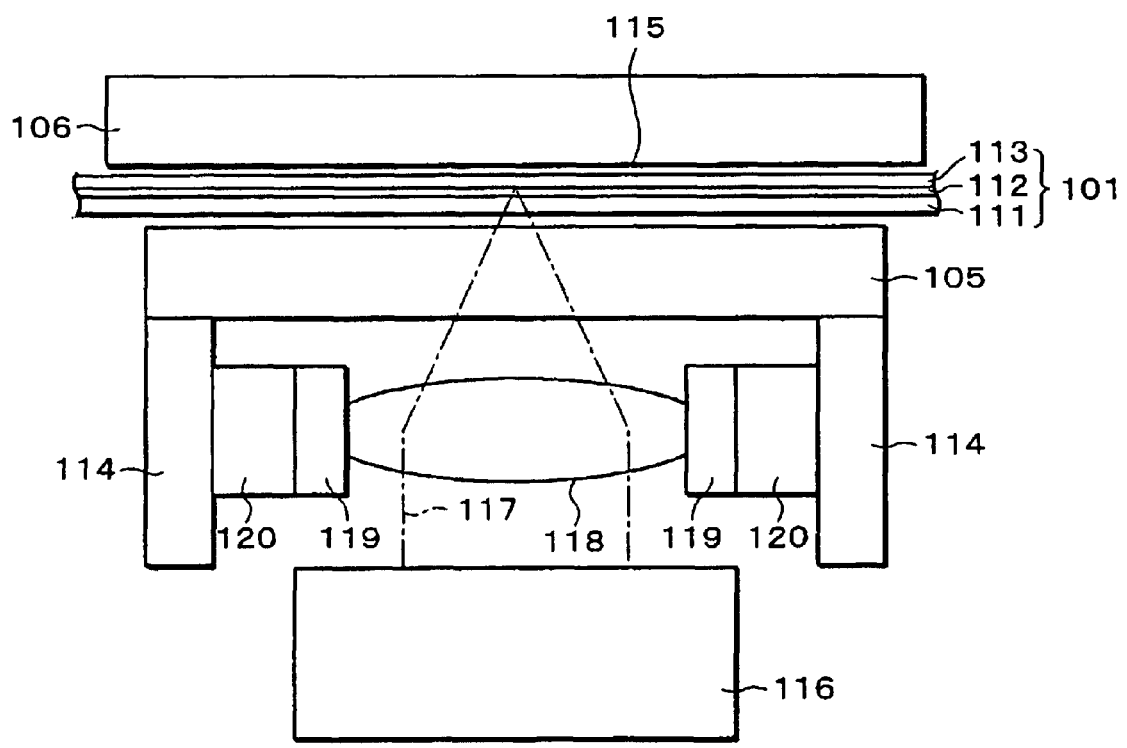
FIG. 23 is an enlarged cross sectional view showing a structure of relevant part of the optical disk device of FIG. 21.

FIG. 23 schematically shows a cross section of a magnified portion of the optical pickup 104 of FIG. 21. Here, the optical disk 101 may be a ROM disk with a series of pits, which are recessions on a surface of the substrate, or a write once disk which employs an organic pigment material for its recording medium, or a rewritable disk which employs a phase-change material for its recording medium.

In the case of the write once disk or rewritable disk, the optical disk 101 is made up of a disk substrate 111 made of polyethylene terephthalate having guiding grooves thereon, a recording medium 112 which is provided on the surface of the guiding grooves, and a protective layer 113 for protecting the recording medium 112. The flexible optical disk 101 is stably rotated between the transparent stabilizing board 105 which is fixed on an optical pickup casing 114 (one of supporting members of an objective lens (mentioned later)) and a counter stabilizing surface 115 which is defined by the inner wall surface of the optical disk cartridge 106 opposite the transparent stabilizing board 105, so that the air pressure between the optical disk 1 and the transparent stabilizing board 105 and the air pressure between the optical disk 101 and the counter stabilizing surface 115 balance out.

A laser beam 117 from a light emitting element in an light emitting and detecting optical system 116 is converged through an objective lens 118 (focusing unit) to fall on the recording medium 112 of the optical disk 101. A state of reflected light from the recording medium 112 is detected by a photoreceptor element in the light emitting and detecting optical system 116 so as to record or reproduce information.

Here, the objective lens 118 is fixed on a lens holder 119 (one of supporting members) which is fixed on the optical pickup casing 114 via a biaxial actuator 120 (another supporting member). The objective lens 118 is driven in this configuration to carry out focusing and tracking operations with respect to the guiding grooves of the optical disk 101.

Note that, focusing and tracking can be realized to sufficiently record or reproduce a data signal despite the use of the biaxial actuator 120 which employs the conventional servo technique, because the flexible optical disk 101 stably rotates between the transparent stabilizing board 105 and the counter stabilizing surface 115 with less fluttering.

Figure 24:
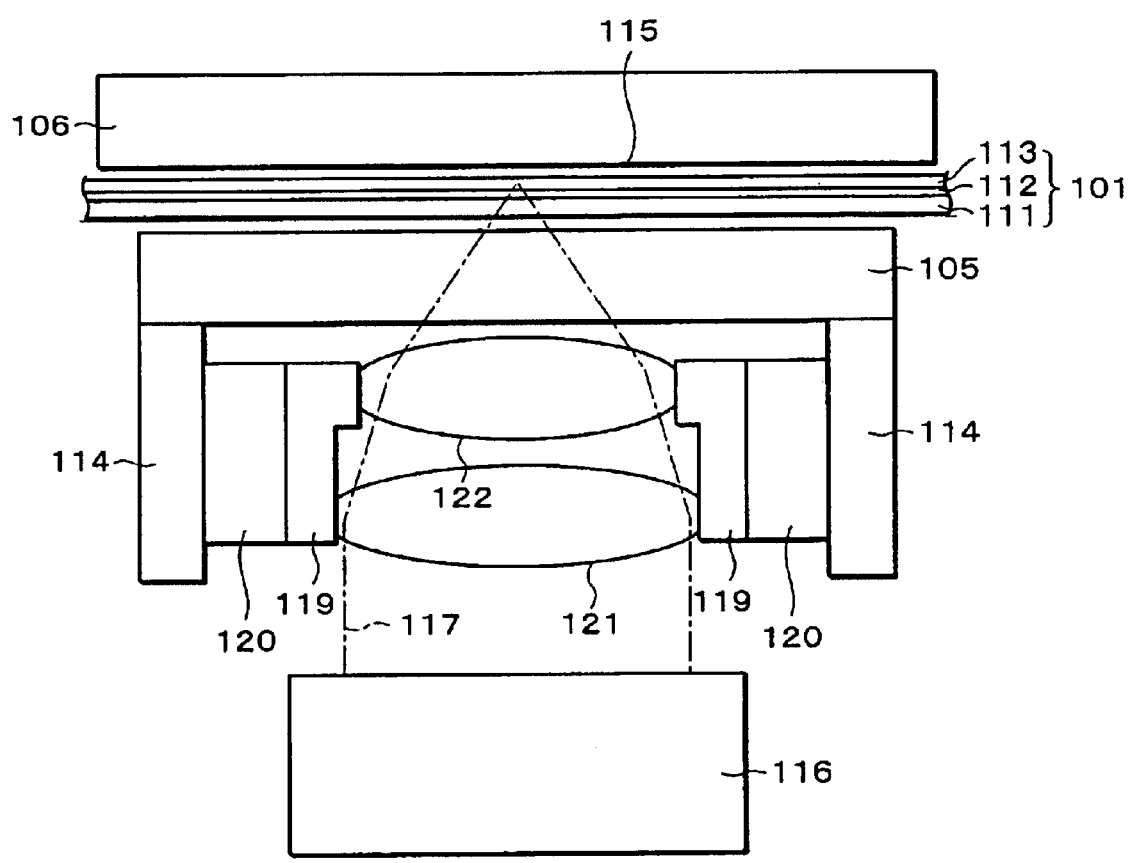
FIG. 24 is a cross sectional view schematically showing another structure of the optical disk device.

FIG. 24 schematically shows a cross section of a magnified portion of the optical pickup 104 when a dual lens composed of a lens 121 and a lens 122 is used to increase numerical aperture NA of the objective lens, as taught by Japanese Unexamined Patent Publication No. 308059/1998 (Tokukaihei 10-308059) (published date: Nov. 17, 1998) ("Document 11" hereinafter).

The dual lens, composed of the lens 121 and the lens 122, enables numerical aperture NA to be increased. Specifically, the numerical aperture NA of the dual lens is preferably not less than 0.7, and more preferably from 0.8 to 0.95. Note that, the numerical aperture can also be increased with the use of a simple lens. However, the use of the dual lens makes manufacture of the objective lens easier. The dual lens is preferably used when the numerical aperture is to be not less than 0.7 as in the present embodiment.

In Document 1, to record or reproduce information, as shown in FIG. 52, an optical pickup 403 including focusing means (complex objective lens) which is provided opposite a stabilizing board 402 is positioned in the vicinity of a flexible optical disk 401.

In this case, the surface of the optical pickup 403 facing the disk 401 makes up the surface with focusing means such as a lens element. Such a surface has relatively large irregularities, which causes the pressure between the optical pickup 403 and the optical disk 401 to fluctuate when the optical pickup 403 is positioned in the vicinity of the optical disk 401. This pressure fluctuation causes the optical disk 401 to flutter in the vicinity of the optical pickup 403, which leads to a failure to maintain stable focusing operation, and thus a failure to record and reproduce information desirably.

However, according to the arrangement of the present embodiment, the optical disk 1 is rotated stably by balancing the air pressure between the optical disk 101 and the transparent stabilizing board 105 with that between the optical disk 101 and the counter stabilizing surface 115. This makes it possible to maintain stable focusing operation and to record and reproduce information desirably.

The recording medium 112 shown in FIG. 24 may be a write once optical disk using an organic pigment material, or a rewritable optical disk using a phase-change material. Alternatively, a ROM disk having a series of pits on a substrate surface may be used as well.

Figure 25:
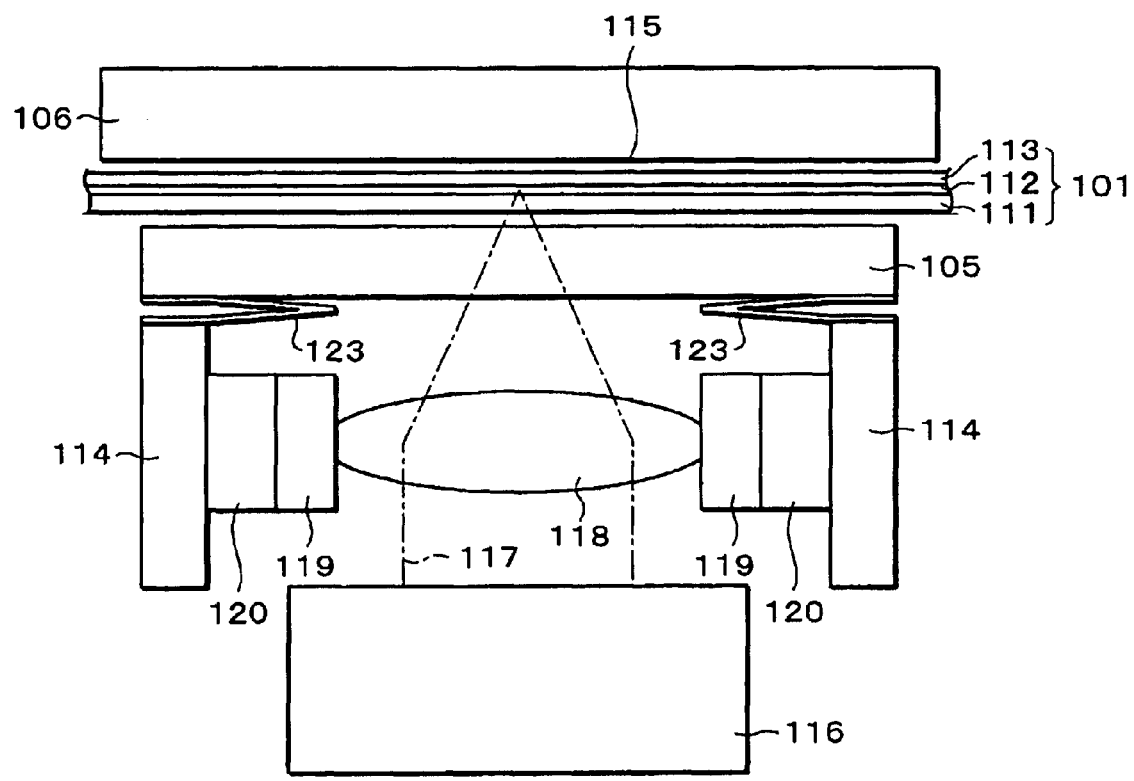
FIG. 25 is a cross sectional view schematically showing still another structure of the optical disk device.

FIG. 25 schematically shows a cross section of a magnified portion of the arrangement shown in FIG. 23 when the transparent stabilizing board 105 is fixed on the optical pickup casing 114 via a board spring 123.

In the arrangement shown in FIG. 22, the transparent stabilizing board 105 is fixed directly on the optical pickup casing 114. This may damage the optical disk 101, for example, by scratching the surface of the optical disk 101, when the optical disk 101 collides with the transparent stabilizing board 105 in response to external oscillation inflicted on the optical disk cartridge 106 and the optical disk 101.

On the other hand, in the arrangement shown in FIG. 25, the transparent stabilizing board 105 is fixed on the optical pickup casing 114 via the board spring 123. According to this arrangement, the board spring 123 acts to absorb the oscillation of the optical disk 101 when the optical disk cartridge 106 and the optical disk 101 oscillate due to external oscillation, thereby preventing damage to the optical disk 101 which is caused when the optical disk 101 collides with the transparent stabilizing board 105 due to external oscillation.

The foregoing described the case where the board spring 123 was incorporated in the arrangement of FIG. 22. However, the same effect can be obtained in the arrangement incorporating the dual lens as shown in FIG. 22, by fixing the transparent stabilizing board 105 on the optical pickup casing 114 via the board spring 123.

Figure 26:
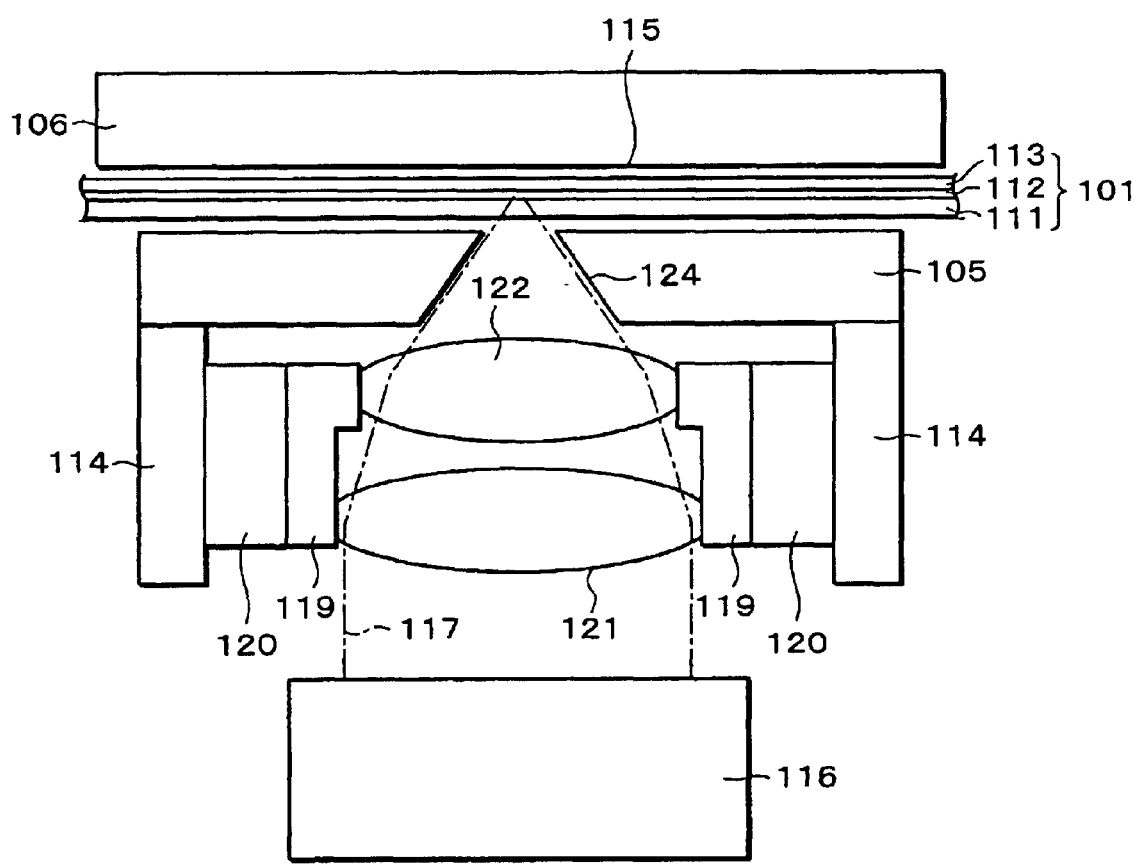
FIG. 26 is a cross sectional view schematically showing yet another structure of the optical disk device.

FIG. 26 schematically shows a cross section of a magnified portion of the arrangement of FIG. 24, wherein a portion of the transparent stabilizing board 105 which passes light has a light passage opening 124.

In the arrangements of FIG. 23 through FIG. 25, the laser beam 117 is required to pass through the transparent stabilizing board 105, which restricts the material of the transparent stabilizing board 105 to optically uniform materials, such as transparent quartz or glass. Another problem is the reflection of light at the both surfaces of the transparent stabilizing board, which lowers the efficiency of using the laser beam 117.

On the other hand, as shown in FIG. 26, the light passage opening 124 of the transparent stabilizing board 105 enables the transparent stabilizing board 105 to be made of a non-transparent material, thus offering a wide selection of materials. For example, the transparent stabilizing board 105 may be made of an inexpensive material such as non-transparent reinforced plastic. Further, since the transparent stabilizing board 105 has no surface at which the laser beam 117 reflects, the laser beam 117 can be used more efficiently.

Figure 27:
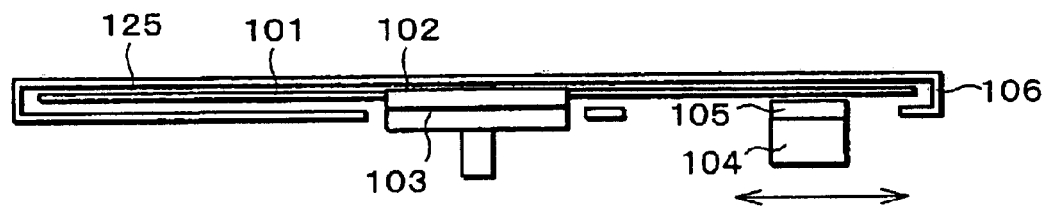
FIG. 27 is a cross sectional view schematically showing still another structure of the optical disk device.

FIG. 27 shows an arrangement for further stabilizing rotation of the flexible optical disk 101, wherein the surface of the optical disk cartridge 106 defining the counter stabilizing surface 107, i.e., the entire inner surface of the optical disk cartridge 106 opposite the surface having the opening defines a first entire stabilizing surface 125. By thus placing the flexible optical disk 101 and the first entire stabilizing surface 125 of the optical disk cartridge 106 in close proximity, the optical disk 101 can be rotated further stably.

In the arrangement of FIG. 21, stable rotation of the optical disk 101 with less fluttering is realized by rotating the optical disk 101 between the transparent stabilizing board 105 and the counter stabilizing surface 107, which is defined by the inner wall surface of the optical disk cartridge 106, so that the air pressure between the optical disk 101 and the transparent stabilizing board 105 balances with that between the optical disk 101 and the counter stabilizing surface 107. However, the optical disk 101 rotating in the cartridge can move slightly in an area where the optical disk 101 is not sandwiched by the transparent stabilizing board 105 and the counter stabilizing surface 107.

Thus, by the influence of external force such as oscillation, the flexible optical disk 101 may flutter slightly in the space of the optical disk cartridge 106, which could result in instable rotation.

On the other hand, in the arrangement shown in FIG. 27, the flexible optical disk 101 is rotated by the spindle 103, which creates a space of reduced pressure between the flexible optical disk 101 and the first entire stabilizing surface 125. As a result, the optical disk 101 is drawn to the first entire stabilizing surface 125 and stably rotates at a constant distance from the first entire stabilizing surface 125.

Thus, fluttering of the flexible optical disk 101 can also be prevented in an area where the flexible optical disk 101 is not sandwiched by the transparent stabilizing board 105 and the counter stabilizing surface 107, thereby attaining desirable recording and reproducing.

Here, as with the other embodiments of the present invention, the thickness of the flexible optical disk 101 is preferably not less than 30 $\mu$m and not more than 400 $\mu$m. A thickness of the optical disk 101 less than 30 $\mu$m makes it difficult for the optical disk 101 to maintain a strength to withstand rotation. On the other hand, a thickness of the optical disk 101 exceeding 400 $\mu$m makes the optical disk 101 less flexible, which undermines the effect of suppressing fluttering of the optical disk 101 by the transparent stabilizing board 105, the counter stabilizing surface 107, and the first entire stabilizing surface 125.

Further, in order for the inner wall of the optical disk cartridge 106 to serve as the first entire stabilizing surface 125, the distance between the optical disk 101 and the first entire stabilizing surface 125 is preferably not less than 10 $\mu$m and not more than 200 $\mu$m.

A distance between the optical disk 101 and the first entire stabilizing surface 125 less than 10 $\mu$m causes the optical disk 101 to collide with the first entire stabilizing surface 125, and the surface of the optical disk 101 is more likely to be scratched. On the other hand, a distance between the optical disk 101 and the first entire stabilizing surface 125 exceeding 200 $\mu$m prevents the first entire stabilizing surface 125 to serve as a stabilizing board, which may result in instable rotation of the optical disk 101 in the optical disk cartridge 106 due to such factors as oscillation.

Figure 28:
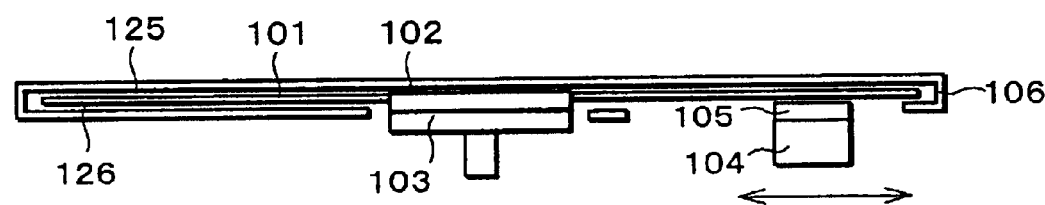
FIG. 28 is a cross sectional view schematically showing yet another structure of the optical disk device.

FIG. 28 shows an arrangement for further stabilizing rotation of the flexible optical disk 101, wherein the surface of the optical disk cartridge defining the counter stabilizing surface 107, i.e., the entire inner wall surface of the optical disk cartridge 106 opposite the surface having an opening defines the first entire stabilizing surface 125, and the entire inner wall surface of the optical disk cartridge 106 on the side of the opening defines a second entire stabilizing surface 126.

By thus placing the optical disk 101 in the vicinity of the first entire stabilizing surface 125 and the second entire stabilizing surface 126 of the optical disk cartridge 106, the optical disk 101 can be rotated further stably.

In the arrangement shown in FIG. 27, the flexible optical disk 101 is placed in the vicinity of the first entire stabilizing surface 125 to realize stable rotation of the optical disk 101. However, in an area where the optical disk 101 is not sandwiched between the transparent stabilizing board 105 and the counter stabilizing surface 107, the optical disk 101 rotating in the cartridge can move away from the first entire stabilizing surface 125.

Thus, by the influence of external force such as oscillation, the flexible optical disk 101 flutters in the space of the optical disk cartridge 106, which prevents stable rotation.

On the other hand, in the arrangement of FIG. 28, stable rotation of the flexible optical disk 101 with less fluttering is realized by driving the flexible optical disk 101 to rotate between the first entire stabilizing surface 125 and the second entire stabilizing surface 126 by the spindle 103, so that the air pressure between the optical disk 101 and the first entire stabilizing surface 125 balances with that between the optical disk 101 and the second entire stabilizing surface 126.

Thus, fluttering of the flexible optical disk 101 can also be prevented in an area where the flexible optical disk 101 is not sandwiched by the transparent stabilizing board 105 and the counter stabilizing surface 107, thereby attaining desirable recording and reproducing.

Here, the thickness of the flexible optical disk 101 is preferably not less than 30 $\mu$m and not more than 400 $\mu$m. A thickness of the optical disk 101 less than 30 $\mu$m makes it difficult for the optical disk 101 to maintain a strength to withstand rotation. On the other hand, a thickness of the optical disk 101 exceeding 400 $\mu$m makes the optical disk 101 less flexible, which undermines the effect of suppressing fluttering of the optical disk 101 by the transparent stabilizing board 105 and the counter stabilizing surface 107, and by the first entire stabilizing surface 125 and the second entire stabilizing surface 126.

Further, in order for the inner wall of the optical disk cartridge 106 to serve as the first entire stabilizing surface 125 and the second entire stabilizing surface 126, the distance between the optical disk 101 and the first entire stabilizing surface 125 and the distance between the optical disk 101 and the second entire stabilizing surface 126 are each preferably not less than 10 $\mu$m and not more than 200 $\mu$m.

A distance between the optical disk 101 and the first entire stabilizing surface 125 or the second entire stabilizing surface 126 less than 10 $\mu$m causes the optical disk 101 to collide with the first entire stabilizing surface 125 or the second entire stabilizing surface 126, and the surface of the optical disk 101 is more likely to be scratched.

On the other hand, a distance between the optical disk 101 and the first entire stabilizing surface 125 or the second entire stabilizing surface 126 exceeding 200 $\mu$m prevents the first entire stabilizing surface 125 and the second entire stabilizing surface 126 to serve as a stabilizing board, which may result in instable rotation of the optical disk 101 in the optical disk cartridge 106 due to such factors as oscillation.

According to the foregoing Fifth Embodiment, an optical disk device of the present invention, which records and reproduces information with respect to an optical disk, comprises: rotation driving means for rotating an optical disk; a focusing unit for focusing light from a light source on the optical disk; a support member for supporting the focusing unit; and a rotation stabilizing board, fixed to the support member so as to be disposed between the focusing unit with the support member and the optical disk, for stabilizing rotation of the optical disk.

That is, in the present invention, the focusing means, i.e., the focusing unit and the support member are provided with the rotation stabilizing board for stabilizing rotation of a flexible disk, so as to prevent fluttering of the optical disk which may be caused when the focusing unit and the support member are positioned in the vicinity of the optical disk, thereby enabling desirable recording and reproducing.

Further, in the present invention, by defining the inner wall of the optical disk cartridge to make up the rotation stabilizing surface for further stabilizing rotation of the optical disk, the optical disk can be rotated between the rotation stabilizing board, which is provided on the support member of the focusing unit, and the rotation stabilizing surface, which is defined by the inner wall of the optical disk cartridge, by balancing the air pressure between the optical disk and the rotation stabilizing board with that between the optical disk and the rotation stabilizing surface. This suppresses fluctuation of pressure which may be generated around the optical pickup, and thus suppresses fluttering of the flexible optical disk when it is rotating. As a result, desirable recording and reproducing can be realized.

Further, in the optical disk device according to the present invention, by the provision of the rotation stabilizing board which is fixed on the support member of the focusing means via a spring, it is possible to prevent pressure fluctuation which may be caused around the optical pickup, and to prevent fluttering of the flexible optical disk when it is rotating. As a result, it is possible to desirably record and reproduce information and to completely suppress damage to the optical disk which is caused when the flexible optical disk collides with the rotation stabilizing board.

Further, in the optical disk device according to the present invention, the focusing unit may be a dual lens composed of two lenses. This increases numerical aperture NA, thus providing the optical disk device which is suitable for high-density recording and reproducing.

In the present invention, the rotation stabilizing board can be made of a material, for example, such as transparent quartz and glass, which can essentially pass light which is focused by the focusing unit, or made entirely of a material which does not pass light focused by the focusing unit, so as to instead form a light passage opening for allowing passage of light. That is, the rotation stabilizing board can be made of a non-transparent material, which provides a wider selection of materials and eliminates from the rotation stabilizing board a reflecting surface of the laser beam, thereby using the laser beam more efficiently.

In the optical disk cartridge which contains a flexible optical disk in the optical disk device according to the present invention, one surface of the optical disk cartridge has a first opening through which the rotation driving means (specifically, spindle) enters the optical disk cartridge, and a second opening through which at least the focusing unit enters the optical disk cartridge. Here, only one surface of the optical disk cartridge has the first opening and the second opening, and there is no opening on the other side of the optical disk cartridge. This allows only one surface of the optical disk cartridge to have a slide shutter which is used to open and close an opening of the optical disk cartridge to prevent dusts from entering the optical disk cartridge. As a result, it is possible to simplify the slide shutter of the optical disk cartridge.

Further, in the optical disk cartridge, the inner wall of the optical disk cartridge opposite the surface with the second opening may constitute a rotation stabilizing surface. In this case, the flexible optical disk is placed between the rotation stabilizing board (transparent stabilizing board) and the inner wall of the optical disk cartridge. As a result, fluttering of the flexible optical disk can be suppressed, thus desirably recording and reproducing information.

Further, in the optical disk cartridge, the entire surface of one of inner walls of the optical disk cartridge opposite the surface with the second opening may constitute a first entire stabilizing surface with respect to the flexible optical disk. In this case, the first entire stabilizing surface defining the inner wall surface of the optical disk cartridge can suppress fluttering of the flexible optical disk more effectively, thus recording and reproducing information more stably and more desirably.

Further, in the optical disk cartridge, the entire surface of one of inner walls of the optical disk cartridge opposite the surface with the second opening may constitute a first entire stabilizing surface with respect to the flexible optical disk, and the inner wall surface with the second opening may constitute a second entire stabilizing surface with respect to the flexible optical disk. In this case, the first entire stabilizing surface and the second entire stabilizing surface defining the inner wall surfaces of the optical disk cartridge can suppress fluttering of the flexible optical disk more effectively, thus recording and reproducing information more stably and more desirably.

Here, it is preferable in the optical disk cartridge that the distance between the flexible optical disk and the first entire stabilizing surface is not less than 10 ηm and not more than 200 μm, the distance between the flexible optical disk and the second entire stabilizing surface is not less than 10 μm and not more than 200 μm. In this way, the first and second entire stabilizing surfaces serve as a stabilizing board of the flexible optical disk to suppress fluttering of the flexible optical disk more effectively, thus recording and reproducing information more stably and more desirably.

As described, according to the optical disk device of the present invention, the support member of the focusing unit is provided with the rotation stabilizing board for stabilizing rotation of the optical disk, so as to prevent fluttering of the optical disk which may be caused when the focusing unit and the support member of the focusing unit are positioned in the vicinity of the optical disk. As a result, information can be recorded and reproduced desirably.

Further, in the present invention, the inner wall of the optical disk cartridge may define the rotation stabilizing surface for further stabilizing rotation of the optical disk. In this case, the flexible optical disk stably rotates between the transparent stabilizing board and the rotation stabilizing surface which is defined by the inner wall of the optical disk cartridge on the opposite side, by balancing the air pressure between the optical disk and the rotation stabilizing board with the air pressure between the optical disk and the rotation stabilizing surface. This makes it possible to suppress pressure fluctuation which occurs around the optical pickup, and thus fluttering of the flexible optical disk, thus realizing desirable recording and reproducing of information.

Note that, the foregoing embodiments of the present invention indicated that the first stabilizing board can be realized with a material other than a transparent material. The following embodiments will describe the case where a focusing slider, instead of the transparent stabilizing board 5, is provided as the first stabilizing board, wherein the focusing slider has the focusing means (lens, etc.) on the stabilizing board itself and has the function of the slider.

[Sixth Embodiment]

The following will describe yet another embodiment of the present invention. Note that, the present embodiment describes the case where the recording and reproducing device is an optical disk device which records and reproduces information with respect to an optical disk, not a magneto-optical disk.

Figure 29:
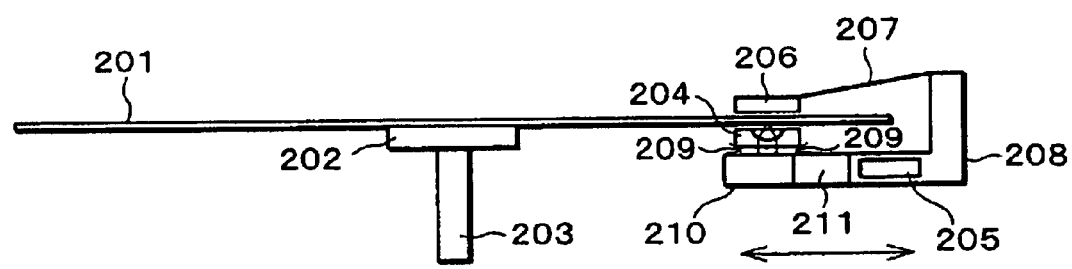
FIG. 29 is a cross sectional view showing a structure of relevant part of a recording and reproducing device of still another embodiment of the present invention.

FIG. 29 is a cross sectional view showing relevant part of an optical disk device according to the present embodiment. As shown in FIG. 29, the optical disk device of the present embodiment includes a spindle (rotation driving means) 203, a focusing slider 204, an optical pickup 205, a stabilizing slider 206, and a suspension 207, so as to record and reproduce information with respect to a flexible optical disk 201 (simply "optical disk" hereinafter).

The optical disk 201 is fixed on the spindle 203 via a center hub 202 and is rotated by driving the spindle 203. The focusing slider 204 with focusing means, and the stabilizing slider 206 which is supported by the suspension 207 are disposed with the optical disk 201 in between.

The suspension 207 on the opposite end of the stabilizing slider 206 is fixed to an optical pickup carriage 208. The optical pickup carriage 208 has the optical pickup 205.

The focusing slider 204 is fixed on a slider holder 210 via a first board spring 209. The slider holder 210 is fixed to the optical pickup carriage 208 via a second board spring 211.

The focusing slider 204, the optical pickup 205, and the stabilizing slider 206 are driven by a linear motor or swing arm to move in a radial direction of the optical disk 201.

Note that, the focusing slider 204 has the same function as the transparent stabilizing board 5 used as the first stabilizing board in the First and Second Embodiments, and has focusing means for focusing a light beam from the optical pickup 205 on the optical disk 201. Details of the focusing slider 204 will be described later.

Figure 30:
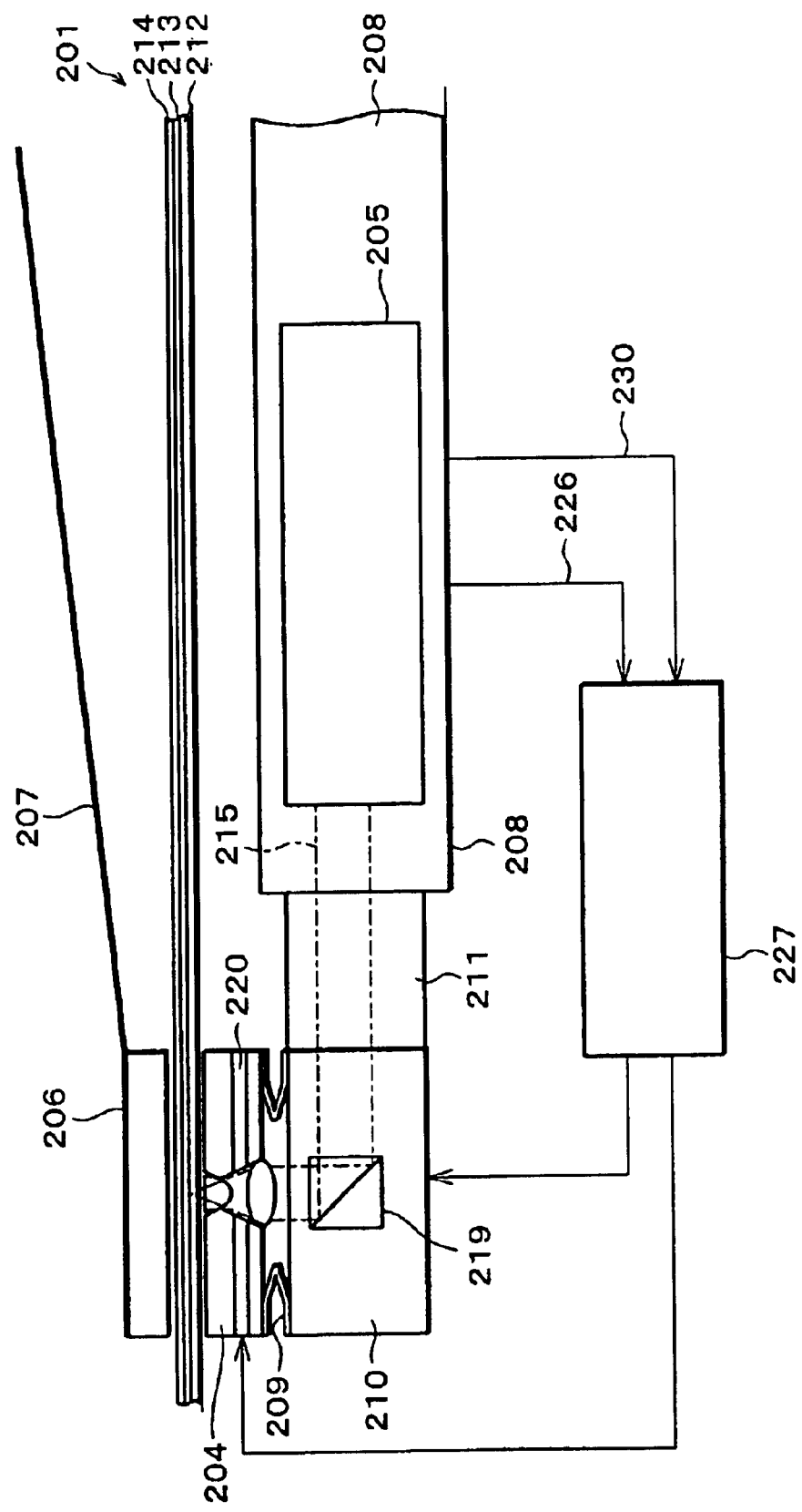
FIG. 30 is a cross sectional view showing a structure of relevant part of the recording and reproducing device of FIG. 29.

As shown in FIG. 30, the optical disk 201 is made up of an optical disk substrate 212, an optical recording medium 213, and a protective coat 214. A light beam 215 emitted from the optical pickup 205 is focused on the optical recording medium 213 by the focusing means which is fixed on the focusing slider 204, so as to record, erase, and reproduce information.

The optical disk substrate 212 is a flexible resin substrate such as a polyethylene terephthalate (PET) film, and the focal plane of the optical disk substrate 212 has tracking guiding grooves, for example, by the 2P method.

The optical recording medium 213 may be made of a phase change recording material such as GeSbTe or InAgSbTe, a magneto-optical recording material such as TbFeCo, a super-resolution magneto-optical recording material such as TbFeCo and GdFeCo stacked together in multiple layers, and a write once recording medium incorporating a pigment-containing organic material. Further, the optical recording medium 213 may be a read only optical disk which is prepared by forming pits on the optical disk substrate 212 together with a reflecting film which is provided instead of the optical recording medium 213.

The protective coat 214 is provided to prevent damage to the optical recording medium 213, which may be caused when the optical disk 201 collides with the stabilizing slider 206. The protective coat 214 may be a resin layer, for example, such as a UV curable resin layer or a resin sheet adhesive layer. Further, a thin film of SiN, AlN, or SiC may be used as well. Further, a lubricating coat layer may be additionally provided on the protective coat 214.

Figure 31:
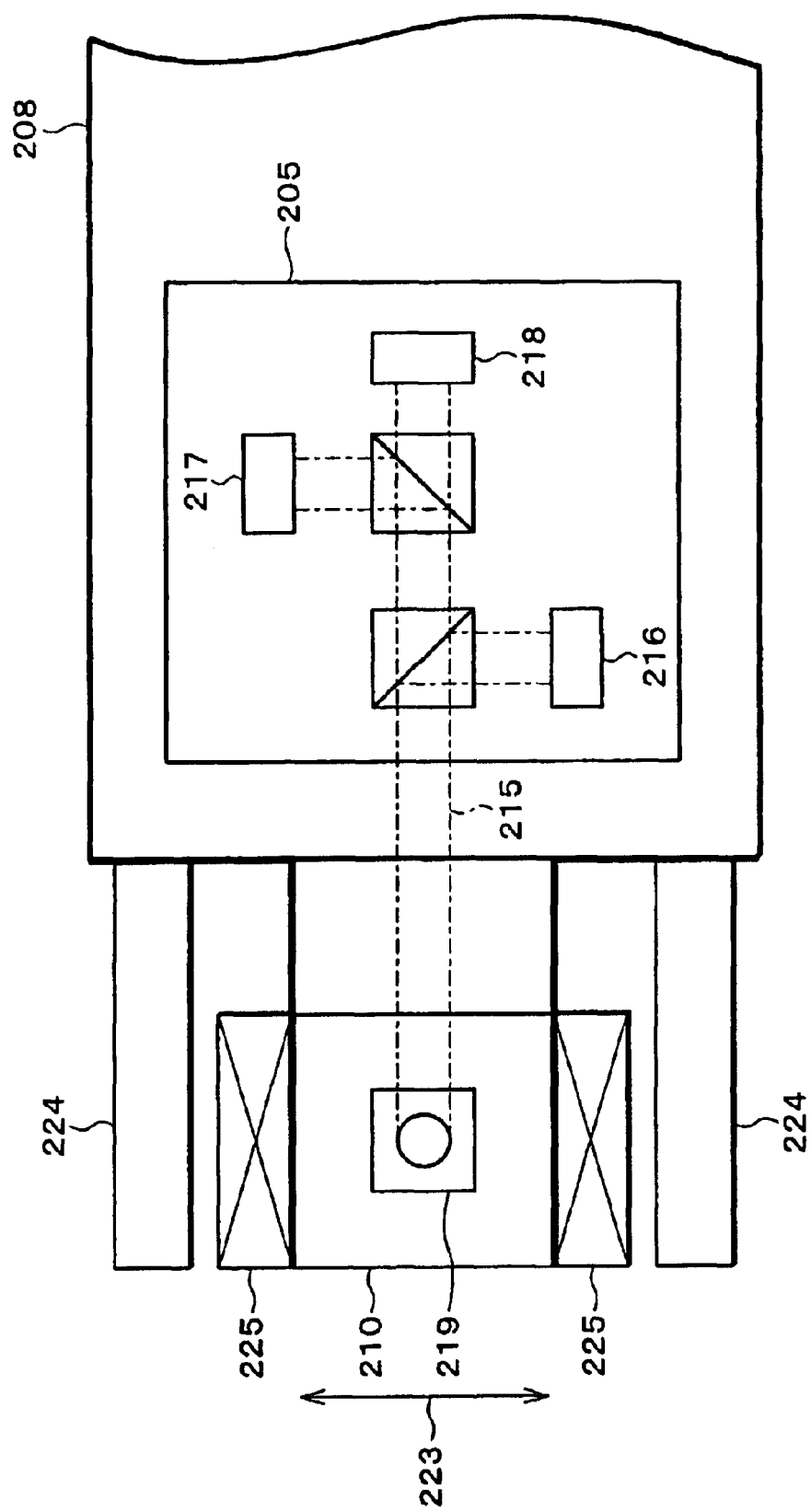
FIG. 31 is a plan view showing a structure of relevant part of the recording and reproducing device of FIG. 30.

As shown in FIG. 31, the optical pickup 205 has optical elements including a light emitting element 216, a focusing tracking light receiving element 217, and a reproduced signal detecting light receiving element 218. The optical pickup 205 is fixed on the optical pickup carriage 208, and the light beam 215 from the optical pickup 205 is deflected toward the optical disk 201 by a stand mirror 219 which is disposed and fixed on the slider holder 210, and the light beam 215 is focused on the optical recording medium 213 through a first lens 221 and a second lens 222 which are fixed on the focusing slider 204 having a piezoelectric element 220.

The focusing slider 204 is fixed on the slider holder 210 via the first board spring 209 which pushes the focusing slider 204 toward the optical disk 201. The stabilizing slider 206 is fixed on the optical pickup carriage 208 via the suspension 207, and the stabilizing slider 206 is also pushed toward the optical disk 201. That is, the focusing slider 204 and the stabilizing slider 206 are disposed on the both sides of the optical disk 201.

Thus, an air flow which is generated by rotation of the optical disk 201 creates an air bearing between the optical disk 201 and the focusing slider 204, and between the optical disk 201 and the stabilizing slider 206. Therefore, access is made in the radial direction while the optical disk 201 is driven to stably rotate between the focusing slider 204 and the stabilizing slider 206 at a constant distance from these sliders, by balancing air pressure between the optical disk 201 and the focusing slider 204 with that between the optical disk 201 and the stabilizing slider 206.

The slider holder 210 is fixed on the optical pickup carriage 208 via the second board spring 211 so that the slider holder 210 can be driven in track direction 223 (radial direction of the disk).

To the optical pickup carriage 208 is fixed a pair of permanent magnets 224, which, with a coil 225 fixed on the slider holder 210, make up a magnetic circuit. The magnetic circuit serves as a tracking actuator which enables the slider holder 210 to be driven in the track direction 223, so as to drive the focusing slider 204 in track direction 223 with the slider holder 210.

In the tracking actuator, as shown in FIG. 30 and FIG. 31, a tracking error signal 226 outputted from the focusing tracking light receiving element 217 in the optical pickup 205 is inputted to the control circuit 227, so as to drive the coil 225 according to the control signal from the control circuit 227, thus driving (tracking) the slide holder 210 in track direction 223.

The following describes the focusing slider 204.

Figure 32:
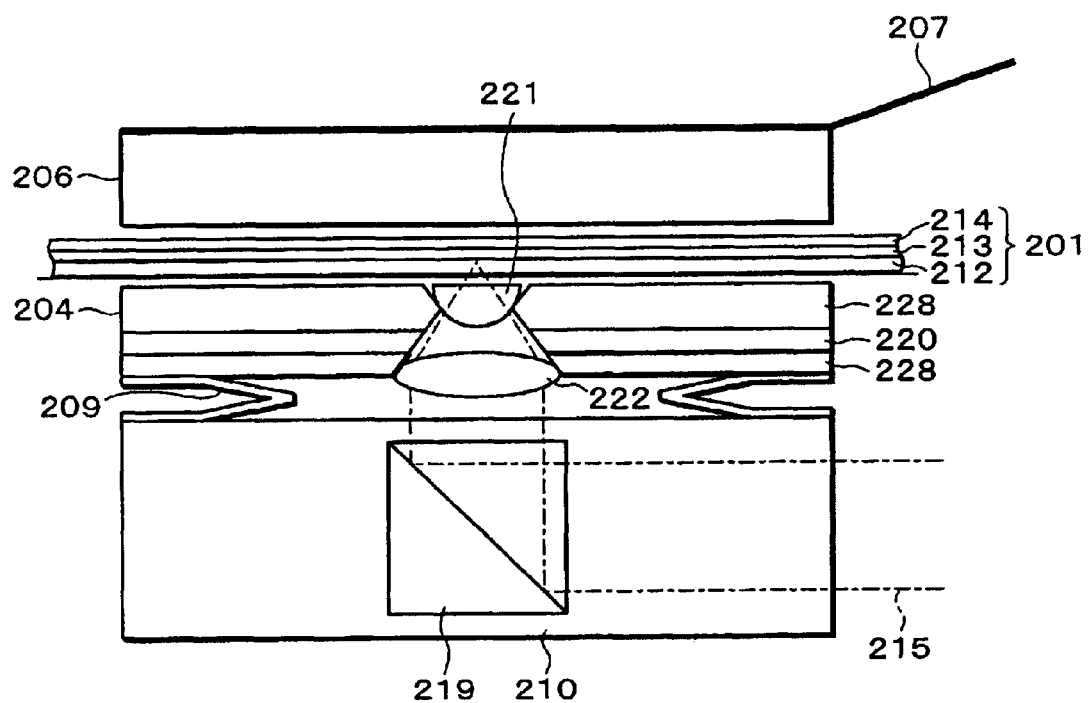
FIG. 32 is a cross sectional view schematically showing a structure of the recording and reproducing device of FIG. 29 when light is projected from the side of a disk substrate of the disk.

As shown in FIG. 32, the focusing slider 204 is made up of a slider member 228 and the piezoelectric element 220, wherein the piezoelectric element 220 is placed between the slider member 228.

The slider member 228 is made of a material, for example, such as a metal plate, ceramic plate, or plastic plate with a thickness in a range of 0.2 to 1.5 mm. Further, the piezoelectric element 220 may be a stacked piezoelectric element with a thickness of 0.2 mm to 1.0 mm, for example, such as that taught in Japanese Unexamined Patent Publication No. 121820/1999 (Tokukaihei 11-121820).

Further, the slider member 228 at its center has a perforation 229, wherein the first lens 221 and the second lens 222 are disposed in the perforation 229 in this order with respect to the optical disk 201.

The first lens 221 and the second lens 222 are provided to bridge the piezoelectric element 220, and the distance between the first lens 221 and the second lens 222 is controlled by applying a voltage to the piezoelectric element 220. This is focusing, in which the distance between the first lens 221 and the second lens 222 is adjusted to correct focusing errors on the optical recording medium 213 which are caused by a change in thickness of the optical disk substrate 212 making up the optical disk 201, or by a change in distance between the optical disk 201 and the focusing slider 204.

As shown in FIG. 30 and FIG. 31, a focus error signal 230 outputted from the focus tracking light receiving element 217 is inputted to the control circuit 227, and the piezoelectric element 220 is driven by a control signal from the control circuit 227.

In the present embodiment, the perforation 229 of the focusing slider 204 is created by forming depressions in the form of a bowl on the surfaces of the focusing slider 204 respectively facing the optical disk 201 and the slider holder 210, wherein the depression of one surface is aligned with the depression of the other surface on a common central line. The slope of these depressions making up the perforation 229 is used as a reference plane to fix the first lens 221 and the second lens 222 on the focusing slider 204 using an adhesive agent.

Fixing the first lens 221 and the second lens 222 on the focusing slider 204 using an adhesive agent makes it easier to position these lenses and prevents misalignment of the lenses in the horizontal direction. Thus, there will be no misalignment of optic axes of the first lens 221 and the second lens 222 in tracking operations when the first lens 221 and the second lens 222 are driven in the horizontal direction, thus realizing a stable and desirable focused state.

EXAMPLE 1

The following describe Examples of the optical disk device according to the present embodiment. Example 1 describes the case of the optical disk device of FIG. 16.

The optical disk 201 was prepared as follows. On optical disk substrate 212 made of polyethylene terephthalate having a thickness of 50 $\mu$m was formed a 5 $\mu$m thick 2P resin layer. The 2P resin layer had guiding tracks, 20 nm deep, which are spiral lands and grooves each with a width of 0.23 $\mu$m. On the guiding tracks were formed optical recording medium 213 composed of a 40 nm thick ZnS—SiO$_2$ interference film, a 15 nm thick AgInSbTe phase change recording film, a 20 nm thick ZnS—SiO$_2$ interference film, and a 120 nm thick Ag reflecting film, which were stacked in this order. Finally, protective coat 214 made of SiC was formed in a thickness of 50 nm on the optical recording medium 213.

The optical disk 201 so prepared was attached to the spindle 203, as shown in FIG. 1 of the First Embodiment, to drive the optical disk 201 at 3000 rpm. In order to realize stable rotation, a stabilizing board (not shown) was provided over the area other than the area where the focusing slider 204 and the stabilizing slider 206 were provided.

Then, the focusing slider 204 and the stabilizing slider 206 were positioned in the vicinity of the optical disk 201 SO as to create an air bearing by the rotation of the optical disk 201 between the optical disk 201 and the focusing slider 204 and between the optical disk 201 and the stabilizing slider 206. The optical disk 201 was rotated so as to balance the air pressure between the optical disk 201 and the focusing slider 204 with that between the optical disk 201 and the stabilizing slider 204, so that a constant distance could be maintained between the optical disk 201 and the focusing slider 204 and between the optical disk 201 and the stabilizing slider 206. Here, the distance between the optical disk 201 and the focusing slider 204 and between the optical disk 201 and the stabilizing slider 206 was about 10 $\mu$m each.

In this Example, a semiconductor laser with a wavelength of 405 nm was used as the light emitting element in the optical pickup 205, and the first lens 221 and the second lens 222 were designed to have effective numerical aperture of 0.9. With this arrangement, the spot size of the light beam on the optical recording medium 213 under optimum condition was 350 nm.

Here, light was continuously emitted from the semiconductor laser used as the light emitting element 216 so that the light which travelled through the first lens 221 struck on the optical recording medium 213 at 0.5 mW. The light reflected at the optical disk 201 was used to obtain the tracking error signal 226, which was obtained from the focusing tracking light receiving element 217 in the optical pickup 205, and the tracking error signal 226 was inputted to the control circuit 227 with the focus error signal 230. The control circuit 227 carried out the focusing control and the tracking control in response to these input signals, whereby the former was effected by feeding electricity to the piezoelectric element 220 via a pair of focusing control wires 231 and the latter was effected by feeding electricity to the coil 225 making up the tracking actuator via a pair of tracking control wires 232.

According to this method, while focusing and tracking were carried out, the light emitting element 216 was effected to emit light in pulses with the peak power of the emitted light pulse through the first lens 221 at 5 mW, so as to form a series of recording marks with a diameter of 0.18 μm and a pitch of 0.36 μm on the AgInSbTe phase change recording film of the optical recording medium 213. After forming the recording marks, the light emitting element 216 was effected to continuously emit light so that the power of the light through the first lens 221 was 0.5 mW. A change in quantity of the reflected light from the optical disk 201 was detected by the reproduced signal detecting light receiving element 218 (FIG. 31) so as to reproduce information. A reproduced signal from the reproduced signal detecting light receiving element 218 was evaluated using a spectrum analyzer. The result was a carrier-to-noise ratio (CNR) of 43 dB, which confirmed that the optical disk device of the present Example could produce a reproduced signal which enables the optical disk device to be used as the recording and reproducing device.

EXAMPLE 2

In the arrangement of Example 1, as shown in FIG. 32, information was recorded and reproduced by the recording/reproducing light which was incident from the side of the optical disk substrate 212 having flexibility, so as to form a light beam spot with a diameter of 350 nm on the optical recording medium 213. This caused aberration due to a change in thickness of the optical disk substrate 212. Thus, in order to realize stable focusing, the effective numerical aperture of the dual focusing lens was set to 0.9.

Figure 33:
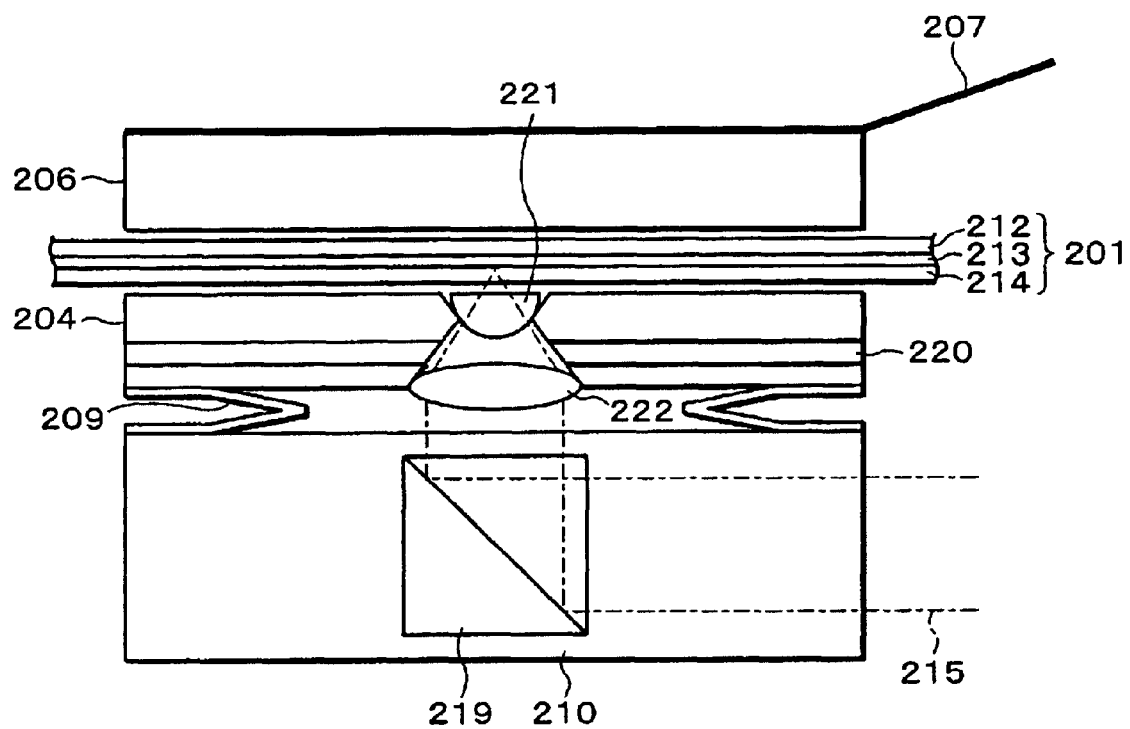
FIG. 33 is a cross sectional view schematically showing a structure of relevant part of the recording and reproducing device of FIG. 29 when light is projected from the side of a protective film of the disk.

In Example 2, as shown in FIG. 33, the recording/reproducing light was incident from the side of the optical recording medium 213. This prevents the focusing optical system (first lens 221, second lens 222) from being influenced by a change in thickness of the optical disk substrate 212, and thus enables the effective numerical aperture of the dual focusing lens to be increased above 0.9 and the diameter of the light beam spot to be reduced.

The optical disk 201 in Example 2 was prepared as follows. On optical disk substrate 212 made of polyethylene terephthalate having a thickness of 50 μm was formed a 5 μm thick 2P resin layer. The 2P resin layer had guiding tracks, 15 nm deep, which are spiral lands and grooves each with a width of 0.20 μm. On the guiding tracks were formed optical recording medium 213 composed of a 120 nm thick Ag reflecting film, a 20 nm thick ZnS—SiO$_2$ interference film, a 15 nm thick AgInSbTe phase change recording film, and a 40 nm thick ZnS—SiO$_2$ interference film, which were stacked in this order. Finally, protective coat 214 made of SiC was formed with a thickness of 3 nm on the optical recording medium 213. The protective coat 214, being extremely thin, did not show a change in thickness which causes aberration.

As in FIG. 29, the optical disk 201 so prepared was attached to the spindle 203 to drive the optical disk 201 at 3000 rpm, so as to maintain a constant distance between the optical disk 201 and the focusing slider 204 and between the optical disk 201 and the stabilizing slider 206. The distance between the optical disk 201 and the focusing slider 204 and between the optical disk 201 and the stabilizing slider 206 was adjusted to 2 μm by adjusting the pressure exerted by the suspension 207 and the first board spring 209.

In Example 2, a semiconductor laser with a wavelength of 405 nm was used as the light emitting element 216 in the optical pickup 205, and the first lens 221 and the second lens 222 were designed to have effective numerical aperture of 1.0. With this arrangement, the spot size of the light beam on the optical recording medium 213 under optimum condition was 320 nm.

Here, light was continuously emitted from the semiconductor laser used as the light emitting element 216 so that the light which travelled through the first lens 221 struck on the optical recording medium 213 at 0.4 mW. The light reflected at the optical disk 201 was used to obtain the tracking error signal 226 and the focus error signal 230, which was obtained from the focusing tracking light receiving element 217 in the optical pickup 217, and the tracking error signal 226 and the focus error signal 230 were inputted to the control circuit 227. The control circuit 227 carried out the focusing control and the tracking control in response to these input signals, whereby the former was effected by feeding electricity to the piezoelectric element 220 via a pair of focusing control wires 231 and the latter was effected by feeding electricity to the coils 225 making up the tracking actuator via a pair of tracking control wires 232.

According to this method, while focusing and tracking were carried out, the light emitting element 216 was effected to emit light in pulses with the peak power of the emitted light pulse through the first lens 221 at 5 mW, so as to form a series of recording marks with a diameter of 0.16 μm and a pitch of 0.32 μm on the AgInSbTe phase change recording film of the optical recording medium 213.

After forming the recording marks, the light emitting element 216 was effected to continuously emit light so that the power of the light through the first lens 221 was 0.4 mW. A change in quantity of the reflected light from the optical disk 201 was detected by the reproduced signal detecting light receiving element 218 so as to reproduce information. A reproduced signal from the reproduced signal detecting light receiving element 218 was evaluated using a spectrum analyzer. The result was a carrier-to-noise ratio (CNR) of 45 dB, which confirmed that the optical disk device of the present Example could produce a reproduced signal which enables the optical disk device to be used as the recording and reproducing device. In addition, it was found in this Example that a higher CNR than that of Example 1 could be obtained with smaller recording marks than Example 1.

In the Third Embodiment, the focusing control of the focusing means (first lens 221, second lens 222) of the focusing slider 204 is carried out by driving the piezoelectric element 220 which is provided for the focusing slider 204. However, not limited to this, for example, as shown in FIG. 34 and FIG. 35, the focusing control may be carried out by a magnetic circuit made up of a permanent magnet 250 and an air-core coil 251 which are respectively provided on the opposing surfaces of the focusing slider 204 and the slider holder 210.

Figure 34:
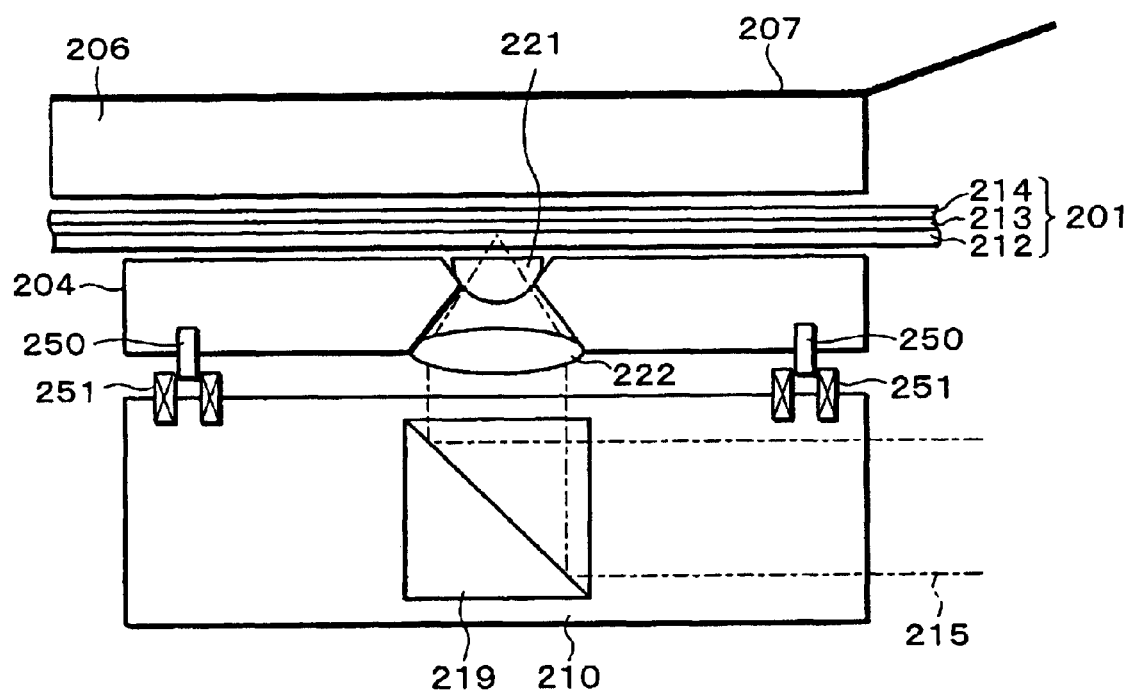
FIG. 34 is a cross sectional view schematically showing a structure of relevant part of the recording and reproducing device of FIG. 29 when light is projected from the side of a protective film of the disk.
Figure 35:
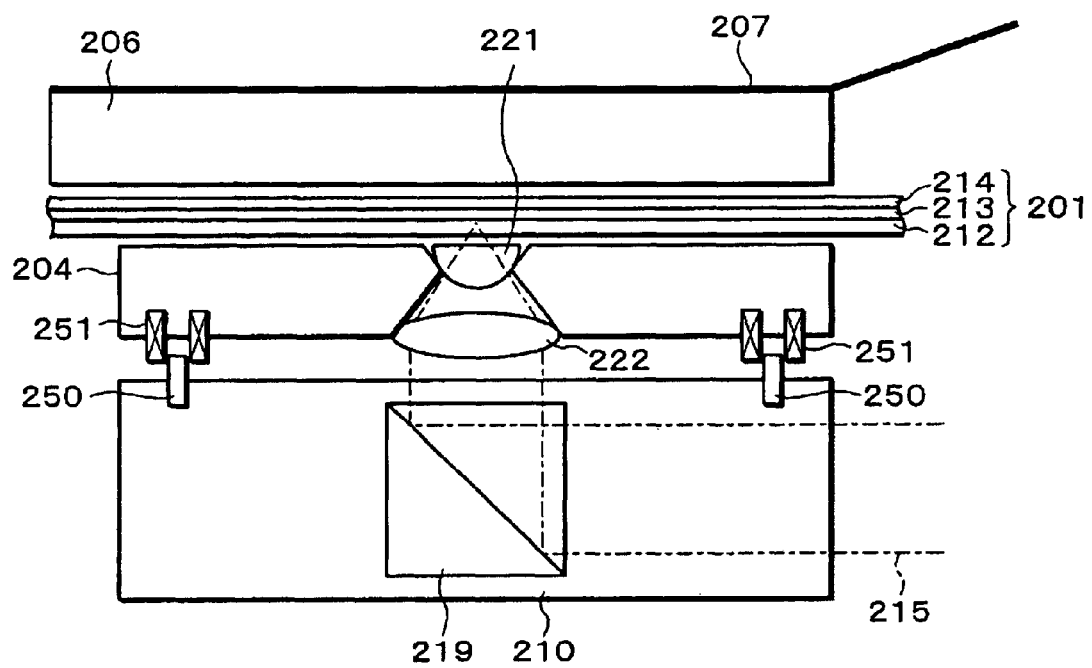
FIG. 35 is a cross sectional view showing a structure of relevant part of the recording device of FIG. 29 when focusing control is carried out differently from FIG. 29.

In FIG. 34, the magnetic circuit for focusing control is provided by providing the permanent magnet 250 on the side of the focusing slider 204 and the air-core coil 251 on the side of the slider holder 210. In FIG. 35, the magnetic circuit for focusing control is provided by providing the permanent magnet 250 on the side of the slider holder 210 and the air-core coil 251 on the side of the focusing slider 204.

In either case, a control signal is supplied to the air-core coil 251 to move the focusing slider 204 toward the optical disk 201 by the magnetic effect imparted between the air-core coil 251 and the permanent magnet 250, so as to control the pressure exerted by the focusing slider 204 on the optical disk 201 and to control the distance between the focusing slider 204 and the optical disk 201, i.e., focusing control is carried out.

In this case, as described above, the focusing slider 204 is moved toward the optical disk 201 by the magnetic circuit which is made up of the permanent magnet 250 and the air-core coil 251. Thus, it is not required to provide the first board spring 209 between the slider holder 210 and the focusing slider 204 to press the focusing slider 204 toward the optical disk 201, as described in FIG. 29 and elsewhere.

[Seventh Embodiment]

The following will describe still another embodiment of the present invention. Note that, constituting elements having the same functions as those described in the Sixth Embodiment are given the same reference numerals and explanations thereof are omitted here.

Figure 36:
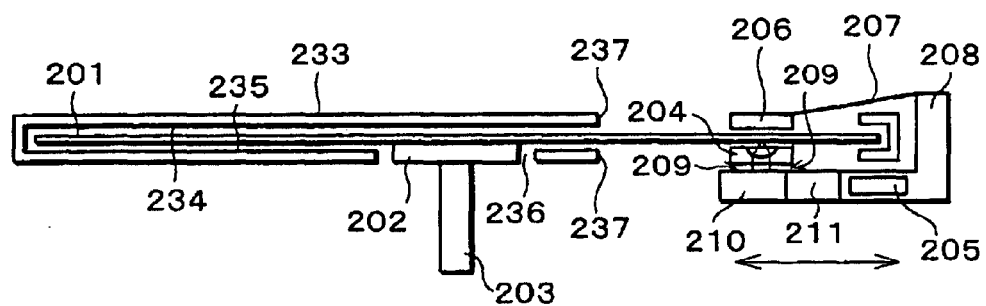
FIG. 36 is a cross sectional view showing a structure of relevant part of a recording and reproducing device according to still another embodiment of the present invention when both inner walls of a cartridge define a stabilizer.
Figure 37:
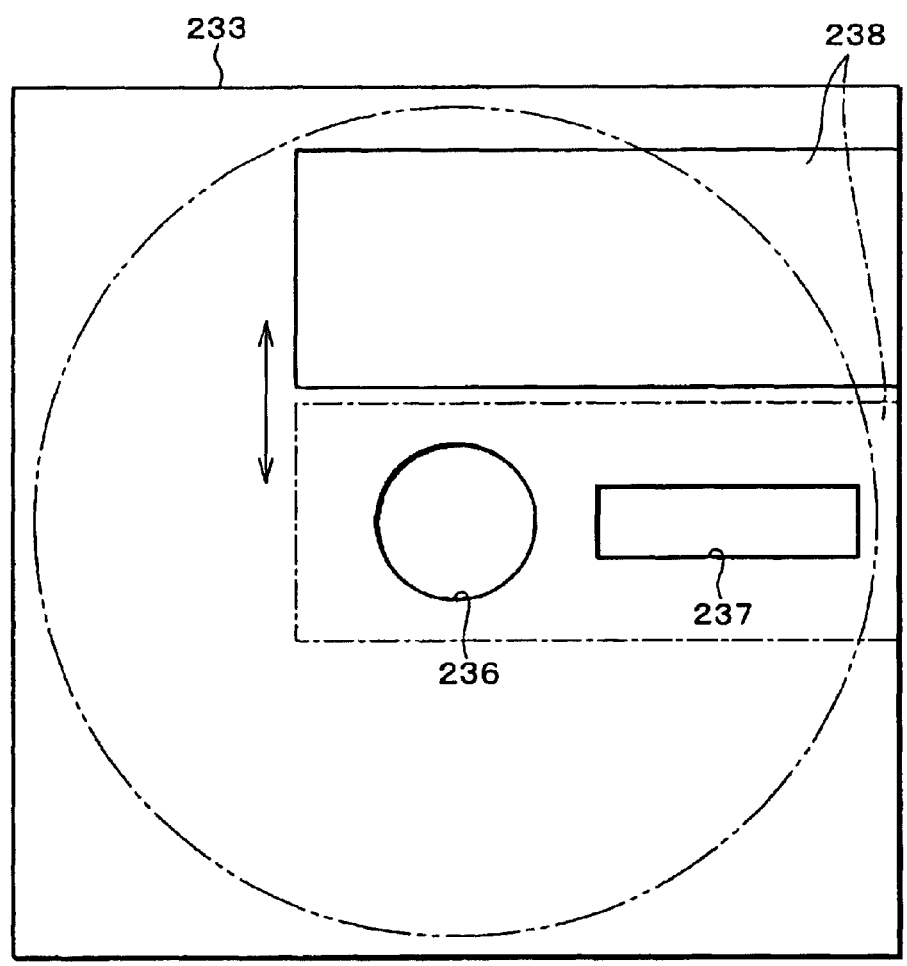
FIG. 37 is a plan view of the cartridge.

In an optical disk device according to the present embodiment, as shown in FIG. 36, in order to further stabilize rotation of flexible optical disk 201, a first inner wall surface 234 and a second inner wall surface 235 of an optical disk cartridge case 233 are used as a stabilizing board. FIG. 37 is a plan view of the optical disk cartridge case 233 of FIG. 36.

The optical disk cartridge case 233 has a first opening 236 for chucking a center hub 202 of the optical disk 201 to a spindle 203, and a second opening 237 which is used to position a focusing slider 204 and a stabilizing slider 206 in the vicinity of the optical disk 201. The optical disk cartridge 233 further includes a slide shutter 238 which can be opened or closed to shield dusts.

The foregoing Sixth Embodiment used the stabilizing board (not shown) to stabilize rotation of the optical disk 201 in an area other than the area sandwiched between the focusing slider 204 and the stabilizing slider 206. In the present embodiment, on the other hand, rotation of the optical disk 201 is stabilized by the first inner wall surface 234 and the second inner wall surface 235 of the optical disk cartridge case 233 which serve as the stabilizing board of the optical disk 201.

With the use of the optical disk cartridge case 233, the optical disk 201 is rotated in such a manner that the air pressure between the first inner wall surface 234 and the optical disk 201 is balanced with that between the second inner wall surface 235 and the optical disk 201 in the optical disk cartridge case 233.

Here, the distance between the first inner wall surface 234 and the optical disk 201 and between the second inner wall surface 235 and the optical disk 201 is set within a range of not less than 10 $\mu$m and not more than 200 $\mu$m. This enables the optical disk 201 to stably rotate at a midway position between the first inner wall surface 234 and the second inner wall surface 235 with the balanced air pressure.

Note that, the distance between the optical disk 201 and the first inner wall surface 234 or between the optical disk 201 and the second inner wall surface 235 less than 10 $\mu$m causes a collision between the optical disk 201 and the first inner wall surface 234 or second inner wall surface 235 to scratch a surface of the optical disk 201.

Further, the distance between the optical disk 201 and the first inner wall surface 234 or between the optical disk 201 and the second inner wall surface 235 more than 200 $\mu$m results in more free movement of the optical disk in the optical disk cartridge case 233. This prevents the first inner wall surface 234 and the second inner wall surface 235 to function as the stabilizing board, which may result in instable rotation of the optical disk 201 in the optical disk cartridge case 233 in response to external disturbance such as oscillation.

As described, in the present embodiment, rotation of the optical disk 201 is stabilized by the first inner wall surface 234 and the second inner wall surface 235 of the optical disk cartridge case 233, so as to suppress shuddering of the optical disk 201 in the optical disk cartridge case 233 and to realize stable rotation even in an event of external disturbance such as oscillation.

In the present embodiment, the optical disk 201 of the Fifth Embodiment was used to record and reproduce information in the manner explained in the Sixth Embodiment. The result was the carrier-to-noise ratio (CNR) of 44.5 dB, thus confirming that the optical disk device of the present embodiment employing the optical disk cartridge case 233 is capable of producing a reproduced signal which enables the optical disk device to be used as the recording and reproducing device.

Further, it is evident that the optical disk cartridge case 233 of the present embodiment can be used in the optical disk device in Example 2 of the Sixth Embodiment.

Further, the foregoing Sixth and Seventh Embodiments described the case where the recording and reproducing device was the optical disk device which records and reproduces information with respect to a recording disk (optical disk) which does not employ magnetism. However, the present invention is not just limited to this arrangement and is also applicable to a magneto-optical disk device which records and reproduces information with respect to a recording disk (magneto-optical disk) which employs magnetism. The following Eighth Embodiment describes such a magnet-optical disk device.

[Eighth Embodiment]

The following will describe yet another embodiment of the present invention. Note that, in the present embodiment, constituting elements having the same reference numerals as those described in the foregoing Sixth and Seventh embodiments are given the same reference numerals and explanations thereof are omitted here. Also, the optical disk device described in this embodiment records and reproduces information with respect to an optical disk which employs magnetism, i.e., a magneto-optical disk.

Figure 38:
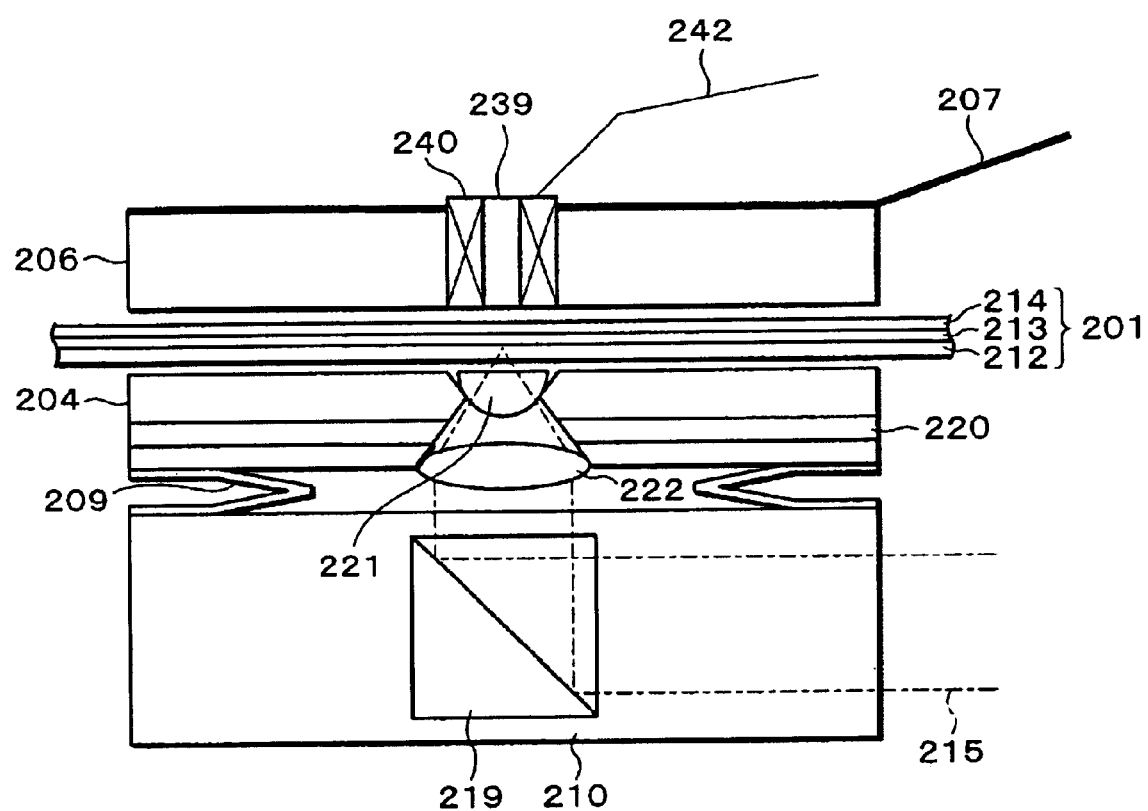
FIG. 38 is, a cross sectional view showing a structure of relevant part of the recording and reproducing device of FIG. 29 when a magneto-optical disk is used.

As shown in FIG. 38, the magneto-optical disk device according to the present embodiment includes a magnetic head 241 composed of a magnetic core 239 and a magnetic coil 240, implanted in the stabilizing slider 206 of the optical disk device of FIG. 32. The other structure is the same as that shown in FIG. 32.

In the present embodiment, the magnetic head 241 is arranged such that the magnetic coil 240, which is a lead wire with a diameter of 40 $\mu$m, is wound around the magnetic core 239, which is a circular pillar with a diameter of 0.2 mm.

The magnetic coil 240 of the magnetic head 241 has a pair of lead wires 242 which are drawn from the side of a suspension 207 of the stabilizing slider 206, so that the surface of the stabilizing slider 206 can be made flat. The lead wires 242 are used to apply a voltage and thus a current through the magnetic coil 240 so as to generate a recording magnetic field.

A magneto-optical disk ("optical disk" hereinafter) 201 has the following construction. On an optical disk substrate 212 made of polyethylene terephthalate having a thickness of 50 $\mu$m, there is provided a 2P resin layer with a thickness of 5 $\mu$m. The 2P resin layer has guiding tracks, 20 nm deep, which are spiral lands and grooves each with a width of 0.23 $\mu$m. On the guiding tracks are stacked, in this order, an AlN interference film with a thickness of 40 nm, a GdFeCo read-out layer with a thickness of 30 nm, an AlN intermediate layer with a thickness of 5 nm, a TbFeCo recording film with a thickness of 30 nm, an SiN interference film with a thickness of 20 nm, and a super resolution magneto-optical recording medium 213 which is made from an Ag reflecting film with a thickness of 120 nm. Finally, a protective coat 214 made of UV curable resin is formed in a thickness of 5 $\mu$m.

Thus, the optical disk 201 is a super resolution magneto-optical disk in which the magnetized information of only a temperature-increased portion of the recording layer is transferred to the read-out layer by magneto-static coupling.

Further, the optical disk 201 may be inserted in the optical disk cartridge 233 of the Seventh Embodiment to stabilize rotation. The optical disk 201 inserted in the optical disk cartridge 233 in this way was used to record and reproduce information, with the focusing slider 204 having the first lens 221 and the second lens 222 as described in the Seventh Embodiment, and the stabilizing slider 206 implanted with the magnetic head 241.

Here, focusing and tracking were carried out with the power of emitted light through the first lens 221 at 0.5 mW. Information was recorded by light pulse magnetic modulation, whereby the light emitting element 216 was caused to emit light in pulses with the peak power of emitted light through the first lens 221 at 6 mW, and the magnetic head 241 was caused to generate a recording magnetic field of about 20 kA/m by applying an AC voltage to the lead wires 242. As a result, a series of record marks with a length of 0.1 $\mu$m were formed on the TbFeCo recording film at the pitch of 0.2 $\mu$m.

After forming the record marks, the light emitting element 216 was caused to continuously emit light with the power of emitted light through the first lens 221 at 0.5 mW. Information was reproduced by detecting a biased state of reflected light from the optical disk 201 using a reproduced signal detecting photoreceptor element 218. The reproduced signal from the reproduced signal detecting photoreceptor element 218 was analyzed using a spectrum analyzer. The result was a carrier-to-noise ratio (CNR) of 44.5 dB, thereby confirming that the reproduced signal enables the magneto-optical disk of the present embodiment to be used as a recording and reproducing device.

Note that, the foregoing described the case where recording and reproducing are carried out with the light beam 215 which is incident on the side of the optical disk substrate 212, as shown in FIG. 32 of the Sixth Embodiment. However, not just limited to this, as shown in FIG. 33 of the Sixth Embodiment, the light may be incident from the side of the optical recording medium 213 to record and reproduce information. In this case, recording density can be increased with the use of a dual lens having larger numerical aperture.

Figure 39:
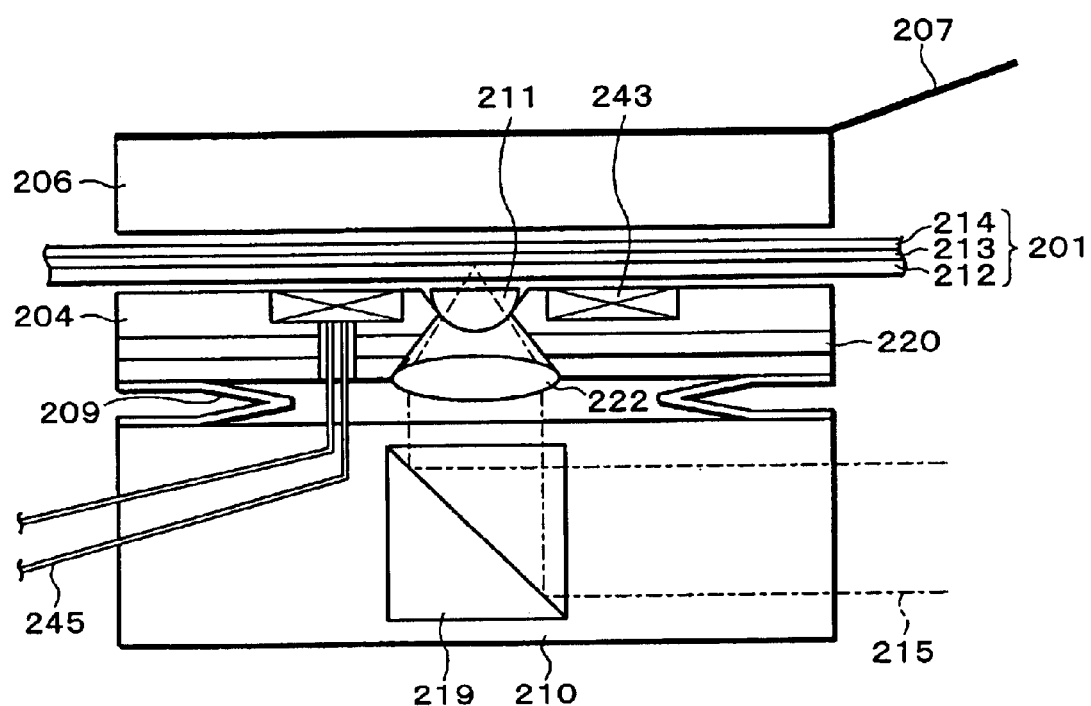
FIG. 39 is a cross sectional view showing a structure of relevant part of the recording and reproducing device of FIG. 29 when a magneto-optical disk is used.
Figure 40:
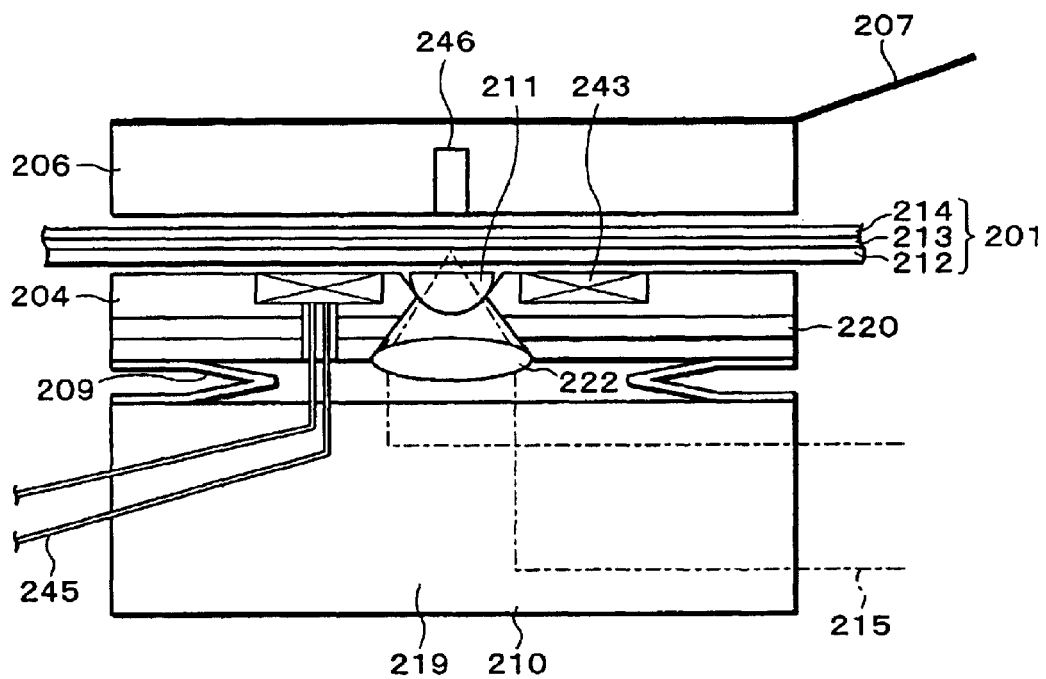
FIG. 40 is a cross sectional view showing a structure of relevant part of the recording and reproducing device of FIG. 29 when a magneto-optical disk is used.

Further, referring to magneto-optical disk devices as shown in FIG. 39 and FIG. 40, the following will describe the case where the magnetic field generating element is provided on the side of the focusing slider 204, as opposed to the stabilizing slider 206.

In the magneto-optical disk device shown in FIG. 39, an air-core coil 243 for inducing a recording magnetic field on the optical recording medium 213 is provided so as to surround the first lens 221 which is fixed on the focusing slider 204. In the present embodiment, the air-core coil 243 is a lead wire with a diameter of 40 $\mu$m which is coiled in a depression in the form of a donut with the inner diameter $\phi$=0.15 mm, outer diameter $\phi$=1.5 mm, and depth=0.5 mm in the focusing slider 204.

In order to improve flatness of the slider, lead wires 244 of the air-core coil 243 are extended through lead wire passage 245 which is formed with a diameter of 0.2 mm at the depression of the focusing slider 204, and are continuously extended to the surface of the focusing slider 204 opposite the slider holder 210. The lead wires 244 are used to apply a voltage and thus a current through the air-core coil 243 to generate a recording magnetic field.

As with the Sixth Embodiment, the optical disk 201 was inserted in the optical disk cartridge 233 to evaluate recording and reproducing ability. As the focusing means, the first lens 211 and the second lens 222 were used as in the Sixth Embodiment.

Here, focusing and tracking were carried out with the power of emitted light through the first lens 221 at 0.5 mW. Information was recorded by light pulse magnetic modulation, whereby the light emitting element 216 was caused to emit light in pulses with the peak power of emitted light through the first lens 221 at 6 mW, and the air-core coil 243 was caused to generate a recording magnetic field of about 10 kA/m by applying an AC voltage to the lead wires 244. As a result, a series of record marks with a length of 0.1 $\mu$m were formed on the TbFeCo recording film at the pitch of 0.2 After forming the record marks, the light emitting element 216 was caused to continuously emit light with the power of emitted light through the first lens 221 at 0.5 mW. Information was reproduced by detecting a biased state of reflected light from the optical disk 201 using a reproduced signal detecting photoreceptor element 218. The reproduced signal from the reproduced signal detecting photoreceptor element 218 was analyzed using a spectrum analyzer. The result was a carrier-to-noise ratio (CNR) of 41 dB, thereby confirming that the reproduced signal enables the magneto-optical disk of the present embodiment to be used as a recording and reproducing device.

Note that, the foregoing described the case where the magneto-optical disk device of FIG. 39 carries out recording and reproducing with the light beam 215 which is incident on the side of the optical disk substrate 212. However, not just limited to this, as shown in FIG. 33 of the Sixth Embodiment, the light may be incident from the side of the optical recording medium 213 to record and reproduce information. In this case, recording density can be increased with the use of a dual lens having larger numerical aperture.

Further, the foregoing described the case where the focusing slider 204 of the magneto-optical disk device of FIG. 39 is provided with the air-core coil 243 as the magnetic field generating element. The following describes a way to improve the intensity of a magnetic field (recording magnetic field intensity) with reference to FIG. 40.

In the magneto-optical disk device of FIG. 40, in order to improve intensity of the magnetic field, a soft magnetic material 246 is implanted in the stabilizing slider 206 in the arrangement of the magneto-optical disk device shown in FIG. 39.

In the present embodiment, an MnZn ferrite was used as the soft magnetic material 246 to record and reproduce information. By thus implanting the soft magnetic material 246 in the stabilizing slider 206, the soft magnetic material 246 is magnetized by the magnetic field generated by the air-core coil 243, thus applying a larger magnetic field to the optical recording medium 213 which is to record information. Application of a voltage to the air-core coil 243 under the same condition as that in the magneto-optical disk device shown in FIG. 39 generated the recording magnetic field of 20 kA/m.

As with the magneto-optical disk device of FIG. 39, the magneto-optical disk device of FIG. 40 was used to form a series of record marks with a length of 0.1 μm on the TbFeCo recording film at the pitch of 0.2 μm of the optical recording medium 213 by magnetic filed modulation recording, and a reproduced signal from the reproduced signal detecting photoreceptor element 218 was analyzed using a spectrum analyzer. The result was a carrier-to-noise ratio (CNR) of 44.5 dB. Thus, it was found that the reproduced signal obtained in the magneto-optical disk device of FIG. 40 is of a higher quality than that of the magneto-optical disk device of FIG. 39.

Note that, the foregoing described the case where the magneto-optical disk device of FIG. 40 carried out recording and reproducing with the light beam 215 which is incident on the side of the optical disk substrate 212. However, not just limited to this, as shown in FIG. 33 of the Sixth Embodiment, the light may be incident from the side of the optical recording medium 213 to record and reproduce information. In this case, recording density can be increased with the use of a dual lens having larger numerical aperture.

According to the foregoing Sixth through Eighth Embodiments, a recording and reproducing device of the present invention, in a recording and reproducing device which records and reproduces information by projecting a laser beam on a disk being rotated, comprises: a stabilizing slider which is disposed to face the disk and supported to oscillate, a surface of the stabilizing slider facing the disk being flat.

According to this arrangement, rotation of the disk causes an air flow between the disk and the stabilizing slider, and an air bearing is created between the stabilizing slider and the disk because the surface of the stabilizing slider facing the disk is flat. Further, since the stabilizing slider is supported to oscillate, the stabilizing slider can be moved to always maintain a constant distance from the disk when the disk is rotating:

Thus, the disk rotates in such a way that a constant distance is maintained between the stabilizing slider and the disk. This suppresses fluttering of the disk even when the disk is rotating at high speed, thus stably recording and reproducing information.

Further, a stabilizing board may be provided opposite the stabilizing slider via the disk.

In this case, just as the air bearing is created between the stabilizing slider and the disk, an air bearing is also created between the stabilizing board and the disk when the disk is rotating. Here, the pressure between the stabilizing slider and the disk and the pressure between the stabilizing board and the disk balance out, so that the disk rotates at a constant distance from the stabilizing slider and the stabilizing board. As a result, fluttering of the disk can be prevented when the disk is rotating, thus further stabilizing rotation of the disk.

The stabilizing board may be adapted so that it makes up a slider which is supported to oscillate and has a surface facing the stabilizing slider.

In this case, as with the stabilizing slider, the stabilizing board is a slider which is supported to oscillate, and therefore the stabilizing board can move to always maintain a constant distance from the disk. Thus, the disk rotates at a constant distance from the stabilizing board and the disk. As a result, fluttering of the disk can be suppressed even when the disk is rotating at high speed, thus stably recording and reproducing information.

Thus, by providing the stabilizing board as a slider, in addition to the stabilizing slider, the distance between the disk and the stabilizing slider and the distance between the disk and the stabilizing board can easily be maintained constant when the disk is rotating. That is, it is possible to easily provide a recording and reproducing device which can stably record and reproduce information by suppressing fluttering of the disk during rotation of the disk.

The slider may be a focusing slider which is provided with focusing means for focusing a laser beam on the disk.

In this case, because the focusing means has the slider, fluttering of the disk due to pressure fluctuation which is caused by the movement of the focusing means can be suppressed by the slider. That is, because the movement of the focusing means is accompanied by the movement of the slider, the pressure fluctuation caused by the focusing means can be absorbed by the slider, thus suppressing fluttering of the disk when the disk is rotating.

As a result, information can be stably recorded and reproduced with respect to the rotating disk.

The focusing slider may include a first lens and a second lens which are provided as the focusing means, the first lens and the second lens being separated from each other by a predetermined distance, and a piezoelectric element layer for controlling the first lens and the second lens.

In this case, by focusing and projecting light using the dual lens composed of the first lens and the second lens to record or reproduce information, it is possible to increase numerical aperture, reduce spot size of a light beam, and increase recording density. Further, by controlling the distance between the first lens and the second lens using the piezoelectric element layer, it becomes possible to correct out-of-focus due to uneven thickness of the substrate or coat layer.

The stabilizing slider may be provided with a magnetic field generating element for generating a magnetic field.

This enables the present invention to be applicable to a magneto-optical disk incorporating a recording medium which requires a magnetic field for recording.

Further, the stabilizing board may be provided with an air-core coil as a magnetic field generating element for generating a magnetic field.

Further, in addition to the stabilizing board provided with the air-core coil for generating a magnetic field, the stabilizing slider may be provided with a soft magnetic material.

In this case, by the magnetic fields respectively generated from the air-core coil of the stabilizing board and by the soft magnetic material of the stabilizing slider, the intensity of the recording magnetic field applied to the magneto-optical disk can be increased, thereby improving quality of the reproduced signal.

Further, in the disk cartridge of the present invention which contains a disk in a cartridge, the disk is exposed from the disk cartridge when recording or reproducing information, the cartridge has inner wall surfaces which define a stabilizing board for creating a space of reduced pressure between the disk and the inner wall surfaces.

According to this arrangement, the stabilizing board which is defined by the inner wall surfaces of the cartridge suppresses fluttering of the disk more effectively when the disk is rotating, thus recording and reproducing information more stably and more desirably.

Here, rotation of the disk can be further stabilized when the distance between the disk and each inner wall surface of the disk cartridge is not less than 10 μm and not more than 200 μm.

[Ninth Embodiment]

The following will describe yet another embodiment of the present invention.

Figure 41:
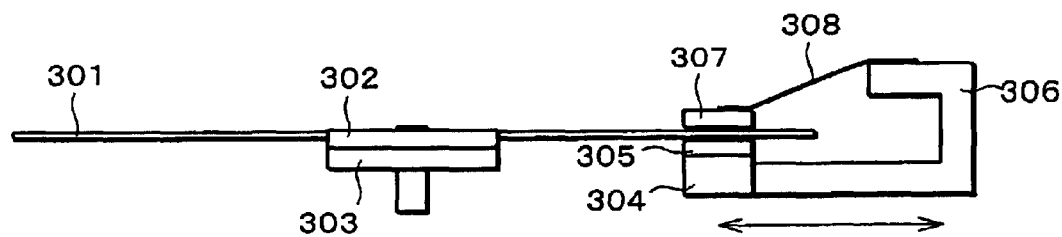
FIG. 41 is a cross sectional view schematically showing one embodiment of an optical disk device of the present invention.

As shown in FIG. 41, a recording and reproducing device of the present embodiment includes a flexible optical disk 301 with a magnetic center hub 302. The flexible optical disk 301 is chucked to a spindle 303 by magnetic coupling, and is rotated by driving the spindle 303. An optical pickup 304 with a transparent stabilizing board 305 made of glass or quartz is fixed on a support section 306. A slider 307 which is provided as another rotating stabilizing board is disposed opposite the transparent stabilizing board 305, and is fixed on the support section 306 via a suspension 308.

The suspension 308 is provided to press the slider 307 with such a force that the slider 307 moves toward the transparent stabilizing board 305. This enables the optical disk 301 to be stably rotated, by balancing the air pressure between the optical disk 301 and the transparent stabilizing board 305 with that between the optical disk 301 and the slider 307.

That is, the optical disk 301, being flexible, stably rotates while maintaining an almost constant distance from the transparent stabilizing board 305. Thus, the optical disk 301 fluctuates less in optic axis directions than conventionally, thus attaining easier focusing.

The support section 306 is driven by a driving device (not shown) to guide the optical pickup 304 and the slider 307 to a predetermined position of the optical disk 301.

Figure 42:
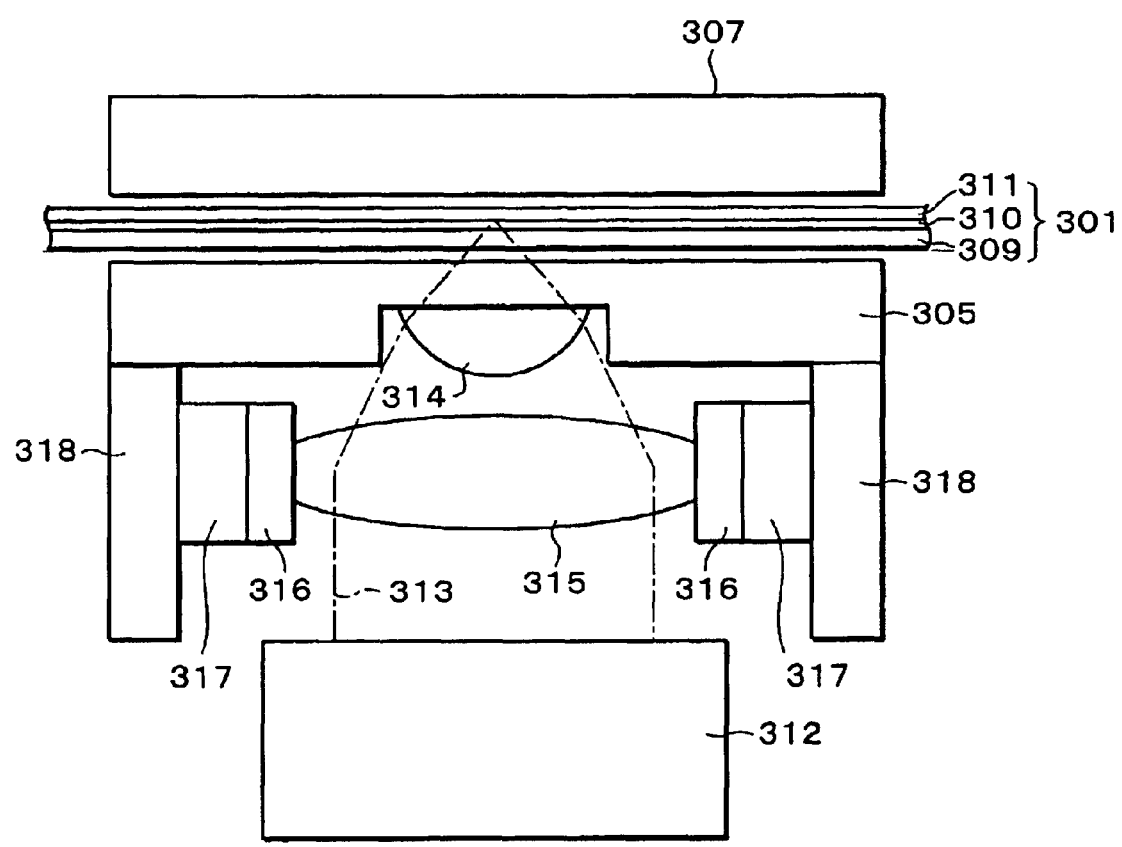
FIG. 42 is an enlarged cross sectional view showing relevant part of FIG. 41.

FIG. 42 schematically shows a cross section of a magnified portion of the optical pickup 304 and the slider 307 of FIG. 41. Here, the optical disk 301 may be a ROM disk with a series of pits, which are recessions on a surface of the substrate, or a write once disk which employs an organic pigment material for its recording medium, or a rewritable disk which employs a phase-change material for its recording medium.

In the case of the write once disk or rewritable disk, the optical disk 301 is made up of a disk substrate 309 made of polyethylene terephthalate having guiding grooves thereon, a recording medium 310 which is provided on the surface of the guiding grooves, and a protective layer 311 for protecting the recording medium 310.

The flexible optical disk 301 is stably rotated between the transparent stabilizing board 305 which is fixed on an optical pickup casing 318 and the slider 307 which is under the pressure of the suspension 308, so that the air pressure between the optical disk 301 and the transparent stabilizing board 305 and the air pressure between the optical disk 301 and the slider 307 balance out.

A laser beam 313 from a light emitting element in an light emitting and detecting optical system 312 is converged through a first objective lens 314 and a second objective lens 315 to fall on the recording medium 310 of the optical disk 301. A state of reflected light from the recording medium 310 is detected by a photoreceptor element in the light emitting and detecting optical system 312 so as to record or reproduce information.

The first objective lens 314 is fixed on the transparent stabilizing board 305 using an adhesive, etc. The second objective lens 315 is fixed on a lens holder 316. The lens holder 316 fixed on the optical pickup casing 318 via a biaxial actuator 317 allows the second objective lens 315 to carry out focusing and tracking operations with respect to the guiding grooves of the optical disk 301.

Note that, focusing and tracking can be realized to sufficiently record or reproduce a data signal despite the use of the biaxial actuator 317 which employs the conventional servo technique, because the flexible optical disk 301 stably rotates between the transparent stabilizing board 305 and the slider 307 with less fluttering.

In FIG. 42, the first objective lens 314 is fixed at the depression of the transparent stabilizing board 305. What is required here is that the light beam 313 is focused on the surface of the recording medium 310 by a focusing system composed of the second objective lens 315, the first objective lens 314, and the transparent stabilizing board 305.

Figure 43:
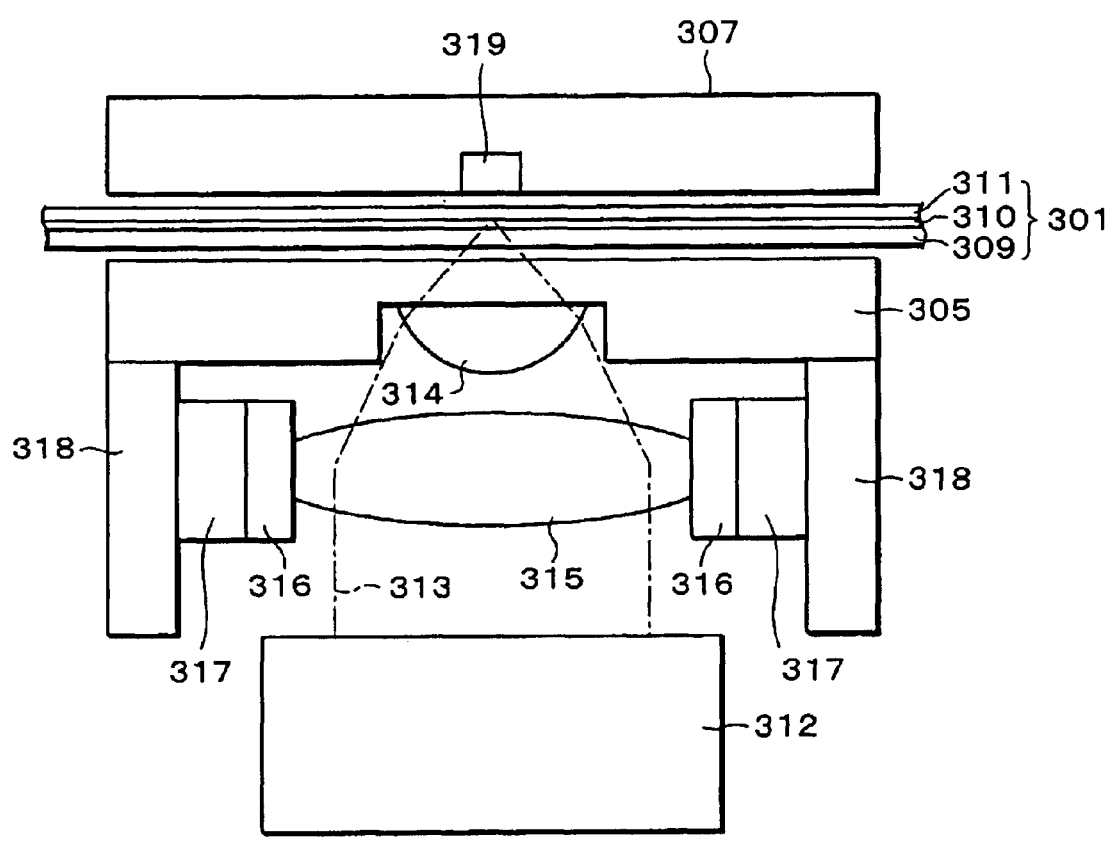
FIG. 43 is a cross sectional view showing a structure of relevant part of another embodiment of the optical disk device of the present invention.

FIG. 43 schematically shows a cross section of a magnified portion of the optical pickup 304 and the slider 307 when the recording medium of the optical disk 301 is a magneto-optical recording medium.

Referring to FIG. 43, recording of information in the magneto-optical disk requires a recording magnetic field. To this end, a magnetic head 319 is implanted in the slider 307, so as to enable a recording magnetic field to be applied on a portion of the magneto-optical disk where the light beam 313 is focused. The other structure, except for the magnetic head 319, is the same as that shown in FIG. 42, whereby the flexible optical disk 301 is stably rotated between the transparent stabilizing board 305 and the slider 307 with less fluttering.

Therefore, focusing and tracking operations are possible with the use of the biaxial actuator 317 which employs the conventional servo technique, and the recording magnetic field which is applied on a focusing position of the light beam by the magnetic head 319 implanted in the slider 307 enables recording and reproducing of a data signal with respect to a magneto-optical recording medium.

Figure 44:
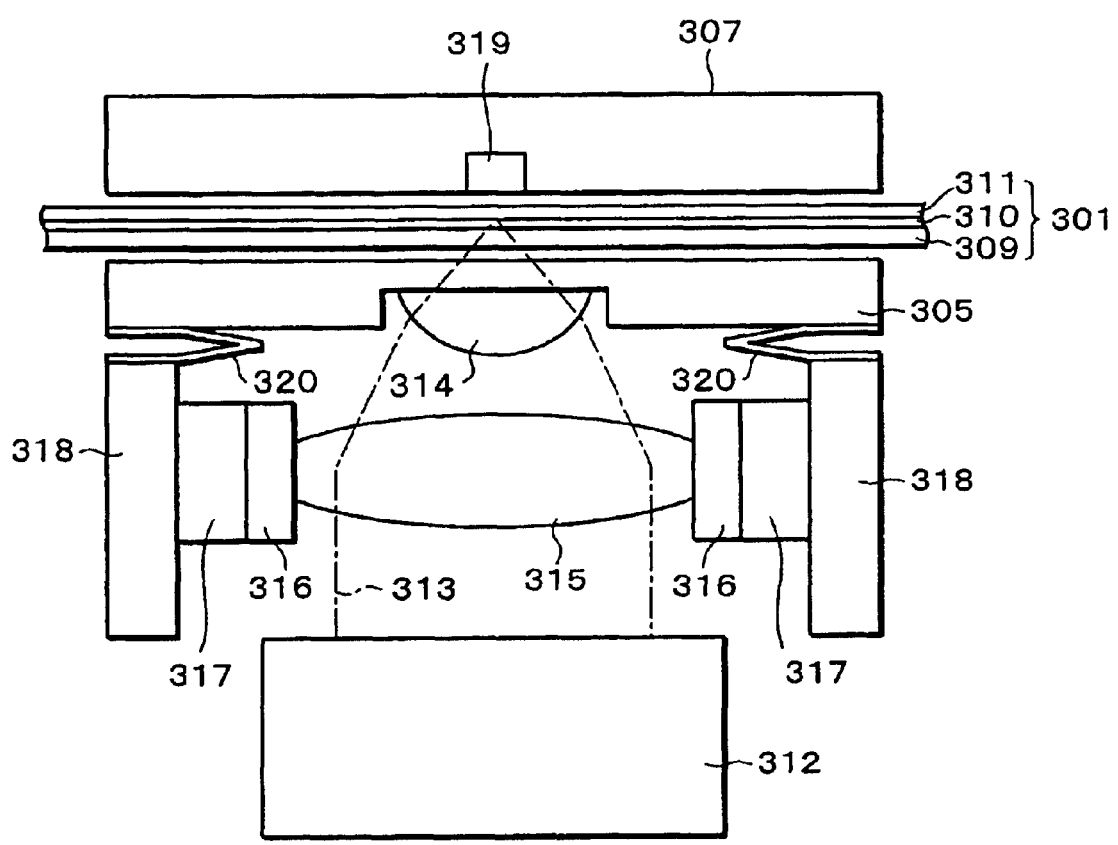
FIG. 44 is a cross sectional view showing a structure of relevant part of yet another embodiment of the optical disk device of the present invention.

FIG. 44 schematically shows a cross section of a magnified portion of the arrangement shown in FIG. 43, when the transparent stabilizing board 305 is fixed on the optical pickup casing 318 via a board spring 320.

In the arrangement shown in FIG. 43, the transparent stabilizing board 305 is fixed directly on the optical pickup casing 318. This may cause the optical disk 301 to oscillate in response to oscillation of the slider 307 caused by external force, and in the worst case, the optical disk 301 may collide with the transparent stabilizing board 305 to damage the surface of the optical disk 301, for example, by scratching it.

On the other hand, in the arrangement shown in FIG. 44, the transparent stabilizing board 305 is fixed on the optical pickup casing 318 via the board spring 320. According to this arrangement, the board spring 320 acts to absorb the oscillation of the optical disk 301 when the optical disk 301 oscillates in response to oscillation of the slider 7 caused by external force, thereby preventing damage to the optical disk 301 which is caused when the optical disk 301 collides with the transparent stabilizing board 305 due to external oscillation.

The foregoing described the case where the board spring 320 was incorporated in the arrangement of FIG. 43. However, the same effect can be obtained in the arrangement shown in FIG. 42, by fixing the transparent stabilizing board 305 on the optical pickup casing 318 via the board spring 320.

Figure 45:
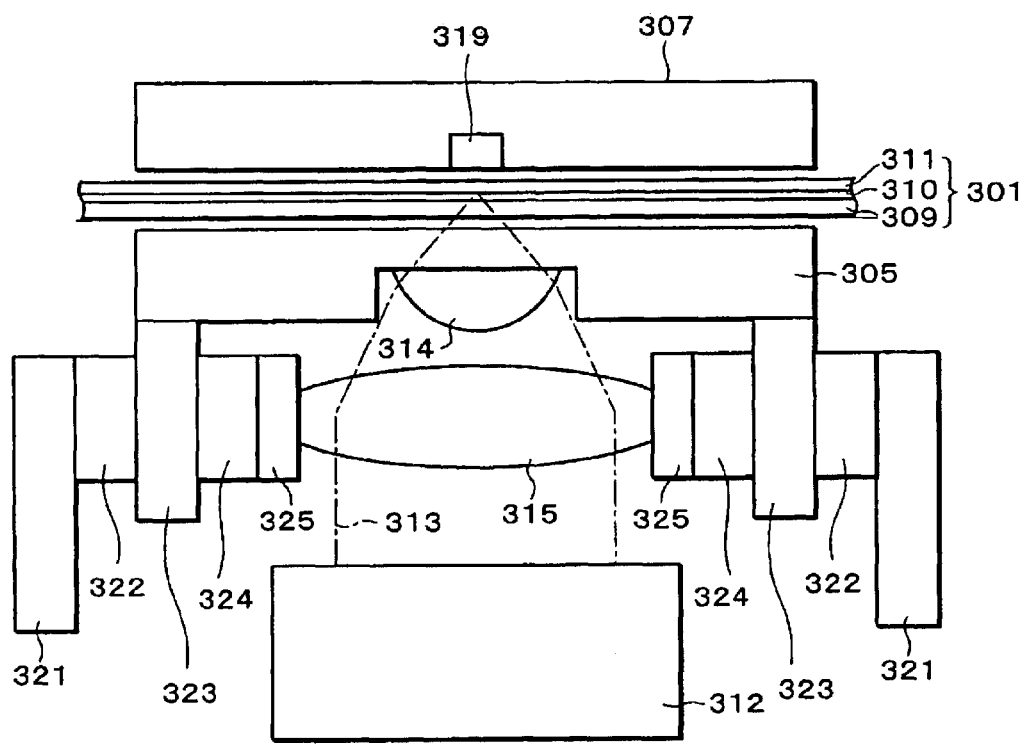
FIG. 45 is a cross sectional view showing a structure of relevant part of still another embodiment of the optical disk device of the present invention.

FIG. 45 shows an arrangement where a focusing actuator and a tracking actuator are separately provided to improve focusing of the light beam 313.

In the optical disk device of FIG. 42, FIG. 43, or FIG. 44, driving of the objective lenses for tracking moves only the second objective lens 315 in a track direction. As a result, the optic axes of the first and second objective lenses 314 and 315 do not align, which changes a focusing state of a light beam spot. Thus, when there is large deviation of guiding tracks in the rotation of the optical disk 301, it may become impossible to stably record or reproduce information.

In light of this drawback, in the optical disk device of FIG. 45, the transparent stabilizing board 305 is fixed on a transparent stabilizing board support member (intermediate support member) 323, and the second objective lens 315, which is fixed on the lens holder 325, is fixed on the transparent stabilizing board support member 323 via a focusing actuator 324, and the transparent stabilizing board support member 323 is fixed to the optical pickup casing (main support member) 321 via a tracking actuator 322.

In this case, in focusing, the second objective lens 315 is moved only in the focusing direction with respect to the first objective lens 314, and the transparent stabilizing board 305, the first objective lens 314, and second objective lens 315, which are fixed on the transparent stabilizing board support member 323, are integrally moved in a track direction. Therefore, the optic axes of the first and second objective lenses 314 and 315 align, thus stably recording and reproducing information even when there is large deviation in guiding tracks in rotation of the optical disk 301.

FIG. 45 describes the arrangement where the magnetic head 319 is implanted in the slider 307. However, the same effect can also be obtained by the arrangement in which the magnetic head 319 is not implanted.

Further, FIG. 45 describes the case where the transparent stabilizing board 305 is directly fixed to the transparent stabilizing board support member 323. However, the transparent stabilizing board 305 may be fixed to the transparent stabilizing board support member 323 via the board spring 320 as in the arrangement of FIG. 44. In this case, the board spring 320 acts to absorb the oscillation of the optical disk 301, and thus prevents damage to the optical disk 301, which is caused when the optical disk 301 collides with the transparent stabilizing board 305 in response to external oscillation.

Figure 46:
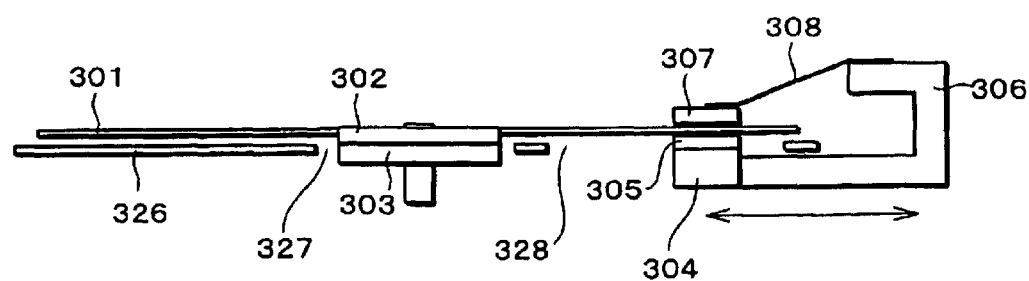
FIG. 46 is a cross sectional view of the optical disk device and an entire rotation stabilizer of the present invention.
Figure 47:
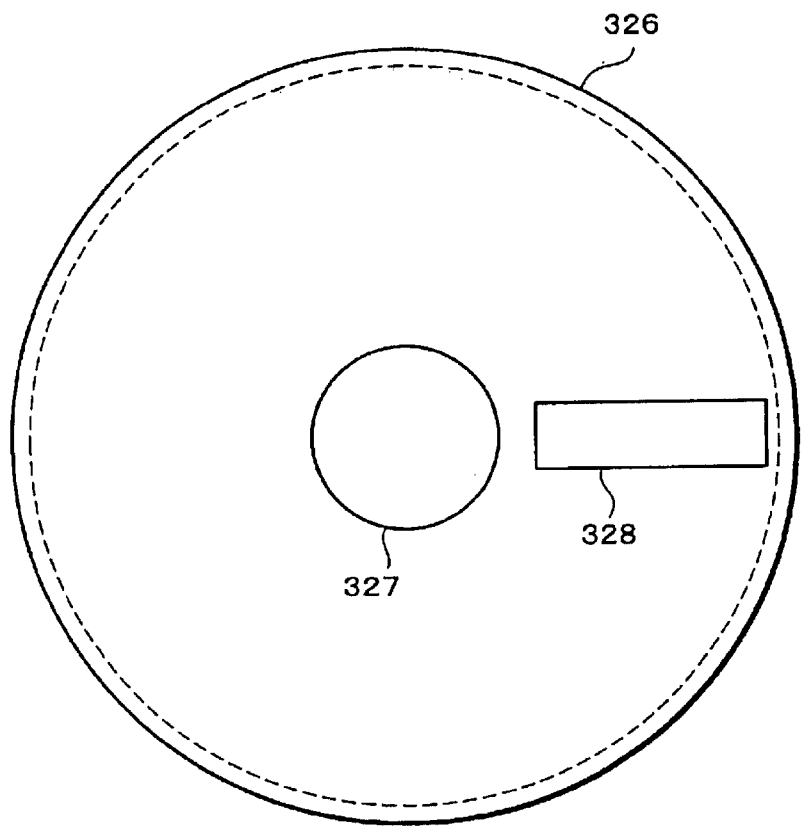
FIG. 47 is a plan view of the entire rotation stabilizer of FIG. 46.

FIG. 46 and FIG. 47 are a cross sectional view and a plan view, respectively, explaining an arrangement which additionally includes an entire rotation stabilizing board 326 for the purpose of further stabilizing rotation of the flexible optical disk 301. The entire rotation stabilizing board 326 includes a first opening 327 which is used to chuck the center hub 302 of the optical disk 301 to the spindle 303, and a second opening 328 which is used to position the optical pickup 304 with the transparent stabilizing board 305 in the vicinity of the optical disk 301. FIG. 46 is a cross section taken along a center line of the second opening 328.

By thus providing the entire rotation stabilizing board 326, rotation of the flexible optical disk 301 fixed to the center hub 302, rotated by the spindle 303, creates a space of reduced pressure between the flexible optical disk 301 and the entire rotation stabilizing board 326. Such reduced pressure draws the optical disk 301 toward the entire rotation stabilizing board 326 to enable the optical disk 301 to stably rotate at a constant distance from the entire rotation stabilizing board 326, thus suppressing fluttering of the optical disk 301.

In this case, as in FIG. 41, the slider 307 is pushed toward the transparent stabilizing board 305 by the suspension 308 with such a force that the air pressure between the optical disk 301 and the transparent stabilizing board 305 and that between the optical disk 301 and the slider 307 are balanced, thus stably rotating the optical disk 301. The optical disk 301 is stably rotated in this manner at a distance from the transparent stabilizing board 305 and the slider 307, which realizes stable rotation of the optical disk 301 between the transparent stabilizing board 305 and the slider 307, and thus realizes more desirable recording and reproducing.

Here, the optical pickup 304 with the transparent stabilizing board 305 and the slider 307 may be switched in their positions with respect to the flexible optical disk 301. In this case, the second opening becomes an opening which is used to position the slider 307 in the vicinity of the optical disk 301.

Figure 48:
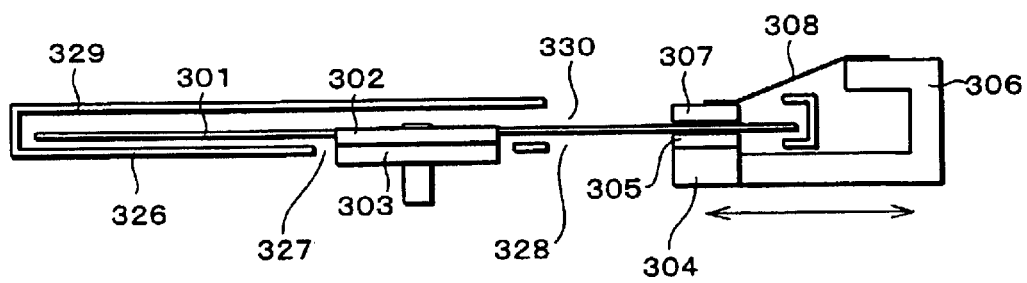
FIG. 48 is a cross sectional view of the optical disk device and an optical disk cartridge of the present invention.
Figure 49:
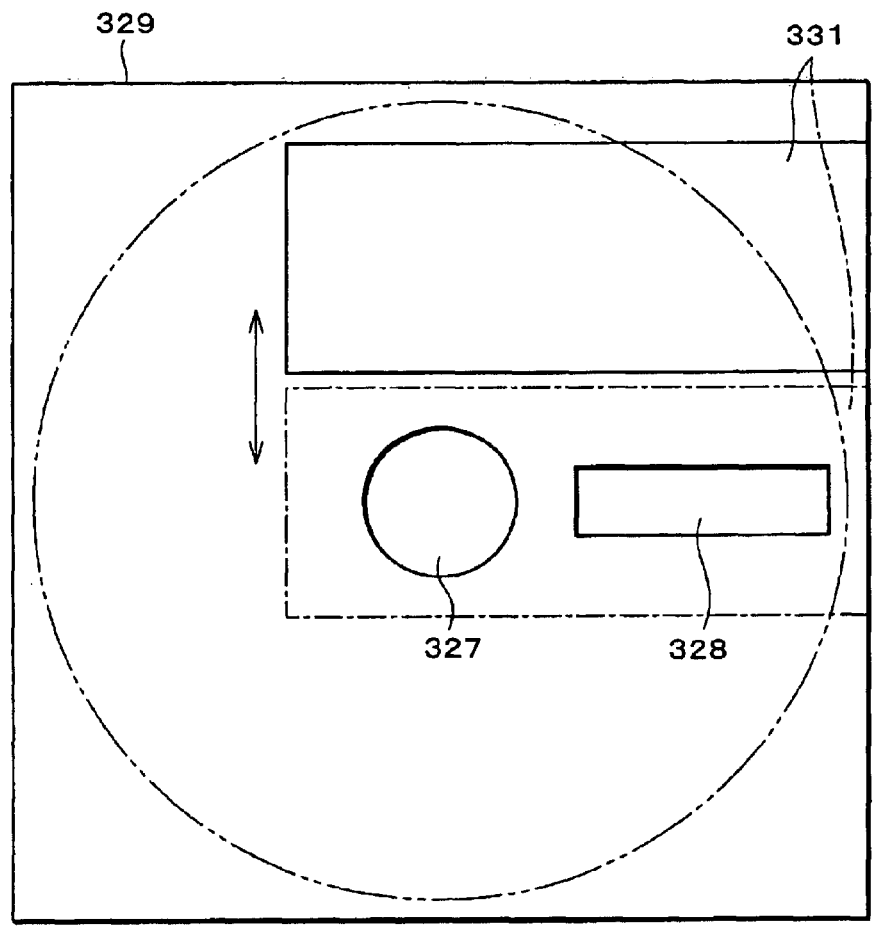
FIG. 49 is a plan view of the optical disk cartridge of FIG. 48.

FIG. 48 and FIG. 49 are a cross sectional view and a plan view, respectively, explaining an arrangement in which the entire rotation stabilizing board 326 and the optical disk cartridge case 329 are integrally provided in the arrangement of FIG. 46 and FIG. 47 which additionally includes the entire rotation stabilizing board 326 for the purpose of further stabilizing rotation of the flexible optical disk 301.

The optical disk cartridge 329 is made of polycarbonate, and includes a first opening 327 which is used to chuck the center hub 302 of the optical disk 301 to the spindle 303, a second opening 328 which is used to position the optical pickup 304 with the transparent stabilizing board 305 in the vicinity of the optical disk 301, and a third opening 330 which is used to position the slider 307 in the vicinity of the optical disk 301 at a position opposite the second opening 328. FIG. 49 is a cross section taken along a central line of the second opening 328.

The optical disk cartridge 329 further includes a slide shutter 331 which can be opened or closed to shut out dusts. In this case, the entire rotation stabilizing board 326 which is integrally provided with the optical disk cartridge case 329 acts in the same way as the entire rotation stabilizing board 326 shown in FIG. 46 and FIG. 47. As a result, it is possible to more stably rotate the optical disk 301 (e.g., at about 3000 rpm) between the transparent stabilizing board 305 and the slider 307 while maintaining an almost constant distance (e.g., 20 μm) from these members, thus realizing more desirable recording and reproducing.

Further, when the optical disk cartridge case 329 containing the optical disk 301 is taken out of the recording and reproducing device, the slide shutter 331 can be closed to protect the optical disk 301 from dusts more effectively.

Here, the optical pickup 304 with the transparent stabilizing board 305 and the slider 307 may be switched in their positions with respect to the optical disk 301. In this case, the second opening 328 becomes an opening which is used to position the slider 307 in the vicinity of the optical disk 301, and the third opening 330 becomes an opening which is used to position the optical pickup 304 with the transparent stabilizing board 305 in the vicinity of the optical disk 301.

Figure 50:
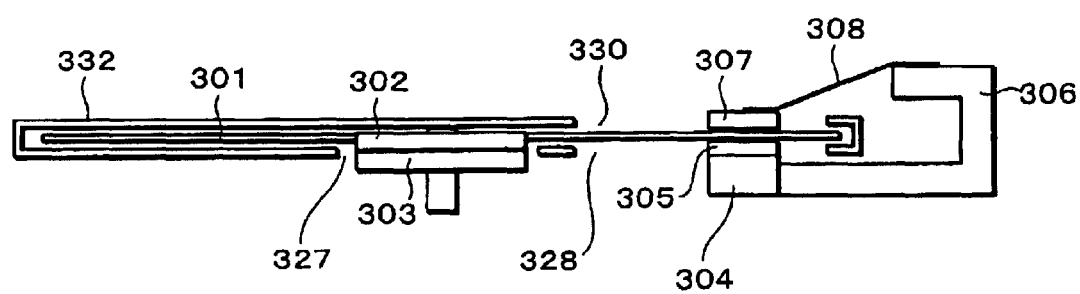
FIG. 50 is a cross sectional view of the optical disk device and an optical disk cartridge of the present invention.
Figure 51:
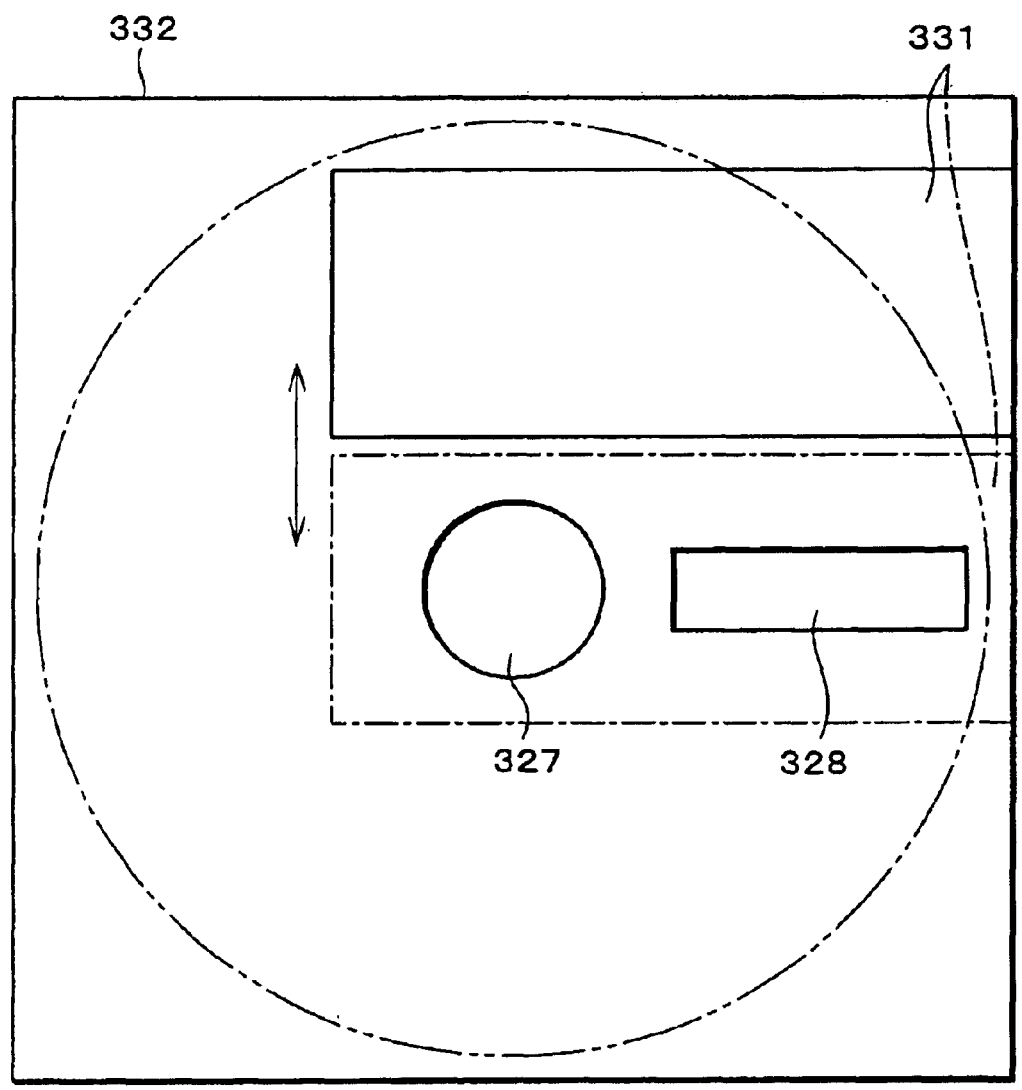
FIG. 51 is a plan view of the optical disk cartridge of FIG. 50.

FIG. 50 and FIG. 51 are a cross sectional view and a plan view, respectively, explaining an arrangement incorporating an optical disk cartridge case 332 for realizing more stable rotation of the optical disk 301 and a thinner optical disk cartridge.

As with FIG. 48 and FIG. 49, the optical disk cartridge 332 includes a first opening 327 which is used to chuck the center hub 302 of the optical disk 301 to the spindle 303, a second opening 328 which is used to position the optical pickup 304 with the transparent stabilizing board 305 in the vicinity of the optical disk 301, and a third opening 330 which is used to position the slider 307 in the vicinity of the optical disk 301 at a position opposite the second opening 328. FIG. 50 is a cross section taken along a central line of the second opening 328.

The optical disk cartridge case 332 further includes a slide shutter 331 which can be opened or closed to shut out dusts.

In the arrangement of FIG. 48 and FIG. 49, the flexible optical disk 301 is drawn to the entire rotation stabilizing board 326 and is rotated at a constant distance from the entire rotation stabilizing board 326, which suppresses fluttering of the optical disk 301. However, since the distance between the flexible optical disk 301 and the inner wall of the optical disk cartridge case 329 on the other side of the entire rotation stabilizing board 326 is wider, the flexible optical disk 301 flutters in the optical disk cartridge case 329 by the influence of an external force such as oscillation. As a result, stable rotation of the optical disk 301 suffers.

In the arrangement as shown in FIG. 50 and FIG. 51 of the present embodiment, a space inside the optical disk cartridge case 332 is restricted to suppress fluttering. By this restriction of the space inside the optical disk cartridge case 332, both the upper and lower inner walls of the optical disk cartridge case 332 serve as the entire rotation stabilizing board, which suppresses fluttering of the optical disk 301 and enables the optical disk 301 to be rotated more stably.

Here, in order for the optical disk 301 to be flexible, the thickness of the optical disk 301 is preferably not less than 30 $\mu$m and not more than 400 $\mu$m. A thickness less than 30 $\mu$m makes it difficult to maintain sufficient strength for the optical disk 301 to withstand rotation. On the other hand, a thickness of the optical disk 301 exceeding 400 $\mu$m makes the optical disk 301 less flexible, which undermines the effect of suppressing fluttering of the optical disk 301 by the entire rotation stabilizing board.

Further, in order for both the upper and lower inner walls of the optical disk cartridge case 332 to serve as the entire rotation stabilizing board, it is preferable that the distance between the optical disk 301 and the upper inner wall of the optical disk cartridge case 332, and the distance between the optical disk 301 and the lower inner wall of the optical disk cartridge case 332 are not less than 10 $\mu$m and not more than 200 $\mu$m.

A distance between the optical disk 301 and upper or lower inner wall of the optical disk cartridge 332 less than 10 $\mu$m causes the optical disk 301 to collide with the upper or lower inner wall of the optical disk cartridge case 332, and the surface of the optical disk 301 is more likely to be scratched.

On the other hand, a distance between the optical disk 301 and the upper or lower inner wall of the optical disk cartridge case 332 exceeding 200 $\mu$m prevents the upper and lower inner walls of the optical disk cartridge case 332 to serve as a stabilizing board, which may result in instable rotation of the optical disk 301 in the optical disk cartridge case 332.

Here, the optical pickup 304 with the transparent stabilizing board 305 and the slider 307 may be switched in their positions with respect to the flexible optical disk 301. In this case, the second opening 328 becomes an opening which is used to position the slider 307 in the vicinity of the optical disk 301, and the third opening 330 becomes an opening which is used to position the optical pickup 304 with the transparent stabilizing board 305 in the vicinity of the optical disk 301.

According to the foregoing Ninth Embodiment, an optical disk device of the present invention, in an optical disk device which records and reproduces information with respect to a flexible optical disk, comprises: rotation driving means for rotating an optical disk; a focusing unit for focusing light from a light source on the optical disk; a support member for supporting the focusing unit; and a transparent rotation stabilizing board, fixed to the support member so as to be disposed between the focusing unit with the support member and the optical disk, for stabilizing rotation of the optical disk, wherein the focusing unit includes a first objective lens and a second objective lens, the first objective lens being fixed to the support member via the transparent rotation stabilizing board, and the second objective lens being fixed to the support member via an actuator for driving the lenses.

That is, in the present invention, a transparent rotation stabilizing board for stabilizing rotation of the flexible optical disk is provided on the focusing means, i.e., the focusing unit and the support member of the focusing unit, so as to prevent fluttering of the optical disk which may be caused when the focusing unit and the support member of the focusing unit are positioned in the vicinity of the optical disk, and thereby enables desirable recording and reproducing. Further, the focusing unit is composed of the first objective lens and the second objective lens, wherein the first objective lens is attached to the support member via the transparent rotation stabilizing board, and the transparent rotation stabilizing board is fixed with respect to the optical disk. This prevents fluttering of the optical disk further effectively to realize desirable recording and reproducing. The second objective lens is used to focus light from the light source on the optical disk by driving actuators of the lens, i.e., a biaxial driving actuator or focusing and tracking actuators. Further, in the present invention, another rotation stabilizing board, e.g., slider, for further stabilizing rotation of the optical disk is provided on the opposite side of the transparent rotation stabilizing board via the optical disk. Thus, the flexible optical disk rotates between the rotation stabilizing board and the slider to balance the air pressure between the optical disk and the transparent rotation stabilizing board and that between the optical disk and the slider. As a result, pressure fluctuation which occurs around the optical pickup can be suppressed to suppress fluttering of the flexible optical disk when it is rotating, thus realizing desirable recording and reproducing. Further, in the present invention, because the dual lens composed of the first objective lens and the second objective lens is used for the focusing unit, numerical aperture can be increased to 0.7 or greater, thereby realizing a high-density optical disk recording and reproducing device with a small light beam spot size.

Further, in the optical disk device according to the present invention, the transparent rotation stabilizing board is fixed to the support member of the focusing means via a spring. Thus, pressure fluctuation which occurs around the optical pickup can be suppressed to suppress fluttering of the rotating flexible optical disk. As a result, it is possible to record and reproduce information desirably and to completely suppress damage to the optical disk which is caused when the flexible optical disk collides with the transparent rotation stabilizing board.

Further, in the optical disk device according to the present invention, the first objective lens is attached to the transparent rotation stabilizing board, and the second objective lens is attached to the support member (intermediate support member) via the focusing actuator, and the support member is attached to another support member (main support member) via the tracking actuator. Thus, the first objective lens is driven only in the focus direction with respect to the second objective lens, which prevents misalignment of optic axes when the objective lenses are moved in the radial direction of the disk in tracking, thus realizing more stable recording and reproducing.

In the optical disk device of the present invention, the transparent rotation stabilizing board is fixed to the support member of the focusing unit via a spring. This suppresses pressure fluctuation which occurs around the optical pickup, and thus suppresses fluttering of the flexible optical disk when it is rotating. As a result, it is possible to realize desirable recording and reproducing, and to completely suppress damage to the optical disk which is caused when the flexible optical disk collides with the transparent rotation stabilizing board.

Further, in the optical disk device of the present invention, a magnetic field generating element is embedded in the slider. This enables a recording magnetic field to be generated from the magnetic field generating element when the recording medium of the optical disk is a magneto-optical recording medium. This makes the optical disk device of the present invention to be applicable to an optical disk which employs a magneto-optical recording medium.

Further, in the optical disk device of the present invention, there is provided the entire rotation stabilizing board on the opposite side of the optical disk. This stabilizes rotation of the flexible optical disk in an area other than the area sandwiched between the slider and the transparent rotation stabilizing board, thus recording and reproducing information more stably and more desirably.

Further, in the optical disk device of the present invention, one of or both inner wall surfaces of the optical disk cartridge containing the optical disk may define the entire rotation stabilizing board of the flexible optical disk. This suppresses fluttering of the optical disk more effectively.

Further, in the optical disk device of the present invention, the distance between the optical disk and each inner wall surface of the optical disk cartridge (casing) is not less than 10 $\mu$m and not more than 200 $\mu$m. This enables the entire rotation stabilizing surface defined by the inner wall surfaces of the optical disk cartridge to suppress fluttering of the optical disk more effectively, thus recording and reproducing information more stably and more desirably.

As described, in the present invention, the rotation stabilizing board for stabilizing rotation of the flexible optical disk is provided on the focusing means, i.e., the focusing unit and the support member of the focusing unit, wherein the focusing unit is composed on the first objective lens and the second objective lens, and the first objective lens is attached to the support member via the transparent rotation stabilizing board, and the transparent rotation stabilizing board is fixed with respect to the optical disk. As a result, fluttering of the optical disk can be prevented to realize desirable recording and reproducing.

The second objective lens is used to focus light from the light source on the optical disk by driving actuators of the lens, i.e., a biaxial driving actuator or focusing and tracking actuators.

Further, another rotation stabilizing board, e.g., slider, for further stabilizing rotation of the optical disk is provided on the opposite side of the transparent rotation stabilizing board via the optical disk. Thus, the flexible optical disk rotates between the rotation stabilizing board and the slider to balance the air pressure between the optical disk and the transparent rotation stabilizing board and that between the optical disk and the slider. As a result, pressure fluctuation which is generated around the optical pickup can be suppressed to suppress fluttering of the flexible optical disk when it is rotating, thus realizing desirable recording and reproducing. Further, in the present invention, because the dual lens composed of the first objective lens and the second objective lens is used for the focusing unit, numerical aperture can be increased to 0.7 or greater, thereby realizing a high-density optical disk recording and reproducing device with a small light beam spot size.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A recording and reproducing device, which includes a light source, focusing means for converging and projecting a laser beam, which was emitted from the light source on a disk, and rotation driving means for rotating the disk, said recording and reproducing device comprising:

a stabilizing board, provided on a first side of the disk between the disk and the focusing means, which is moved with the focusing means; and a vertically-oscillating slider, which is disposed on an opposite side of the disk and is facing the stabilizing board, to balance air pressures between the stabilizing board and the disk and between the slider and the disk.

2. The recording and reproducing device as set forth in claim 1, wherein said stabilizing board is transparent.

3. The recording and reproducing device as set forth in claim 1, wherein the stabilizing board is supported to oscillate.

4. The recording and reproducing device as set forth in claim 1, wherein the slider has a flat surface facing the disk.

5. The recording and reproducing device as set forth in claim 1, wherein the stabilizing board is fixed to the focusing means via an elastic member having elasticity.

6. The recording and reproducing device as set forth in claim 1, wherein the focusing means is a complex lens which is composed of at least two lenses.

7. The recording and reproducing device as set forth in claim 1, wherein the slider includes a magnetic field generating element for generating a magnetic field.

8. The recording and reproducing device as set forth in claim 1, wherein a surface of the stabilizing board facing the disk is flat and is parallel to a surface of the disk.

9. The recording and reproducing device as set forth in claim 8, wherein a surface of the vertically-oscillating slider is flat and is parallel to a surface of the disk.

10. The recording and reproducing device as set forth in claim 9, wherein the focusing means is disposed such that an optical axis of the focusing means passes through the stabilizing board in a direction of thickness at substantially a center of a surface of the stabilizing board facing the disk.

11. The recording and reproducing device as set forth in claim 8, wherein the focusing means is disposed such that an optical axis of the focusing means passes through the stabilizing board in a direction of thickness at substantially a center of a surface of the stabilizing board facing the disk.

12. The recording and reproducing device as set forth in claim 1, wherein a surface of the vertically-oscillating slider facing the disk is flat and is parallel to a surface of the disk.

13. The recording and reproducing device as set forth in claim 12, wherein the focusing means is disposed such that an optical axis of the focusing means passes through the stabilizing board in a direction of thickness at substantially a center of a surface of the stabilizing board facing the disk.

14. The recording and reproducing device as set forth in claim 1, wherein the focusing means is disposed such that an optical axis of the focusing means passes through the stabilizing board in a direction of thickness at substantially a center of a surface of the stabilizing board facing the disk.

* * * * *